United States Patent
Ide et al.

(10) Patent No.: US 6,792,203 B1
(45) Date of Patent: Sep. 14, 2004

(54) CAMERA AND DISTANCE MEASURING APPARATUS USED IN THE SAME

(75) Inventors: Masataka Ide, Hachioji (JP); Osamu Nonaka, Sagamihara (JP)

(73) Assignee: Olympus Optical Co., Ltd. (JP)

( * ) Notice: Subject to any disclaimer, the term of this patent is extended or adjusted under 35 U.S.C. 154(b) by 415 days.

(21) Appl. No.: 09/651,877

(22) Filed: Aug. 30, 2000

(30) Foreign Application Priority Data

Sep. 1, 1999 (JP) .......... 11-247867
Sep. 29, 1999 (JP) .......... 11-277245

(51) Int. Cl.⁷ .......... G03B 7/00; G03B 3/10; G03B 15/03; G03B 7/08
(52) U.S. Cl. .......... 396/65; 396/69; 396/123; 396/157; 396/234
(58) Field of Search .......... 396/65, 69, 106, 396/121, 122, 123, 157, 233, 234

(56) References Cited

U.S. PATENT DOCUMENTS

| | | | |
|---|---|---|---|
| 5,526,088 A | 6/1996 | Kusaka | 354/402 |
| 5,687,402 A | * 11/1997 | Kishimoto et al. | 396/80 |
| 6,167,200 A | * 12/2000 | Yamaguchi et al. | 396/65 |

FOREIGN PATENT DOCUMENTS

JP  5-249369  9/1993
JP  7-199039  8/1995

* cited by examiner

Primary Examiner—David M. Gray
Assistant Examiner—Rochelle Blackman
(74) Attorney, Agent, or Firm—Straub & Pokotylo; John C. Pokotylo

(57) ABSTRACT

In a camera a pickup element images an object image. An A/D converter A/D converts an output of the pickup element. A processing section includes a night scene judging section for judging whether or not the scene to be photographed is the night scene on the basis of a digital image signal output from the A/D converter. In a distance measuring apparatus of the camera. An area sensor is used for an auto-focus. A first judging section judges that the scene to be photographed is a night scene on the basis of an output of the area sensor. In the case where the first judging section judges that the photography scene is not the night scene, a second judging section judges whether or not the scene to be photographed is the reverse light scene. A main object specifying section specifies the main object in the case where either the first judging section or the second judging section judges the scene to be photographed is either the night scene or the reverse light scene. A distance measuring section conducts distance measuring calculation with respect to the main object specified by the main object specifying section.

24 Claims, 42 Drawing Sheets

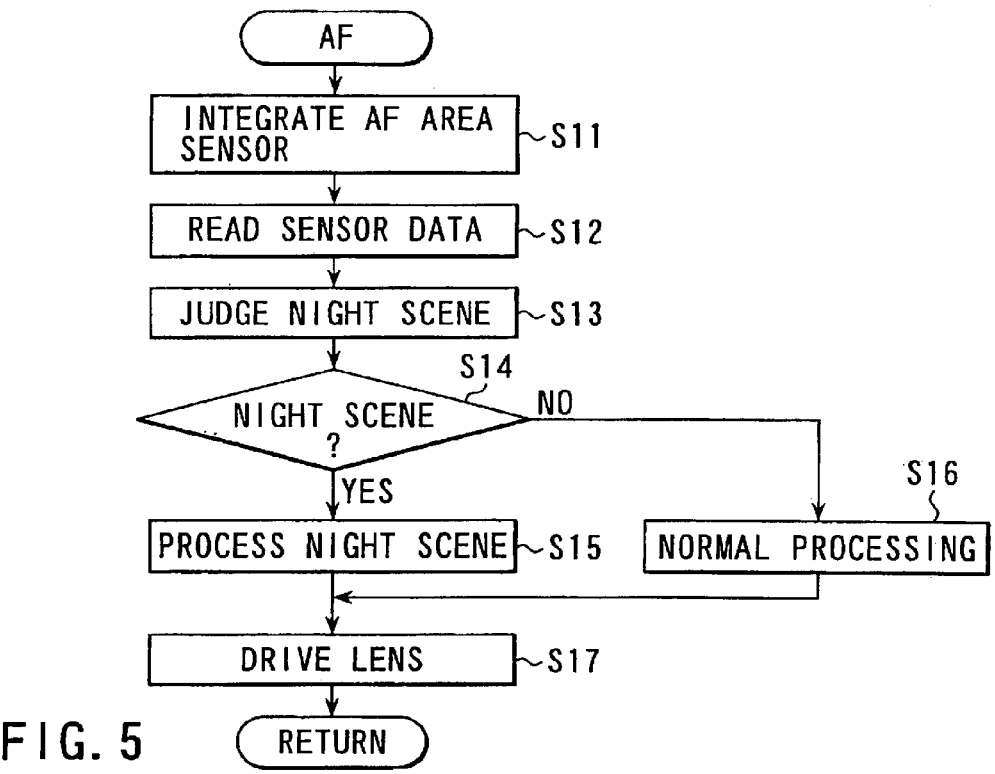
FIG. 5
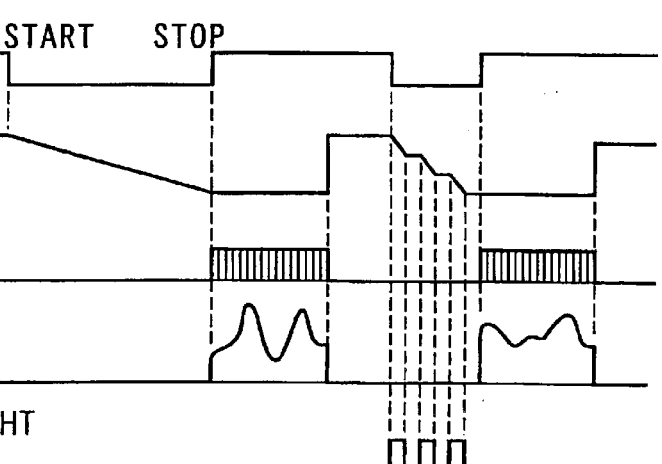

PHOTOGRAPHY SCREEN

M 201

[SENSOR DATA AT THE TIME OF NORMAL INTEGRATION]

FIG. 43  L:LOW LUMINANCE  H:HIGH LUMINANCE
M:PEAK OF THE PIXEL NUMBER AT THE MEDIUM LUMINANCE PORTION:Bvp
[HISTOGRAM OF THE REVERSE LIGHT SCENE]

[SENSOR DATA AT THE TIME OF INTEGRATION OF PREVIOUS LIGHT EMISSION (CONSTANT LIGHT REMOVAL)]

[SENSOR DATA AT THE TIME OF NORMAL INTEGRATION (STANDARDIZED DATA)]

[SENSOR DATA AT THE TIME OF INTEGRATION OF PREVIOUS LIGHT EMISSION (STANDARDIZED DATA)]

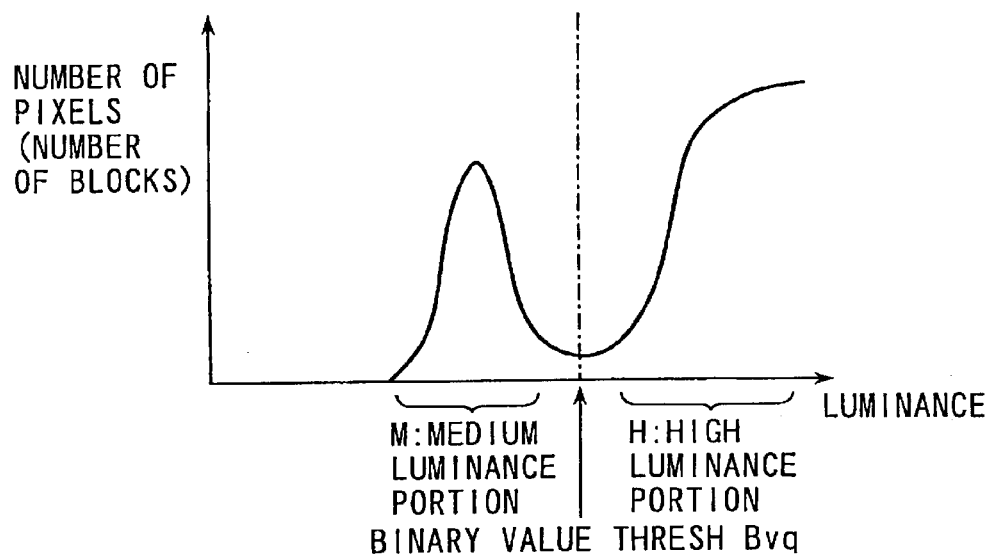
FIG. 73 [HISTOGRAM OF THE REVERSE LIGHT SCENE]
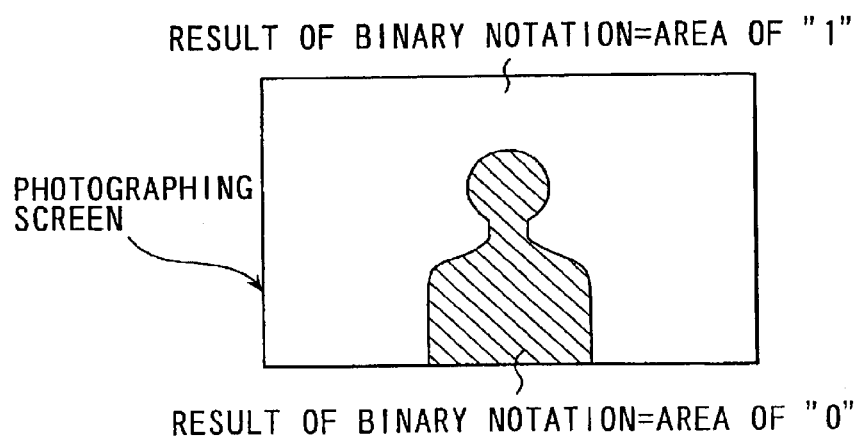
FIG. 74

CAMERA AND DISTANCE MEASURING APPARATUS USED IN THE SAME

CROSS-REFERENCE TO RELATED APPLICATIONS

This application is based upon and claims the benefit of priority from the prior Japanese Patent Applications No. 11-247867, filed Sep. 1, 1999; and No. 11-277245, filed Sep. 29, 1999, the entire contents of which are incorporated herein by reference.

BACKGROUND OF THE INVENTION

The present invention relates to a camera and a distance measuring apparatus used in the camera, and more particularly to a camera for conducting a photographing operation suitable to night scenes by judging the night scene and to a distance measuring apparatus attached on a camera for taking photographs such as night scenes or the like, the apparatus discriminating a major image to be photographed within the detection screen thereby making it possible to conduct a highly precise focus detection processing with certitude at a distance measurement point at which discriminated main image to be photographed is located.

Conventionally, a large number of cameras have been developed which are designed to facilitate the photography of night scenes.

For example, Jpn. Pat. Appln. KOKAI Publication No. 7-199039 discloses a camera which is capable of photographing night scenes when a photographer sets the mode of the camera to a night scene mode at the time of photographing night scenes.

In this camera, a focus adjustment (an auto-focus, hereinafter abbreviated as AF) is conducted by projecting auxiliary light to the object to measure the distance to the object.

Furthermore, conventionally, with a camera or the like for conducting photographing operation, such as a camera or the like for photographing a desired image by exposing the image to be photographed by using films for photography, various kinds of technology are proposed for discriminating the main image to be photographed within the range of the photograph scenes in order to conduct an AF operation with respect to the main image to be photographed.

For example, in the camera disclosed in Jpn. Pat. Appln. KOKAI Publication No. 5-249369, when a detection has been made on the fact that an image signal based on an image of the object which is obtained with an electric charge accumulation type image sensor (an AF sensor) for a focus adjustment is separated into a distribution of a high luminance portion and a distribution of a low luminance portion, judgment is made that the screen constitution is such that the main object such as a person or the like is located against a bright background.

Then, in such a case, the integration time of the AF sensor is set to be long, so that a focus detection processing is conducted with an emphasis on the low luminance portion by conducting the integration calculation processing again.

In other words, in the camera technology disclosed in Jpn. Pat. Appln. KOKAI Publication No. 5-249369, in the case where the pixel data of the AF sensor is distributed in a state divided into a high luminance portion and a low luminance portion, judgment is made that the pixel data is a person against a bright background, so that the integration time of the AF sensor is prolonged to conduct the integration again thereby conducting an AF detection with an emphasis on the low luminance portion.

In such technology, an automatic focus adjustment operation is conducted with certitude with respect to the main image to be photographed such as a person or the like free from an influence of the brightness (luminance) of the background.

However, in the camera disclosed in Jpn. Pat. Appln. KOKAI Publication No. 7-199039, there is a problem that it is troublesome for photographers to set the mode of the camera to the night scene mode in accordance with the scene to be photographed.

Furthermore, in the camera described in Jpn. Pat. Appln. KOKAI Publication No. 5-249369, the luminance is detected with one line sensor, so that there arises a problem that the detection area is narrow, and a high contrast object is erroneously recognized, and at the same time, another problem arises that night scene cannot be discriminated when a bright area comes into the detection area.

Furthermore, the means disclosed in Jpn. Pat. Appln. KOKAI Publication No. 5-249369 is constituted in such a manner that a focus state is detected with a pair of line sensors with the result that there arises a case in which, for example, a high contrast object, namely an object image with a large luminance difference is erroneously recognized because of the narrow detection area as an object in which the high luminance portion and the low luminance portion are distributed.

In such a case, it follows that a secured AF detection processing cannot be conducted on the side of the camera.

Furthermore, when the high luminance portion does not come into the detection area, judgment is made on the side of the camera that the screen is constituted in such a manner that the main object is located against a bright background.

In such a case, the desired main object is erroneously recognized on the side of the camera, so that the detection result cannot be obtained and the focus detection processing is repeated in some cases.

As a consequence, on the side of the camera, it takes a long time from the release instruction until exposure operation is conducted via the focus detection processing. Thus, the so-called release time lag is increased, which becomes a cause of hindering the operability of the camera.

Furthermore, in this case, there might be generated a case wherein the focus detection result cannot be obtained, namely the state in which the distance cannot be measured might be generated.

BRIEF SUMMARY OF THE INVENTION

An object of the present invention is to provide a camera which is capable of conducting a photographing operation suitable to night scenes by automatically judging the night scene without setting by photographers.

Another object of the invention is to provide a distance measuring apparatus of a camera for discriminating with certitude the position of a main object within the photographing screen, and, at the same time, conducting a high precision distance measuring processing by conducting with certitude focus detection processing with respect to the desired image of the main object.

In order to attain the above object, according to the present invention, there is provided a camera comprising:
  a pickup element
  an judging section for judging whether or not a scene to be photographed is a night scene on the basis of an output result from the pickup element; and
  a setting section for setting a photographing mode in accordance with the judgment result of the judging section.

Furthermore, according to the present invention, there is provided a camera comprising:

a pickup element for photographing an image of an object;

an analog/digital (A/D) converter for A/D converting an output of the pickup element; and a processing section including a night scene judging section for judging whether or not a scene to be photographed is a night scene on the basis of a digital image signal output from the A/D converter.

Furthermore, in order to attain the other object described above, there is provided a distance measuring device of a camera comprising:

a pickup element;

a luminance distribution calculation section for calculating a luminance distribution within a screen to be photographed on the basis of an output of the pickup element;

a continuous region detection section for detecting a region where the luminance within a predetermined range continues on the basis of an output of the luminance distribution calculation section;

a main object specifying section for specifying, on the basis of the detection result of the continuous region detection section, a main object out of regions in which the luminance within the predetermined range; and a distance measurement calculation section for calculating the distance measurement with respect to the main object which is specified with the main object specifying section.

Furthermore, according to the present invention, there is provided a distance measuring apparatus of a camera comprising:

an area sensor to be used for an auto-focus;

a first judging section for judging whether or not a scene to be photographed is a night scene or not, on the basis of an output of the area sensor;

a second judging section for judging whether or not the scene is a reverse light scene in the case where judgment is made that the scene to be photographed is not the night scene;

a main object specifying section for specifying the main object in the case where judgment is made that the scene to be photographed is either the night scene or the reverse light scene with the first judging section or the second judging section; and a distance measurement calculation section for calculating the distance measurement with respect to the main object which is specified with the main object specifying section.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 5 is a flowchart for explaining an AF operation.

FIGS. 6A through 6E are timing charts for explaining the AF operation.

FIG. 26 is a view showing a high luminance portion compression characteristic of AGC·γ correction section 77a.

FIG. 43 is a luminance histogram showing a distribution of each pixel of the sensor data in the case of the reverse light scene of FIG. 41.

FIG. 73 is a histogram showing a luminance value of the photographing screen corresponding to a scene to be photographed of FIG. 41 in the camera of FIG. 68.

FIG. 74 is a view showing a luminance distribution for each divided area represented by the sensor data by means of a binarizing processing in the camera of FIG. 68.

DETAILED DESCRIPTION OF THE INVENTION

Figure 1:
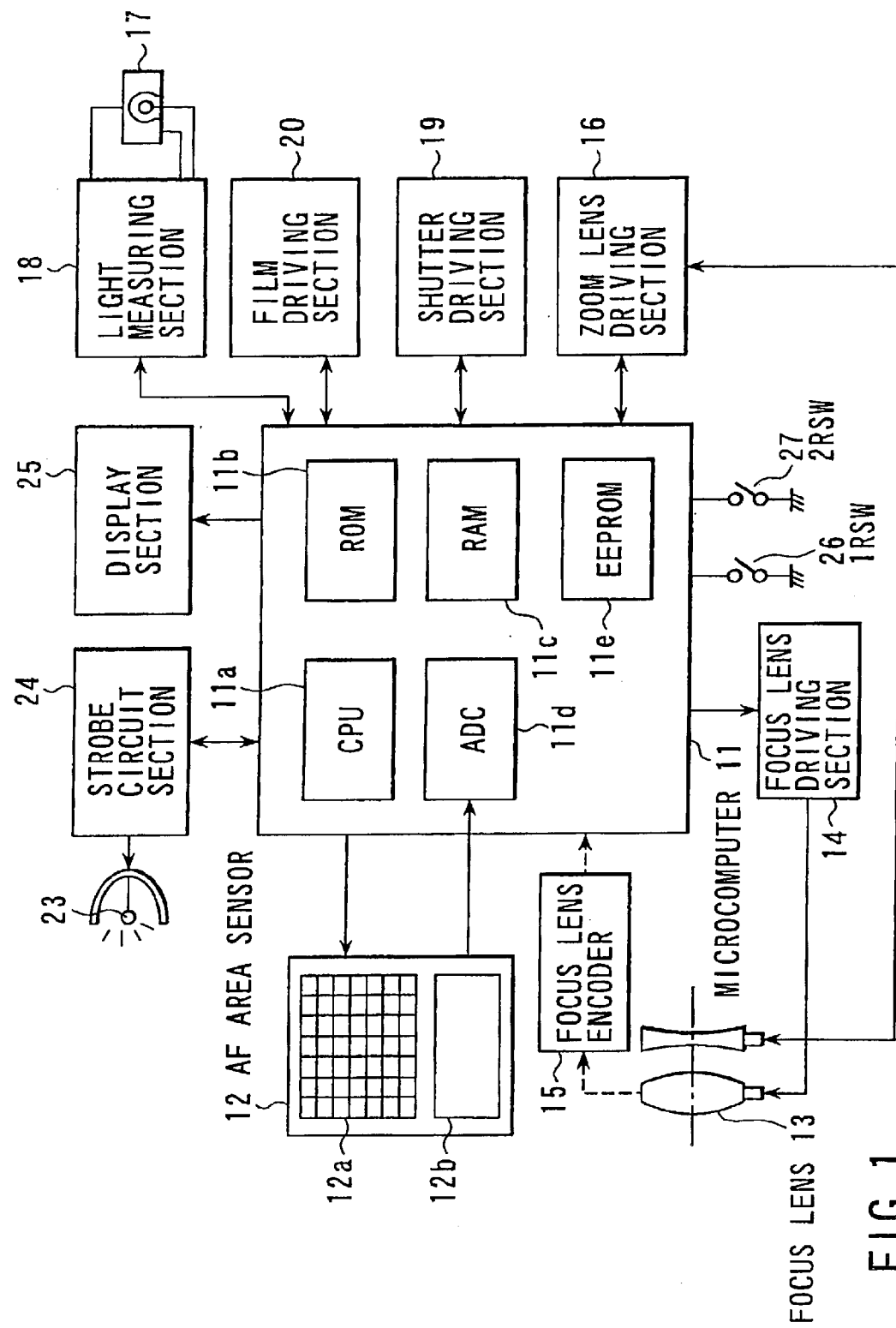
FIG. 1 is a block diagram showing a structure of a camera according to a first embodiment of the present invention.

Reference will be made in detail to the presently preferred embodiment of the invention, as illustrated in the accompanying drawings in which like reference numerals designate like or corresponding parts.

Hereinafter, embodiments of the present invention will be explained by referring to the drawings.

FIG. 1 is a block diagram showing a structure of a camera according to a first embodiment of the invention.

In FIG. 1, a microcomputer 11 is a system controller which commands the control of the whole camera. The microcomputer 11 includes therein a CPU (central processing unit) 11a, a ROM 11b, a RAM 11c, an analog/digital (A/D) converter (ADC) 11d, and EEPROM 11e.

The CPU 11a conducts a series of operation in accordance with a sequence program stored in the ROM 11b.

Furthermore, the EEPROM 11e memorizes auxiliary data with respect to an AF, a light measurement and an exposure calculation or the like for each camera.

To the microcomputer 11, an AF area sensor 12 for photographing an object formed with a distance measuring optical system and converting the object into sensor data which is an electric signal is connected.

This area sensor 12 comprises a group of light receiving elements arranged in two dimensions in the horizontal direction and in the vertical direction which group constitutes a photography area 12a, and a processing circuit 12b of the group of light receiving elements.

Furthermore, to the microcomputer 11, are connected a focus lens driving section 14 for driving a focus lens 13, a focus lens encoder 15 for generating a pulse signal corresponding to a movement quantity of the focus lens 13, a zoom lens driving section 16, a light measuring section 18 having a light receiving element 17 for light measurement, a shutter driving section 19, a film driving section 20, a strobe circuit section 24 having a strobe 23, a display section 25, a first release switch (1RSW) 26 and a second release switch (2RSW) 27.

The microcomputer 11 controls the integration operation of the AF area sensor 12, and the reading of the sensor data, and at the same time, conducts the distance measuring calculation by processing the sensor data.

Then, on the basis of the result of this distance measuring calculation, a driving signal is input to the focus lens driving section 14 from the microcomputer 11, so that an output of the focus lens encoder 15 is monitored to control the position of the focus lens 13.

At the zoom lens driving section 16, a zoom lens operation is conducted with the instruction from the microcomputer 11.

At the light measuring section 18, a light current signal generated by the light receiving element for light measurement is processed to generate the light measurement output.

At the microcomputer 11, this light measurement output is A/D converted by the A/D converter 11d to conduct light measurement exposure calculation.

Furthermore, at the shutter driving section 19, a shutter (not shown) is driven on the basis of an instruction from the microcomputer 11.

At the film driving section 20, film driving operations such as auto-loading, one frame-winding up, and rewinding of the film are conducted.

At the strobe circuit 24, there is provided a function of causing the strobe 23 to emit light as an auxiliary light source at the time of photographing.

The control of charging and light emission at this strobe circuit section 24 is conducted by the microcomputer 11.

Incidentally, the strobe circuit section 24 is operated as an AF auxiliary light at the time of the distance measuring operation.

Then, the display section 25 displays information inside the camera with a display element such as an LCD or the like, and is controlled with the microcomputer 11.

The first release switch 26 and the second release switch 27 are switches which cooperate with a release button not shown.

The pressing down at the first step of release button turns on the first release switch 26 followed by the pressing down the release button at the second step, which turns on the second release switch 27.

Then, the first release switch 26 and the second release switch 27 are controlled with the microcomputer 11 in such a manner that the turning-on of the first release switch 26 allows a light measuring operation, and the turning-on of the second release switch 27 allows the exposure operation and the film winding up operation.

Next, a distance measuring optical system will be explained.

Figure 2A:
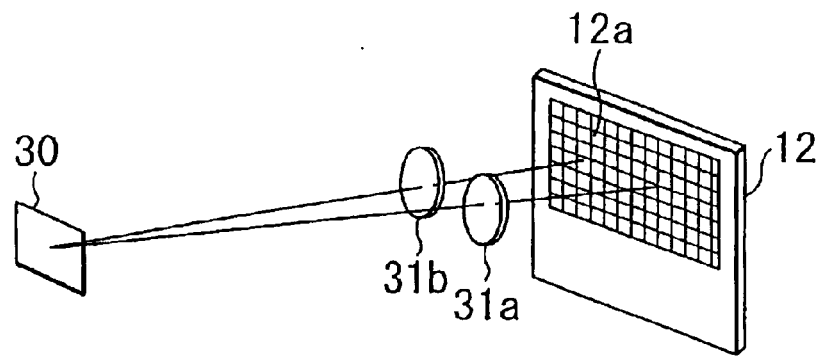
FIGS. 2A and 2B are views showing an arrangement of an optical system of FIG. 1 and an area sensor 12.
Figure 2B:
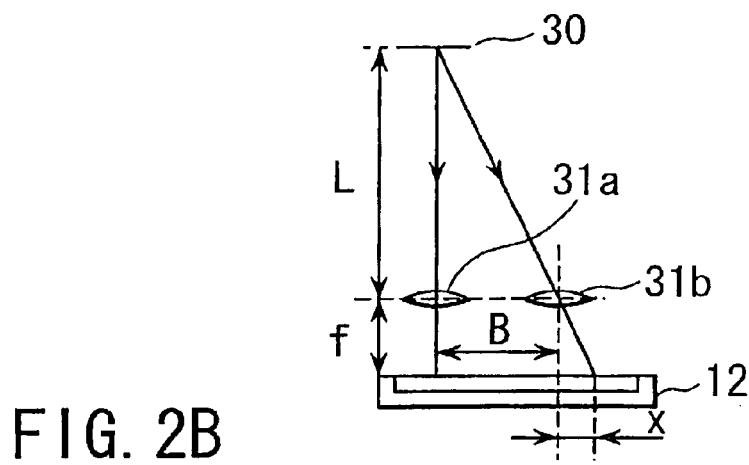

FIG. 2 is a view showing an arrangement of the optical system and the AF area sensor 12.

Incidentally, here, a so-called passive method will be explained wherein the distance is measured with an image signal of the object.

In the passive method, light receiving lenses 31a and 31b are arranged in an interval of a length of the base line B at the time of measuring a distance to the object, so that the image of the object 30 is divided into two images to form the images on the pickup area 12a of the AF area sensor 12.

The relative position difference x of the two images is determined from a focus distance f of the light receiving lens, the base line length B on the basis of the triangulation principle, and the distance L of the object is determined from the following equation (1).

$$L=(B \cdot f)/x \tag{1}$$

Figure 3:
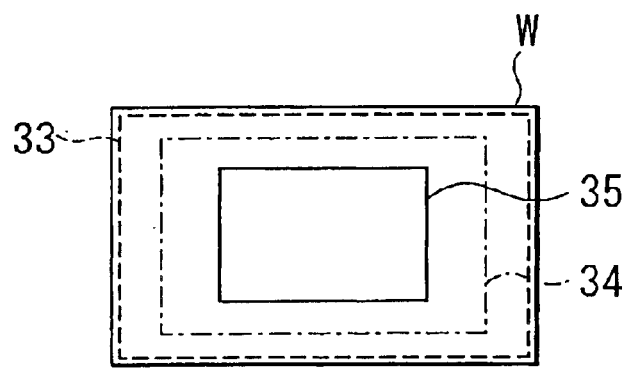
FIG. 3 is a view showing a relationship between a photographing screen (a wide-angle screen and a telephoto screen) and a distance measurement area.

FIG. 3 is a diagram showing a relationship between a photographing screen (a wide-angle screen 33 and a telephoto screen 34) and a distance measurement area 35.

Since an external light passive method is adopted in the distance measurement, a paradox is present between the photographing screen and the distance measurement area.

As shown in FIG. 3, each area of the standard, the telephoto screen and the wide-angle screen photographing screens 34, 35 and 36 differs with respect to the detection area (distance measurement area) 33 of the AF area sensor 12.

As a consequence, an area to be used for the distance measurement is restricted in accordance with the focus distance information (zoom information) of the photographing optical system.

The distance measurement area position correction data corresponding to the change in such focus distance is stored in advance in EEPROM 1e and is developed in the RAM 1c together with the initialization of the microcomputer 11.

This auxiliary data is referred to in accordance with the zooming operation, so that the distance measurement area is determined which is used in the distance measuring operation within the pickup area of the AF area sensor 12.

The distance measuring calculation is conducted with the sensor data in the range of this distance measurement area.

Furthermore, a control signal is output from the microcomputer 11 in such a manner that a peak monitor for the integration control corresponding to the inside of the distance measurement area is generated for the AF area sensor 12.

Then, a peak signal within the range of the designated distance measurement area is output to the microcomputer 11 from the AF area sensor 12.

At the microcomputer 11, this monitor signal is referred to, so that the integration quantity is controlled to be a predetermined level (see FIG. 6).

In this manner, the influence of the object is not received on the outside of the photographing screen.

Incidentally, at the time of reading the sensor data, the correction data in the distance measurement area corresponding to the photographing screen is referred to thereby jumping the reading of the sensor data outside of the photographing screen that is not required so that such data is not stored in the RAM 1c.

Otherwise, the reading range setting signal is output to the AF area sensor 12 so that only necessary data is output.

Figure 4:
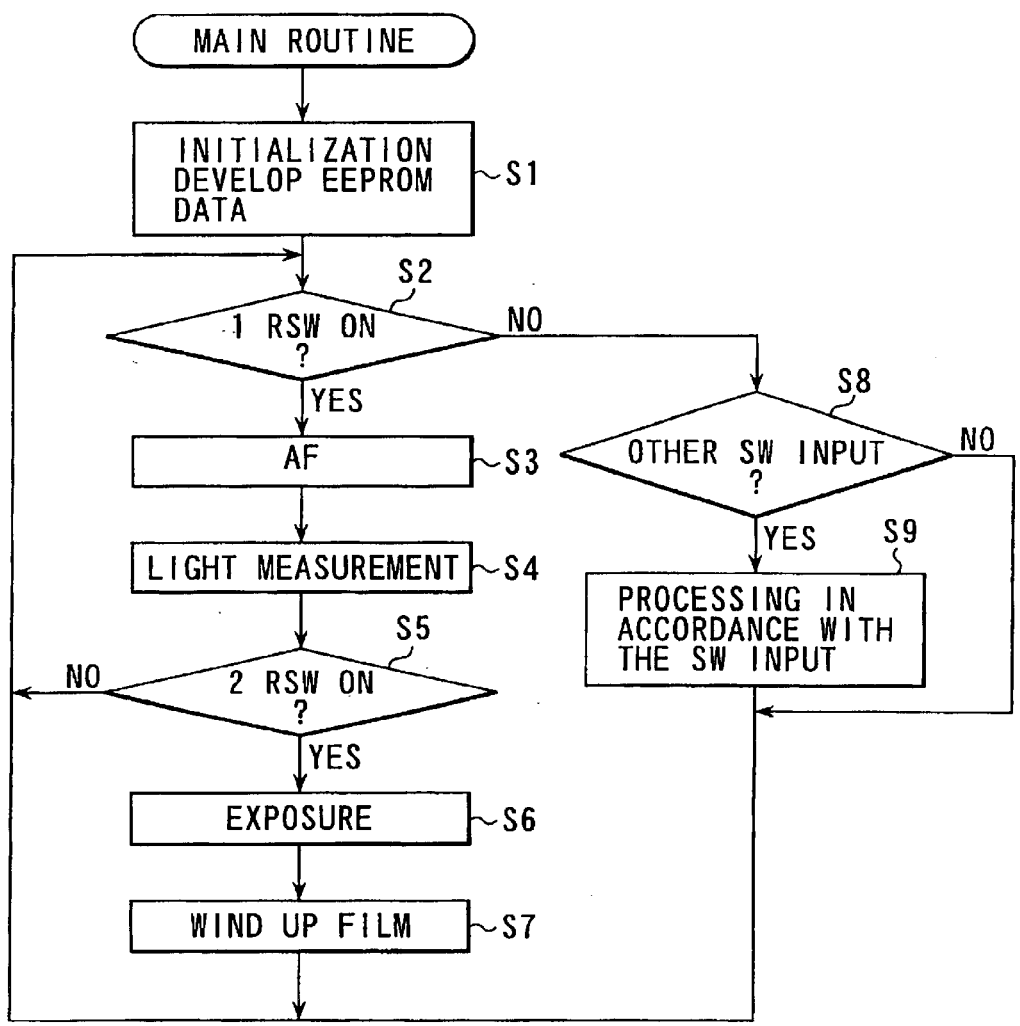
FIG. 4 is a flowchart for explaining a main routine of the camera according to the first embodiment of the invention.

Next, a main routine of the camera according to the embodiment will be explained by referring to a flowchart of FIG. 4.

When a power source switch not shown is turned on, or when a battery is loaded in the camera, the operation of the microcomputer 11 is started, so that a sequence program stored in the ROM 11b is conducted.

That is, in the beginning, at step S1, the microcomputer 1 initializes each block inside of the camera.

Then, at the same time, the data stored in the EEPROM 11e is developed in the RAM 11c.

Next, at step S2, the microcomputer detects the state of the first release switch 26.

Here, unless the first release switch 26 is turned on, the microcomputer 11 proceeds to step S8.

At the above step S2, when the first release switch is turned on, the microcomputer 11 proceeds to step S3 to conduct the AF operation. The microcomputer then proceeds to step S4 and performs a light measurement operation.

Then, at step S5, the microcomputer 11 detects the state of the second release switch 27. Here, in the case where the second release switch 27 is not turned on, the microcomputer 11 proceeds to step S2. On the other hand, when the second release switch 27 is turned on, the microcomputer 11 proceeds to step S6 to allow the film to be exposed with a shutter operation.

Next, at step S7, the microcomputer 11 allows the film to be wound up for one frame, and then, the microcomputer 11 proceeds to step S2.

At step S8, the microcomputer 11 detects the input state of the switches other than the first release switch 26 and the second release switch 27. In the case where no other switch is input, the microcomputer 11 proceeds to step S2. On the other hand, in the case where a switch other than the first release switch 26 and the second release switch 17 is input, the microcomputer 11 proceeds to step S9 to conduct the processing in accordance with the input of the switch.

For example, the microcomputer 11 conducts a zoom-up operation and a zoom-down operation in accordance with the up and down input of the zoom switch.

After that, the microcomputer 11 proceeds to the above step S2.

Next, the AF operation will be explained by referring to the flowchart of FIG. 5 and the timing chart of FIGS. 6A through 6E.

In the beginning, at step S11, a integration control signal is output from the AF area sensor 12, and a integration operation is conducted.

A monitor signal corresponding to the output of the peak (the brightest pixel) within the predetermined range is output from the AF area sensor 12.

Summing time is adjusted so that the light receiving quantity at the light receiving section of the AF area sensor 12 becomes appropriate while this monitor signal is referred to (FIGS. 6A and 6B).

Next, at step S12, a reading clock CLK is output to the AF area sensor 12.

In this manner, the sensor data (pixel data) is output to an A/D converter 11*d*. Here, after the sensor data is A/D converted and read, the data is stored in RAM 11*c*. (see FIGS. 6C and 6D).

Then, the night scene judgment routine is started at step S3.

Subsequently, at step 14, judgment is made as to whether the scene is a night scene or not.

Here, when the scene is the night scene, the microcomputer 11 proceeds to step S15 to conduct the night scene processing.

On the other hand, when the scene is not the night scene, the microcomputer 11 proceeds to step S16 to conduct a normal operation.

Thereafter, when the focus lens 13 is operated at step S17, the microcomputer 11 passes through this routine.

Incidentally, at the above step S13 through S16, the sub-routine of the "night scene judging processing" is constituted.

Next, by referring to FIGS. 6A through 6E and FIG. 7, the night scene judgment and the processing routine will be explained.

Figure 7:
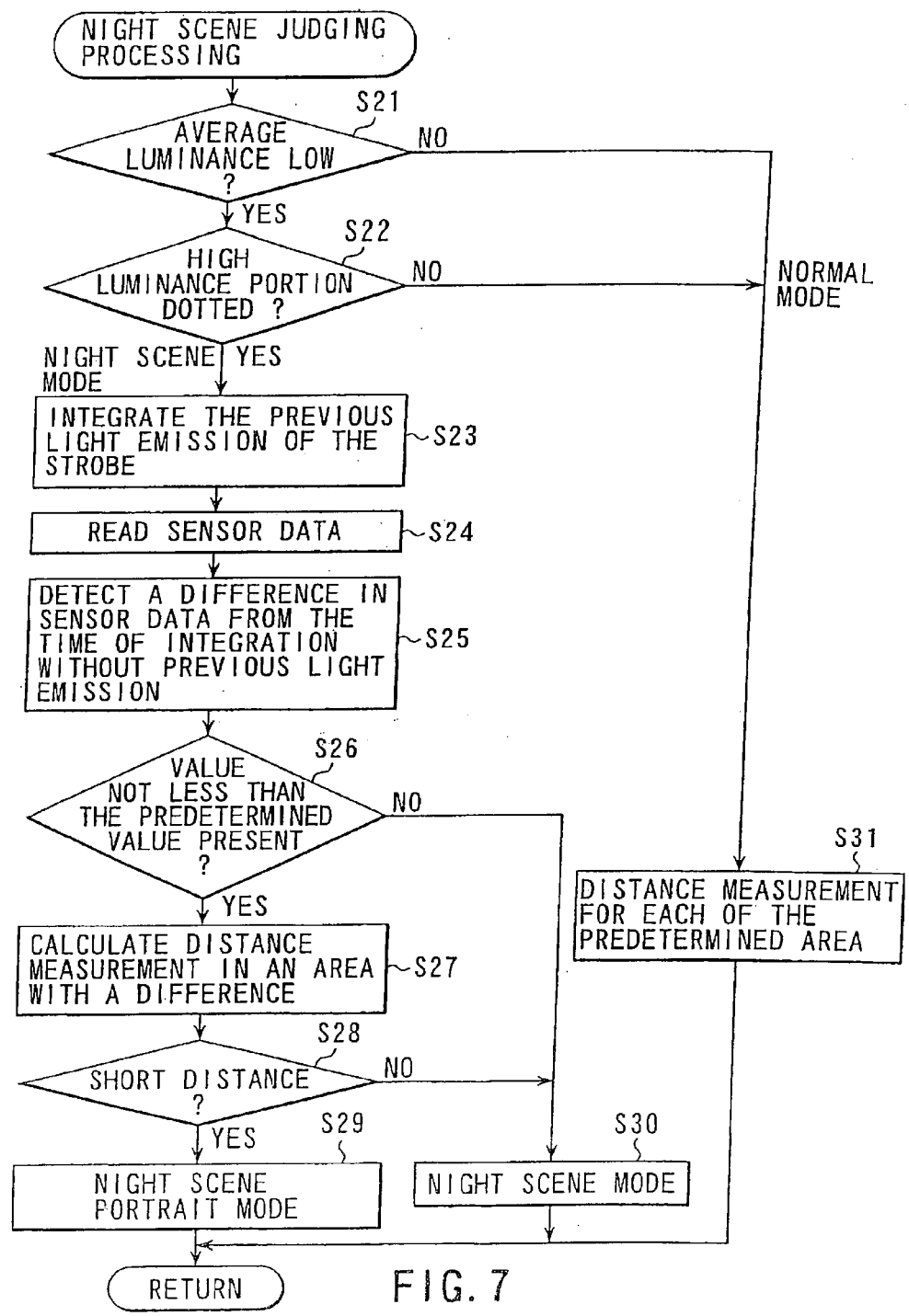
FIG. 7 is a flowchart for explaining an operation of a sub-routine of the "night scene judging processing".

FIG. 7 is a flowchart (corresponding to the steps S13 through S16 of FIG. 5) for explaining an operation of the sub-routine of the "night scene judging processing".

In the beginning, at step S21, judgment is made as to whether the luminance is low or not.

An average value of luminance data of each pixel is obtained from the sensor data of the whole photographing area of the AF area sensor 12 and the integration time, thereby it is judged whether or not the luminance is low by judging whether or not the average value is lower than a predetermined value.

Furthermore, at step S22, the distribution of the high luminance pixel is examined.

Here, a pixel of sensor data showing a value larger than the predetermined level is picked up.

Then, judgment is made as to whether there are many areas where the distribution continues, the areas having a square measurement smaller than the predetermined value.

When both steps S21 and S22 satisfy the condition, judgment is made that the mode is the night scene mode so that the microcomputer 11 proceeds to step 23 of the night scene mode.

When either step S21 or step S22 does not satisfy the condition, judgment is made that the mode is the normal mode, so that the microcomputer 11 proceeds to step S31.

At step S23, the strobe 23 is forced to conduct previous light emission with the strobe circuit section 24.

Then, at the timing, the AF area sensor 12 is forced to conduct integration operation, so that reflection light from the object by the previous light emission of the strobe is detected (see FIGS. 6A and 6B and 6E).

Next, at step S24, the sensor data is read from the AF area sensor 12 (see FIG. 6C).

At step S25, a difference is determined between the sensor data at the time of the normal integration without the previous light emission and the sensor data at the time of the integration with the previous light emission.

Then, at step S26, judgment is made as to whether there is a difference exceeding the predetermined value is present with respect to each of the predetermined distance measurement area.

Figure 14:
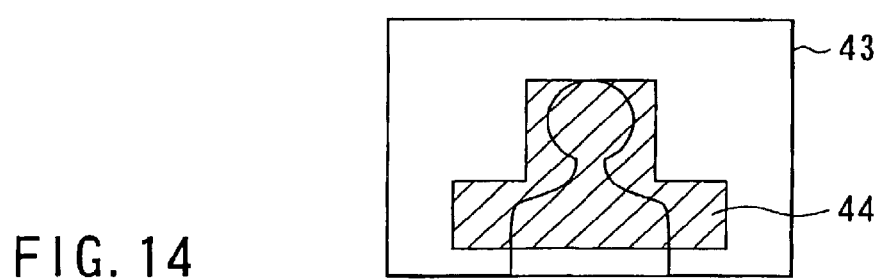
FIG. 14 is a view showing a distance measurement area selected with respect to the screen to be photographed in the case where an object such as a person or the like is present in a short distance.

Here, with respect to the area having a large difference in the sensor data, the microcomputer 11 proceeds to step 27 to conduct known distance measuring operation (see FIG. 14).

On the other hand, when a predetermined value or more is not given, the microcomputer 11 proceeds to step S30.

Next, at step S28, judgment is made as to whether the result of the distance measurement is a short distance or not. Here, in the case of the short distance, the microcomputer 11 proceeds to step S29. Then, as the exposure mode, the so-called night scene portrait mode is set wherein a person is photographed against the background of the night scene.

In the night scene portrait mode, the strobe light is applied to the object, so that the main object in a short distance is subjected to an appropriate exposure, and at the same time, the exposure time is set to be long at the shutter so that the night scene at the background is also subjected to the appropriate exposure.

In the case where the object is not located in the short distance at step S28, and in the case where there is no difference exceeding the predetermined value at step S26, the microcomputer 11 proceeds to step S30 to set the normal night scene mode for conducting a normal night scene photographing operation.

In the case of the normal night scene mode, the strobe 23 is not forced to emit light as an exposure mode, and the exposure time of the shutter is set to be long so that an appropriate exposure is provided to the night scene.

Furthermore, in the case where the mode is not the night scene mode, the distance measuring calculation for each of the predetermined areas which has been determined in advance is conducted at step S31 as a normal mode, the result of the distance measurement on the side of the short distance is selected.

Next, a method for judging the night scene will be explained.

Figure 8:
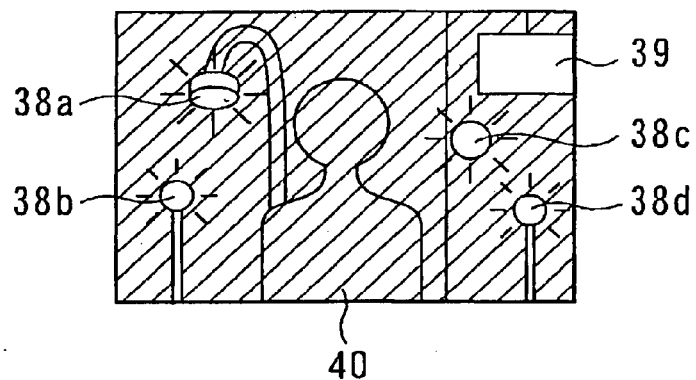
FIG. 8 is a view showing a typical scene for photographing a person against the background of a night scene.

FIG. 8 shows a typical night scene photographing operation in which persons are photographed against the background of a night scene.

In this case, street lights 38*a* through 38*d*, neon signs 39 and the like are arranged at the back of the main object 40.

Figure 9:
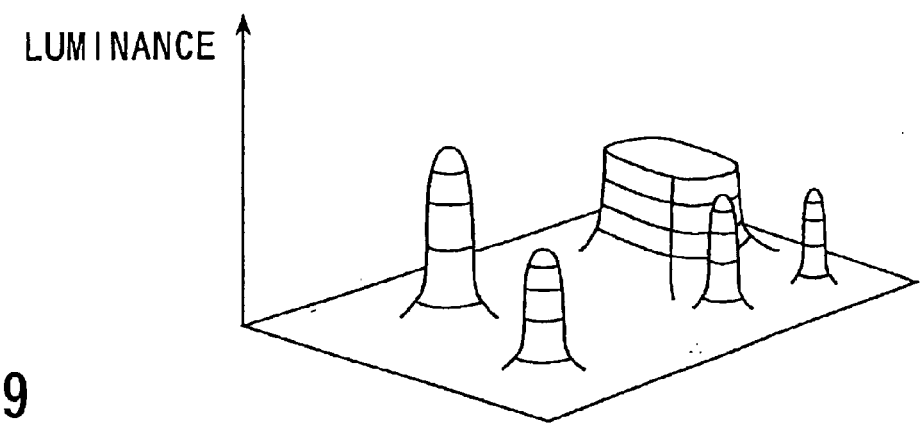
FIG. 9 is a view showing sensor data of an AF area sensor 12 in a three-dimension manner in a scene to be photographed as shown in FIG. 8.

FIG. 9 is a view showing in a three dimension manner the sensor data of the AF sensor area 12 in such photography scene.

Consequently, judgment of the night scenes has the following characteristic.

In other words, (a) The scene has generally a low luminance. In this case, the luminance for each pixel or the luminance for each predetermined area is determined, followed by calculating the average value thereof to compare the average value with the predetermined value.

(b) The high luminance portion is small in area, and dotted.

(c) The low luminance portion occupies a large range in area.

Figure 10:
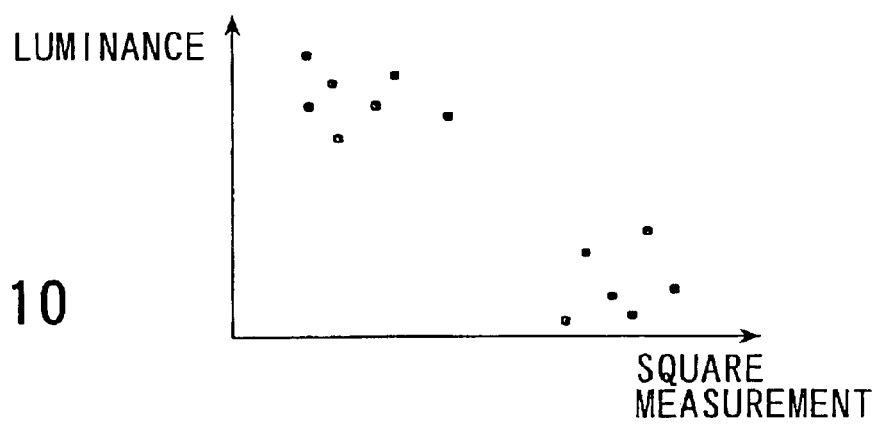
FIG. 10 is a distribution view showing a relationship between the luminance and the area by calculating a square measurement of a high luminance portion and a square measurement of a low luminance portion that continue to each other.

FIG. 10 is a distribution view showing a relation-ship between the luminance and the area by calculating the areas of the high luminance portion and the low luminance portion which continue.

As shown in FIG. 10, the night scene is judged from a ratio of the areas of the high luminance portion and the low luminance portion.

Figure 11:
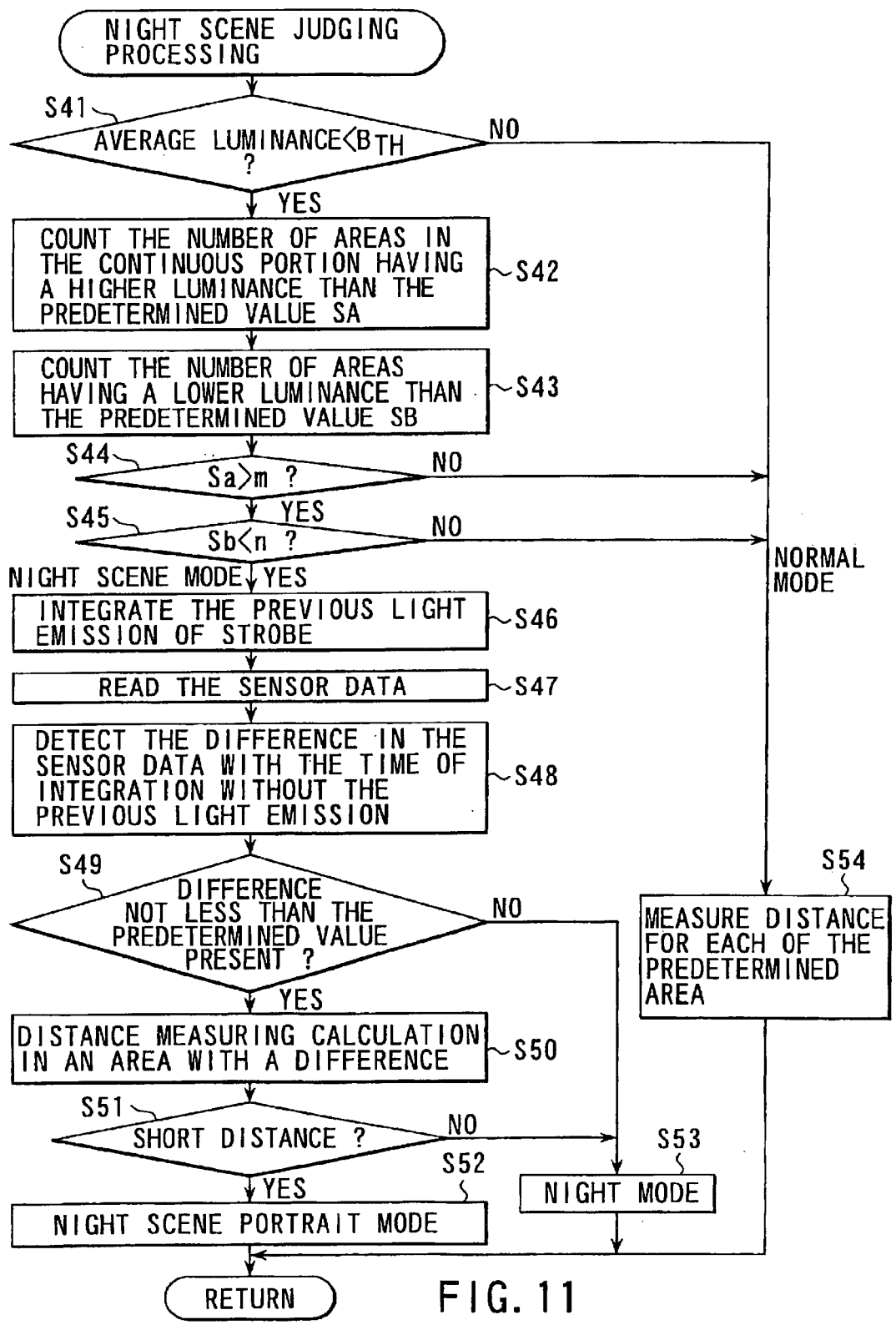
FIG. 11 is a flowchart for explaining another operation example of the sub-routine of the "night scene judging processing".

Next, another operation example will be explained as to the sub-routine of the "night scene judging processing" by referring to the flowchart of FIG. 11.

In the beginning, at step S41, the average luminance and the predetermined thresh Bth are compared.

Subsequently, at step S42, the number of portions is counted where the pixels continue which have a higher luminance than the predetermined value (Sa), which is then followed by the subsequent step S43 at which the number of portions is counted where the pixels continue which have a lower luminance than the predetermined value (Sb).

Then, at step S44, the above number Sa of the areas and the predetermined judgment value m are compared, which is followed by the subsequent step S45 at which the above number Sb of the areas and the predetermined number n are compared.

At the above steps S44 and S45, in the case where the conditions of Sa>m and Sb>n are satisfied, judgment is made that the scene is the night scene so that the mode becomes the night mode.

In other cases, judgment is made that the scene is other than the night scene, and the mode becomes a normal mode.

The processing operations at the subsequent steps S46 through S53 for conducting the night scene mode and the normal mode, and at step 54 are the same as the operations at the steps S23 through S30 and step S31, and explanation thereof is omitted.

Here, the aforementioned night scene portrait mode and the normal night scene mode will be explained.

Figure 12:
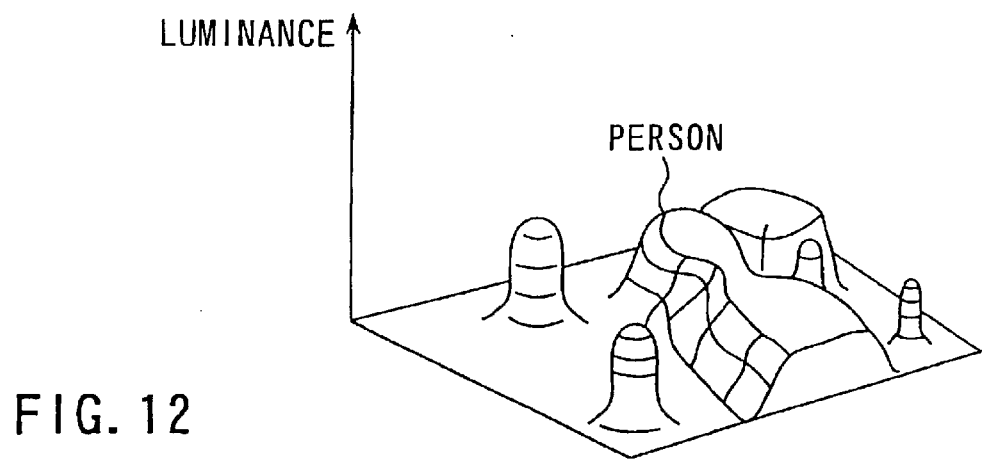
FIG. 12 is a view showing AF area sensor data in a three-dimension manner in the case where a strobe is forced to emit light in advance in the scene to be photographed, so that the AF area sensor 12 conducts a integration operation.

FIG. 12 is a view showing in a three-dimension manner AF area sensor data in the case where the AF area sensor 12 is integrated by conducting the previous light emission of the strobe in the photographing scene as shown in FIG. 9.

Figure 13:
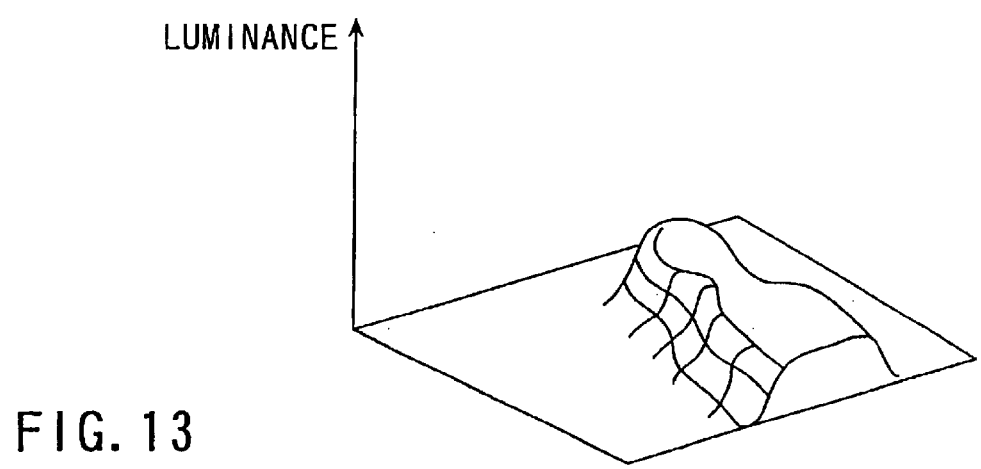
FIG. 13 is a view showing data obtained by comparing data with previous light emission with data without previous light emission in a three-dimension manner so that a portion corresponding the difference between the two data is extracted.

Furthermore, FIG. 13 is a view showing in a three-dimension manner data extracted from a portion where there is a difference between the data without the previous light emission and the data with the previous light emission by comparing the two data.

At the peak value of the luminance, both data is standardized, so that the difference is taken between the two with respect to the corresponding sensor data or each area.

In this manner, in the case where the object such as a person is present in the short distance, a difference is generated in the image. Thus, judgment is made that the main object is present in this portion (the night scene portrait mode).

Then, only with respect to the area 44 in which the difference is generated, the distance measuring calculation is conducted (see FIG. 14).

Next, a second embodiment of the present invention will be explained.

This second embodiment is a variation of the night scene judgment method in the first embodiment which has been described above.

Figure 15:
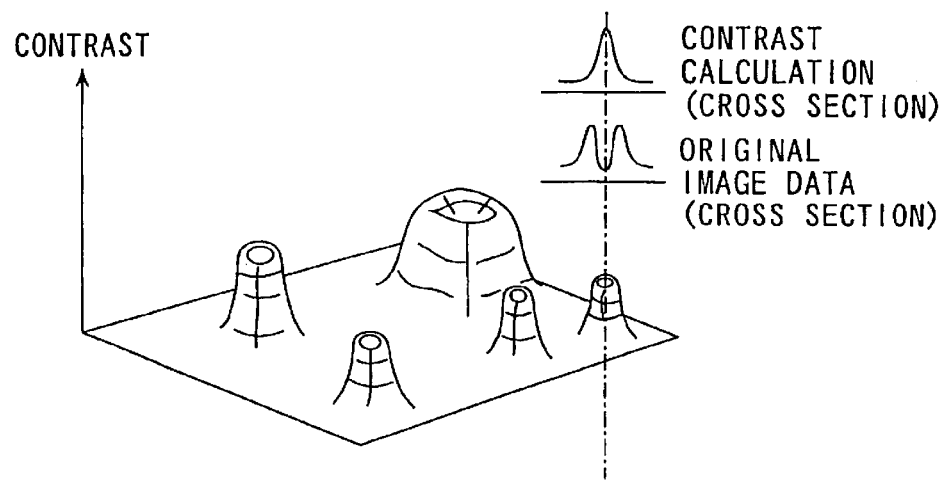
FIG. 15 is a view for explaining a second embodiment of the present invention, the view showing a contrast distribution of the AF area sensor data.

FIG. 15 is a view showing a contrast distribution of the AF area sensor data.

As a concrete contrast value, the sum of the absolute values of the difference between the sensor data of one pixel and the sensor data of the peripheral pixel is calculated with respect to each pixel, so that the above contrast values are summed with respect to areas corresponding to the photographing screen.

In the case of the night scenes, the luminance difference between the high luminance portion and the low luminance portion is so large that the contrast becomes large in this manner.

In other words, (d) the average luminance is low (which is the same as the above item (a)), and (e) the sum of the contrast within the photographing screen is larger than the predetermined value.

The sum of the contrast for each predetermined area is determined, and the contrast is integrated in all the areas corresponding to the photographing screen, so that the contrast is compared with the predetermined value.

Figure 16:
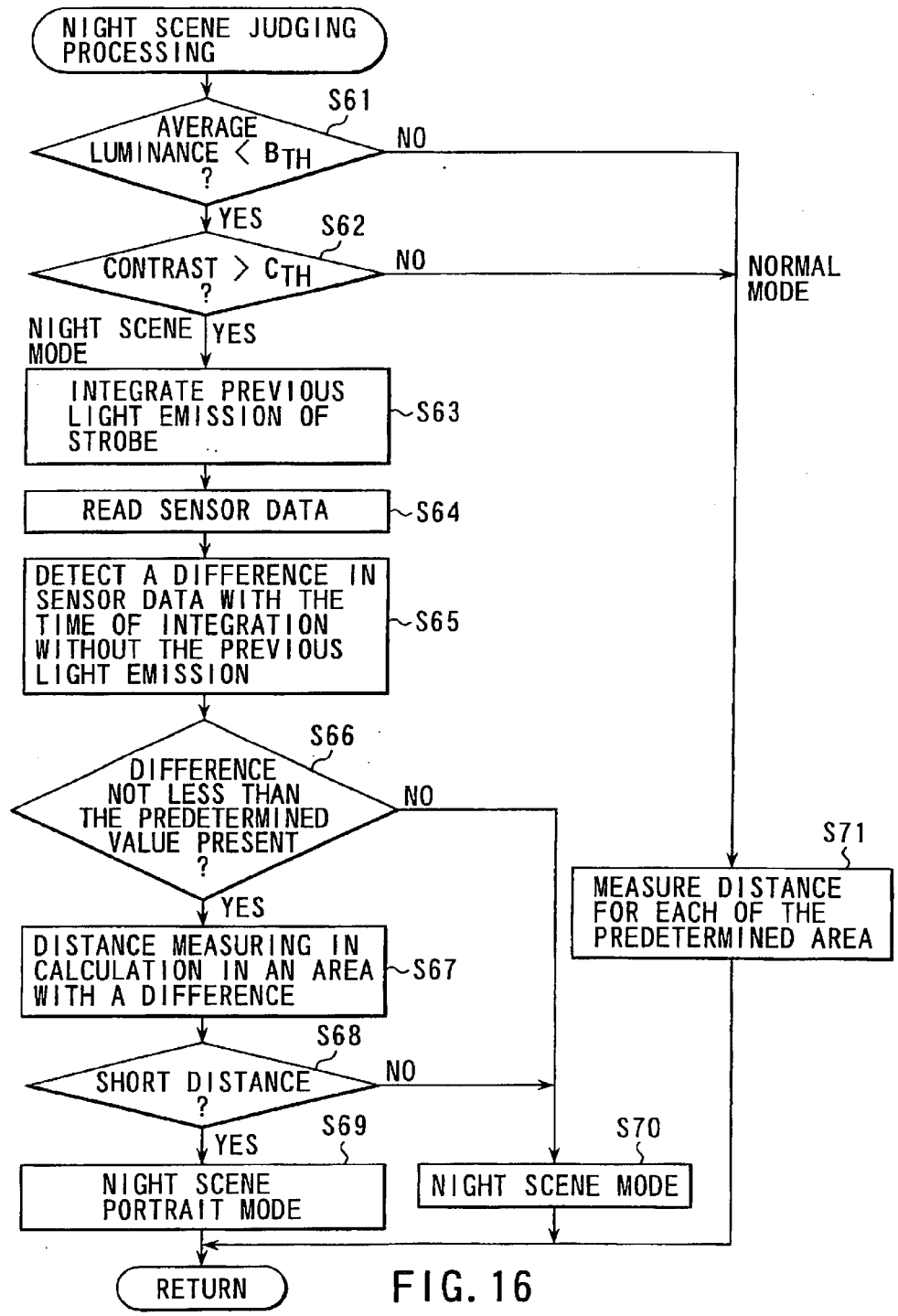
FIG. 16 is view for explaining an operation of the sub-routine of the "night scene judging processing" according to the second embodiment.

Next, an operation of the sub-routine of the "night scene judging processing" in the second embodiment will be explained by referring to the flowchart of FIG. 16.

In the beginning, at step S61, the average luminance and the predetermine value Bth are compared.

Next, at step S62, the contrasts of the whole photographing screen and the predetermined thresh Cth are compared.

At step S61 and S62, the conditions of the average value<Bth, and the contrast>Cth are satisfied, judgment is made that the scene is the night scene. Otherwise, the mode is set to the normal mode.

Since the processing operation at steps S63 through S70 and step S71 for conducting the subsequent night scene mode and the normal mode is the same as steps S23 through S30 and step S31 in the flowchart of FIG. 7 described above, the explanation thereof is omitted.

Next, a third embodiment of the present invention will be explained.

This third embodiment is different from the first embodiment in the judgment of the night scene portrait mode and the normal night mode.

Figure 17:
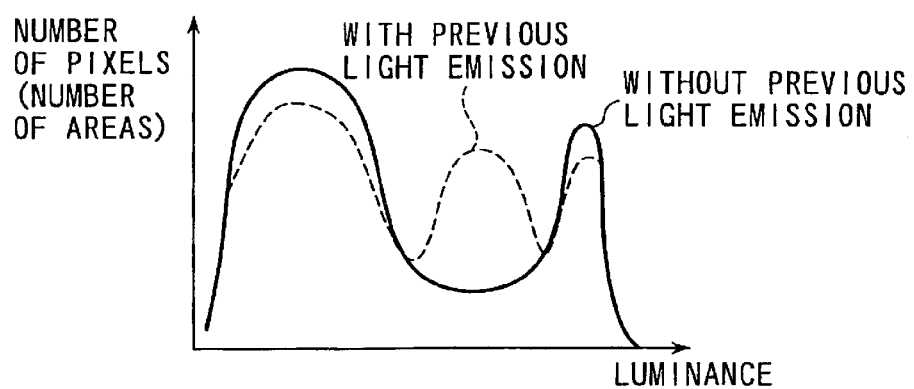
FIG. 17 is a graph for explaining a third embodiment of the present invention, the graph showing a relationship between the luminance and the number of pixels (or the number of areas) having the corresponding luminance.

FIG. 17 is a graph showing a relationship between the luminance and the number of pixels (or the number of areas) having the corresponding luminance.

As shown in FIG. 17, in the night scene, the distribution is deviated to the low luminance portion and the high luminance portion, so that the distribution of the medium luminance portion is small.

In the case where the main object is present in the short distance, the distribution is different between the case without the previous light emission and the case with the previous light emission. In the case where the previous light emission is present, the medium luminance portion increases (the portion shown by the broken line in the drawings).

In the case where the object is not present in the short distance, virtually no change in the above distribution can be seen.

From the above, the following judgment can be made.

(f) In the case where the distribution is deviated to the high luminance portion and the low luminance portion, and the distribution is small in the medium luminance portion, judgment is made that the scene is the night scene.

(g) In the case where there is a change in the distribution between the case without the previous light emission and the case with the previous light emission, judgment is made that a person is photographed against the background of the night scene.

(h) In the case where no change is observed in the distribution between the case without the previous light emission and the case with the previous light emission, judgment is made that the scene is a normal night scene for photographing a normal night scene.

Figure 18:
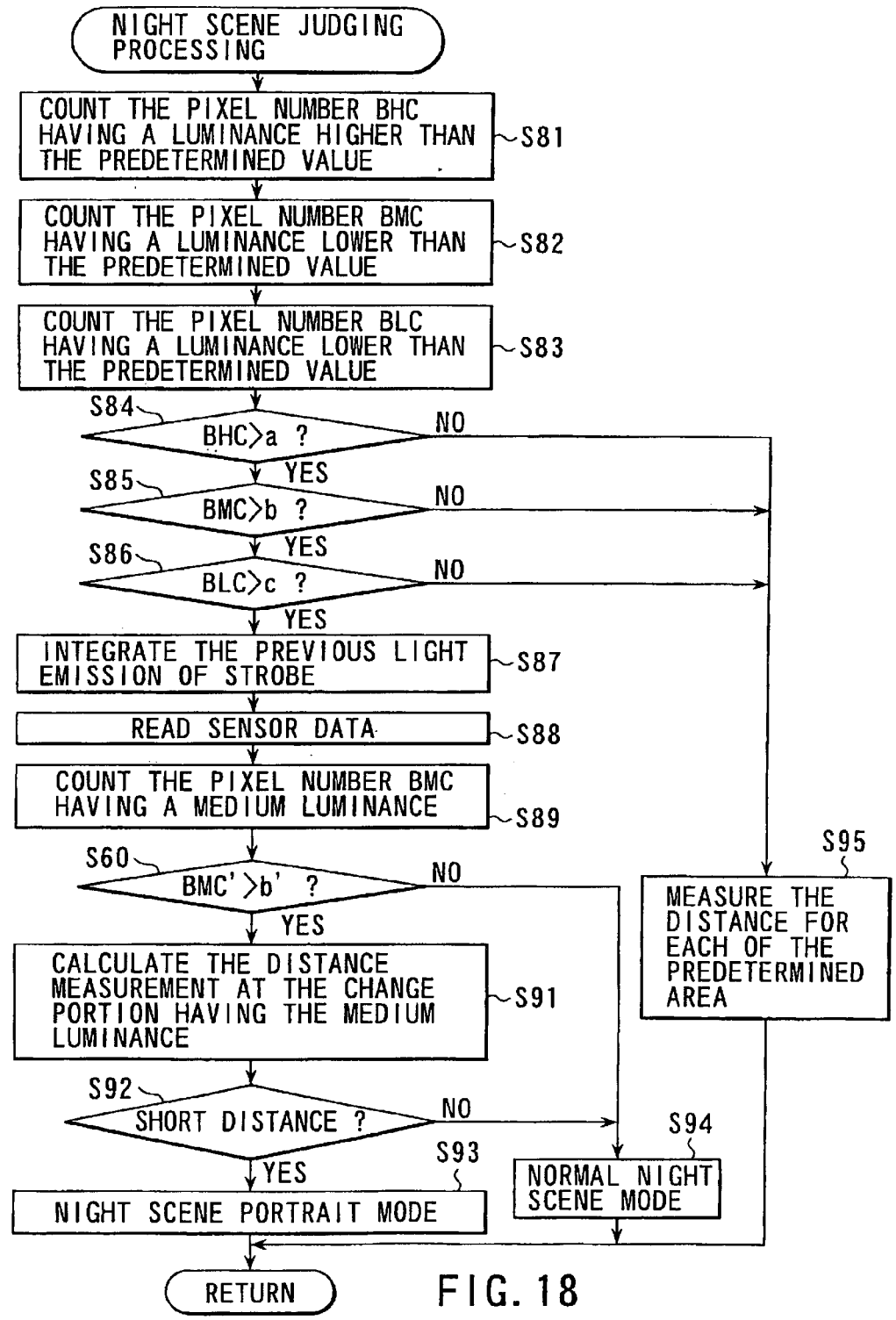
FIG. 18 is a flowchart for explaining the operation of the sub-routine of the "night scene judging processing" according to the third embodiment.

Next, an operation of a sub-routine of the "night scene judging processing" in the third embodiment will be explained by referring to the flowchart of FIG. 18.

At step S81, in the beginning, the number of pixels having a higher luminance than the predetermined value is counted out of the distance measurement areas corresponding to the photographing screens, so that the BHC is set.

Subsequently, at step S82, the number of pixels included in the predetermined medium luminance range is counted in a similar manner, so that BMC is set.

Furthermore, at step S83, the number of pixels having a lower luminance than the predetermined value is counted, so that BLC is set.

Then, at steps S84, S85 and S86, the BHC, BMC and BLC are compared with predetermined values a, b and c respectively.

At steps S84 through S86, in the case where the conditions of BHC>a, BMC<b and BLC<c are satisfied, judgment is made that the scene is the night scene and the night scene mode is set.

Consequently, at step 87, the integration of the AF area sensor 12 is conducted while the strobe is forced to conduct the previous light emission.

Next, at step S88, the sensor data is read with the AF area sensor 12.

Furthermore, at step S89, the number of pixels having a medium luminance is counted from the distance measurement area corresponding to the photographing screen, so that BMC' is set.

Next, at step S90, the above BMC' is compared with the predetermined value b'.

Here, in the case of BMC'>b', judgment is made that the object is present in front of the night scene, the microcomputer proceeds to step S91 to conduct the distance measuring calculation in the area where the medium luminance pixel has increased.

Furthermore, at step S92, judgment is made whether or not the object is present in the short distance from the result of the distance measuring calculation.

As a consequence, in the case where the object is in the short distance, the microcomputer proceeds to step S93, so that the mode is set to the night scene portrait mode.

At step S90, in the case where BMC⁻>b' is not established, and at step S92 in the case where the distance is not in the short distance, the microcomputer 111 proceeds to step S94 so that the mode is set to the normal night scene mode.

At steps S84 through S86, in the case where any of the conditions is not satisfied, judgment is made that the mode is a normal mode, so that the microcomputer 11 proceeds to step S95.

Then, a distance measuring calculation for each of predetermined areas is conducted.

Here, there will be explained a new auto-focus technology which is referred to as the super combination AF by referring to FIG. 19.

Incidentally, the super combination AF is not a simple hybrid combination of the active style and the passive style, but is a method which allows the detection of the main object by using the two styles.

Figure 19A:
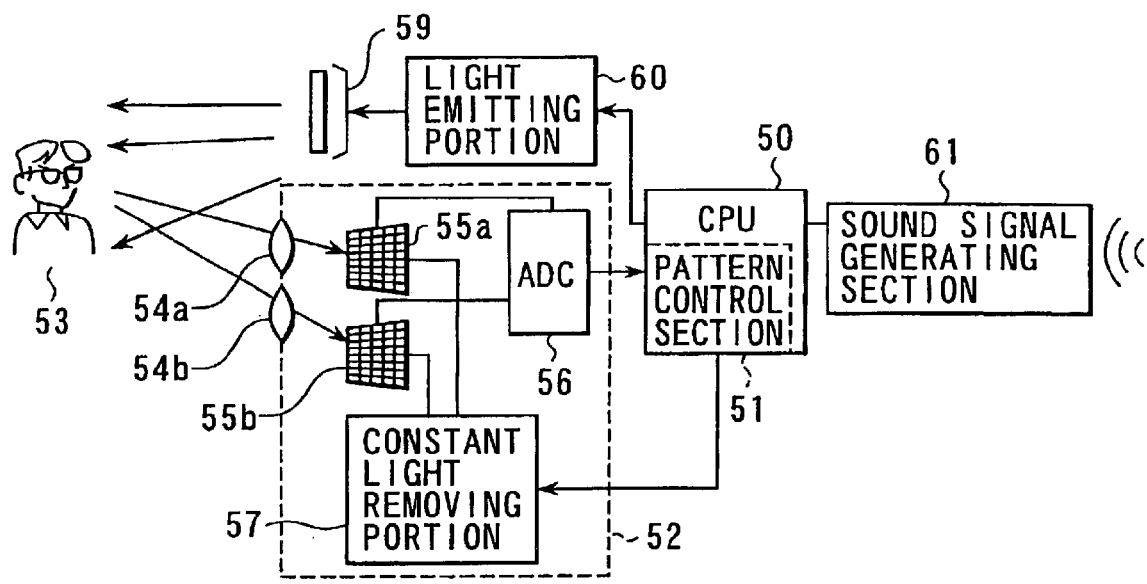
FIGS. 19A and 19B are views for explaining a new auto-focus technology which is referred to as super combination AF.

FIG. 19A is a block diagram showing a structure of a main portion, the view showing a state in which the distance of the object is measured with this method of the AF.

In FIG. 19A, a CPU 50 comprises a microcomputer for controlling the camera. The CPU 50 has a pattern control section 51 inside thereof.

Furthermore, the CPU 50 is connected to the light measuring section 52.

This light measuring section 52 has two light receiving lenses 54a and 54b for guiding light from an object, two area sensors 55a and 55b for receiving light from the main object 53, an A/D converter (ADC) 56 and a constant light removing circuit 57.

Furthermore, to the CPU 50, a light emitting section 60 for controlling the light emission from the light source 59 and a sound signal generating section 61 are connected.

In FIG. 19, light from the object 53 which is incident from the two light receiving lenses 54a and 54b are allowed to be incident on two area sensors 55a and 55b.

At these area sensors 55a and 55b, the image of the object is received and photo-electrically converted.

Then, the output is converted into a digital value of each pixel at the A/D converter 56 to be supplied to the CPU 50.

Furthermore, when the constant light removing circuit 57 connected to area sensors 55a and 55b is controlled, a direct current light signal component is removed which is incident from the object in a constant manner.

As a consequence, only the pulse light from the light source 59 can be obtained as an output signal.

Figure 19B:
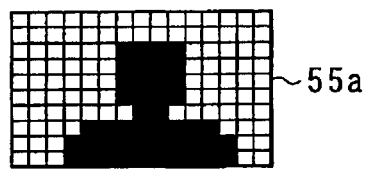

Consequently, when the CPU 50 controls the light-emitting portion 60 to apply light to the light source 59 or the like in the state in which the constant light removing circuit 57 is activated, the reflection light comes back from the object 53 with the result that an image shown in FIG. 19B is formed on the area sensor 55a.

FIG. 19B is a view showing the state in which light is incident on the black portion.

Software for analyzing a pattern of an image on such area sensor is incorporated in the CPU 50. When judgment is made that the image has a form of a person, the image can be considered as a main object.

Figure 20:
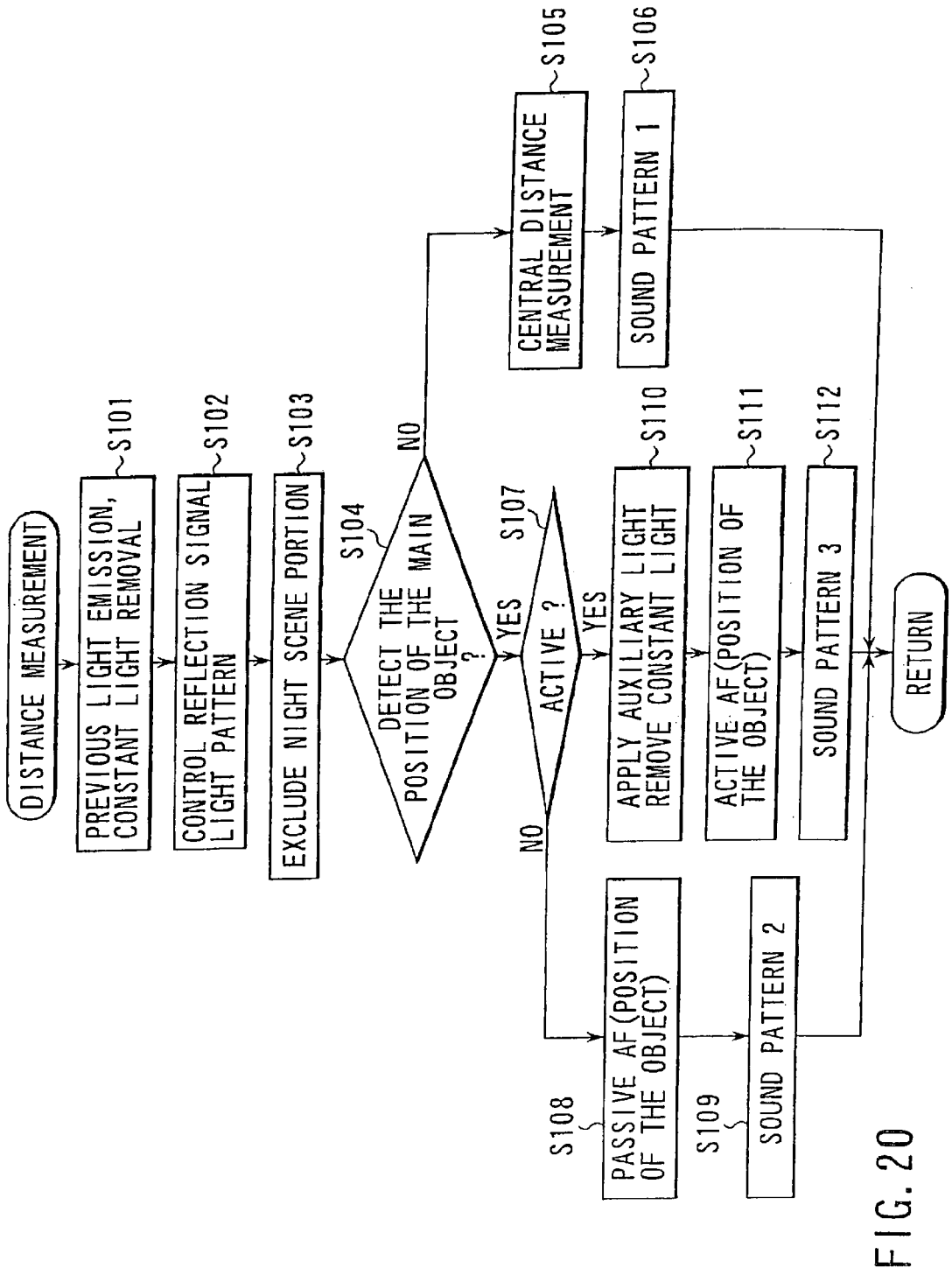
FIG. 20 is a flowchart for explaining an operation of a distance measurement in the super combination AF.

Consequently, a distance measuring operation in accordance with a flowchart shown in FIG. 20 is considered.

In the beginning, at step S101, light is applied to the light source 59 prior to the distance measurement. Only the pattern of the reflection signal light is taken out with the constant light removing circuit 57 as shown in FIG. 19B.

Next, at step S102, the pattern of the reflection signal light is discriminated. Furthermore, at step S103, the night scene portion is excluded.

Then, at step S104, judgment is made as to whether or not the pattern is the main object from the shape of a person or the like.

Here, in the case where the main object is not detected, the microcomputer 11 proceeds to step S105. Then, the luminance information or the like is added, and either the active style AF or the passive style AF is selected with the result that in the distance measurement an emphasis is placed on the central portion of the screen where the probability that the object is present is high.

Next, at step S106, a sound which coincides with the central distance measurement is generated with the sound signal generating section 61.

On the other hand, at step S104, in the case where the main object is detected, the microcomputer 11 proceeds to step S107 to judge whether or not a light signal for forming the pattern is weak, or whether or not a sufficient contrast is present.

In other words, at step S107, the distance measurement style is selected as to which of the two styles is selected; one is the so-called active type in which signal light is projected from the side of the camera to measure the distance by using the reflection signal light, and the other is the so-called passive type in which the distance is measured on the basis of an image signal of the object.

In other words, in the case where judgment is made that the reflection light is weak, the microcomputer proceeds to step S108 on the consideration that the passive style AF is more suitable.

Then, at step S108, the distance is measured by means of the passive style AF in which an emphasis is placed on an image signal of the object which has been already determined.

After that, at step S109, the sound corresponding to this passive AF is generated from the sound signal generating section 61.

On the other hand, at step S107, in the case where the contrast of the image signal is weak, the microcomputer 11 proceeds to step S110.

Then, at steps S110 and S111, light for distance measurement is applied again, so that the active AF by the reflection light is emphatically conducted with respect to the position of the object which has been already determined.

Thereafter, at step S112, the sound corresponding to the active AF is generated from the sound signal generating section 61.

When the CPU 50 controls the output by selecting the sound signal in accordance with these distance measurement styles, or in accordance with the pro and con of the judgment of the main object, a safe and stable distance measurement is enabled while appealing the characteristic of the super combination AF.

Figure 21:
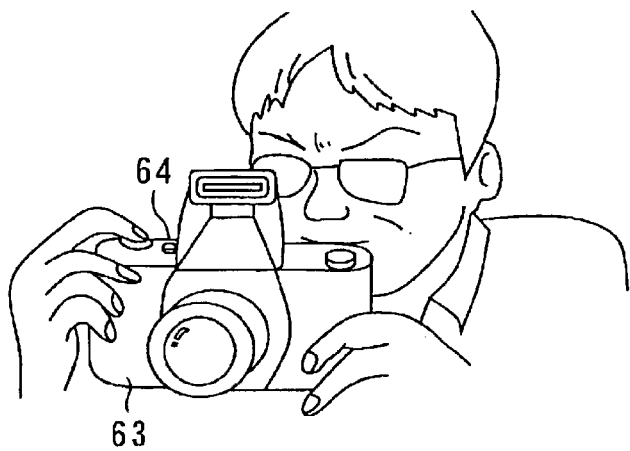
FIG. 21 is a view showing an external appearance of a camera to which the super combination AF is applied as the fourth embodiment of the present invention.

FIG. 21 is a view showing an external appearance of the camera in which the super combination AF is applied as a fourth embodiment of the present invention.

Even with the camera in which the super combination AF is applied, the screen is troublesome in scenes as shown in FIG. 2, so that the camera is at a loss without being able to judge which is the main object.

Figure 22A:
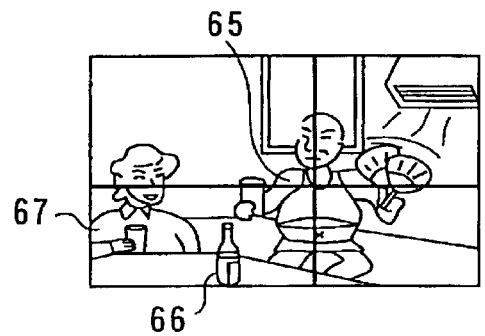
FIGS. 22A, 22B and 22C are views for explaining focusing by the camera according to the fourth embodiment.

Basically, as shown in FIG. 22A, a focusing can be obtained in a considerably high probability when priority is given to the pattern of the shape of the person 65 located in the center.

Figure 22B:
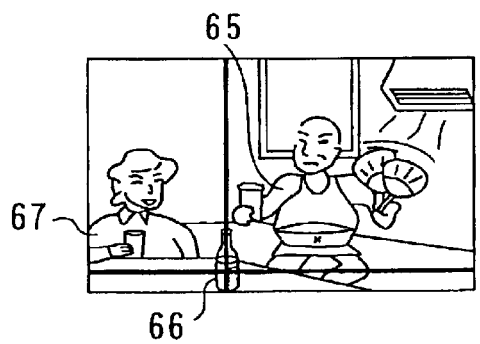
Figure 22C:
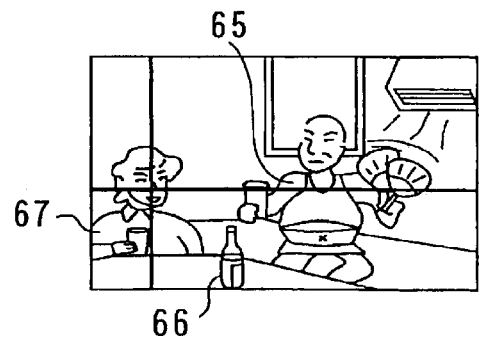

However, under a certain condition, there is a case in which the focusing is erroneously conducted to a bottle 66 as shown in FIG. 22B, or a there is a case in which a photographer desires that the focusing is adjusted to surrounding persons 67 as shown in FIG. 22C.

In such a case, when the CPU judges a candidate of the next focusing by the operation of the next candidate switch 64 provided in the camera 63 to be clarified to users through the instruction with the dot-matrix LCD within the finder, many of dissatisfactory points can be settled.

Besides, when such super combination AF is applied in a single reflex camera, judgment can be made as to whether or not focusing is obtained, which facilitates the confirmation of the focusing by users thereby making it possible to provide a fail-safe camera.

Furthermore, the following variations can be considered in addition to the above embodiments.

When judgment is made that the scene is the night scene, a warning display for recommending the use of a tripod may be conducted with a display section 25 in the case where the calculated shutter speed sec/h is so slow that the focusing is failed because of hands shivering.

Furthermore, a warning may be provided by blinking the LCD display, or a sound warning may be issued by using a PCV or the like.

Furthermore, in the case where a film attached with a magnetic recording portion is used, a warning display may be provided to recommend using a high ISO sensitive film to eliminate the need of using a tripod in photography.

In this case, the ISO sensitivity may be displayed on the LCD which sensitivity leads to the shutter speed sec/time at which focusing failure resulting from the hands shivering is not generated.

Thus, a photographer can photograph by winding up and taking out a film in the camera, and exchanging the film to the high ISO sensitivity film through the MRC function, so that the photographer can photograph without the need of a tripod, and the hand shivering.

Furthermore, a fifth embodiment of the present invention will be explained.

In this fifth embodiment, there will be explained a case in which the invention is applied to the digital camera for photographing the object with the pickup element.

In the case of the night scene photograph, the digital camera has a problem in that the images become unnatural because of the color degradation at the high luminance portion, the deterioration of S/N or the like.

Consequently, it is desired that such unnatural images in the night scene photography is settled.

Figure 23:
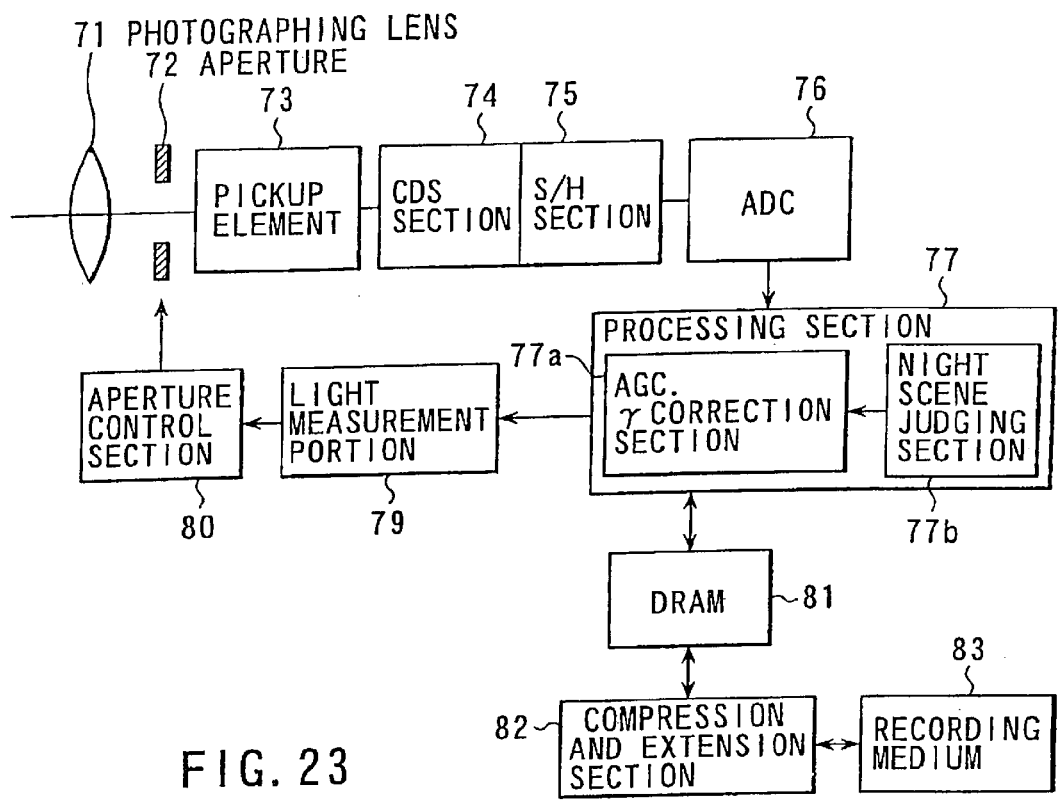
FIG. 23 is a block diagram showing a structure of a digital camera according to a fifth embodiment of the present invention.

FIG. 23 is a block diagram showing a structure of the digital camera according to the fifth embodiment.

In FIG. 23, the object light which has passed through the photographing lens 71 forms an image on the pickup element 73 which is constituted of CCD's or the like via an aperture 72.

The output of the pickup element 73 is supplied to a processing section 77 for subjecting the digital image signal to each kind of processing via a CDS section 74 for removing a reset noise from an image signal through the execution of correlative double sampling, an S/H section 75 constituting a sample holding circuit, and an A/D converter (ADC) 76.

This processing section 77 has an AGC·γ correction section 77a for controlling the auto gain and a night-scene judging section 77b for judging the night scene from the image signal.

This processing section 77 regulates the quantity of incident light incident on the pickup element by controlling the aperture 72 via the light measuring section 79 and an aperture control section 80.

Furthermore, to the processing section 77, a DRAM 81 for storing the image signal, and a recording medium 83 for recording compressed still image data via a compression and extension section 82 for compressing the image signal to decrease the data quantity are connected.

Next, an operation of the digital camera constituted in this manner will be explained.

Flux of light passing through the photographing lens 71 and the aperture 72 is incident on the pickup element 73. Then, after the light incident on the pickup element 73 is photo-electrically converted here, the light is A/D converted to a digital signal at the A/D converter 76 via the CDS section 74 and the S/H section 75.

The processing section 77, upon receiving the digital signal, conducts the processing such as a gain control processing and a γ-conversion processing or the like by the AGC·γ correction section 77a. Furthermore, the night scene judging section 77b processes the image data, so that judgment is made as to whether or not the scene is the night scene.

The light measuring section 79 conducts the calculation of light measuring exposure on the basis of an output of the processing section 77, so that a numerical aperture of the aperture 72 and an electronic shutter speed of the pickup element 73 are calculated. Then, the aperture 72 is controlled on the basis of the output of the light measuring section 79 at the aperture control section 80.

After the image signal processed with the processing section 77 is temporarily stored in the DRAM 81, the image signal is compressed with the compression and extension section 82 to decrease the data quantity. Then, the still image data is recorded in the recording medium which is compressed with the compression and extension section 82.

Figure 24:
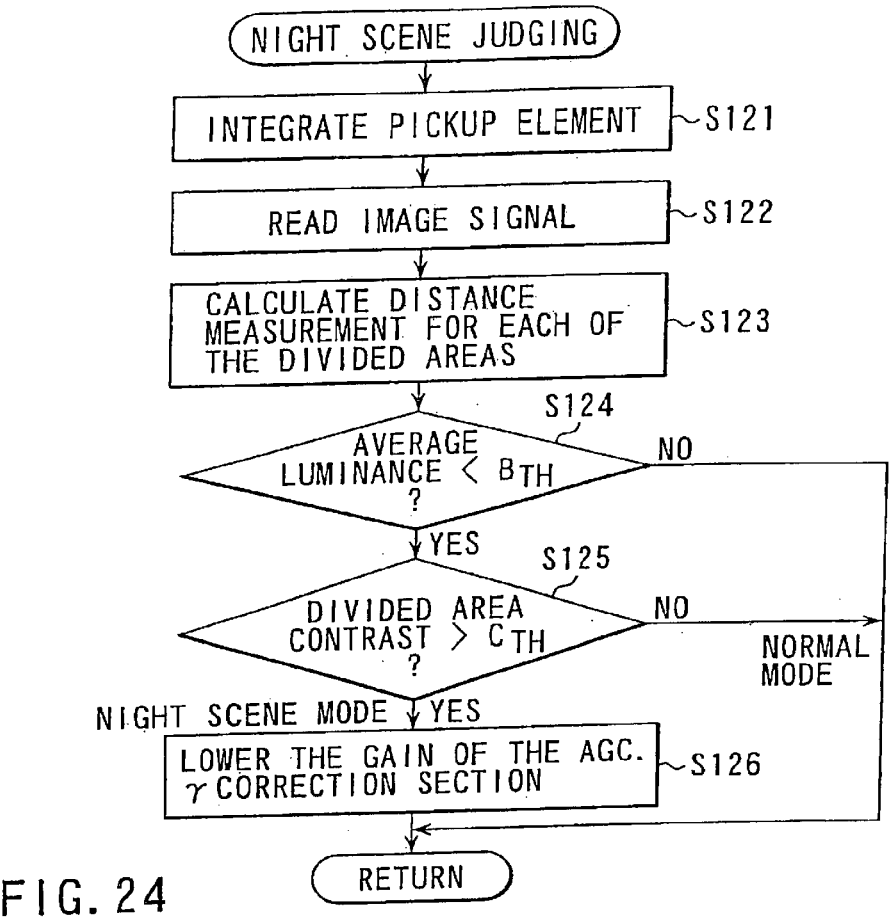
FIG. 24 is a flowchart for explaining an operation of the "night scene judgment" according to the fifth embodiment.

Next, an operation of the night scene judgment by section 77b will be explained by referring to the flowchart shown in FIG. 24.

In the beginning, at step S121, the pickup element integration operation is conducted by the pickup element 73 with respect to the light buddle of the object incorporated via the photographing lens 71 and the aperture 72.

Next, at step S122, the image signal is read with the CDS section 74, the S/H section 75 and the analog/digital converter 76.

Furthermore, at step S123, the calculation of luminance (hereinafter referred to as the processing by the night scene judging section 77b) is conducted for each of the divided areas with the night scene judging section 77b within the processing section.

Next, at step S124, the average luminance value and the predetermined value Bth are compared.

At step S125, the division area contrast and the predetermined value Cth are compared.

At steps S124 and S125, in the case where the luminance average value <$B_{th}$ and the division contrast >$C_{th}$ are established, judgment is made that the scene is the night scene, and the microcomputer 11 proceeds to step S126.

Furthermore, if any of the conditions is not satisfied at steps S124 and S125, the mode is set to a normal mode to pass through the routine.

At step S126, judgment is made that the scene is the night mode, and the gain of the AGC-γ correction section is lowered.

Figure 25:
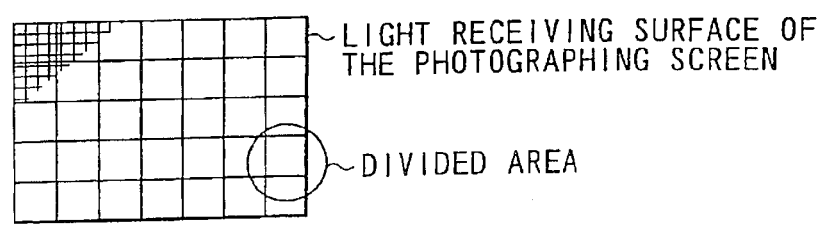
FIG. 25 is a view showing an example in which a light receiving area of a pickup element 73 of FIG. 23 is divided into a plurality of divided areas.

Incidentally, at the night scene judging section 77b, the light receiving area of the pickup element 73 is divided into a plurality of divided area to conduct the processing as shown in FIG. 25.

Furthermore, the divided area contrast refers to an area obtained by determining a difference in luminance with the peripheral divided area for each of the divided areas, obtaining the total of the absolute value of the difference and further adding the value of all the divided areas.

Since the gain of the AGC-γ correction section 77a would otherwise be set to an extremely high level at a low luminance as in the night scene, noises in the dark portion of the night scene would become conspicuous.

The generation of the noises can be suppressed by automatically judging the night scene and lowering the gain.

Furthermore, as a variation of the fifth embodiment, the processing at step S126 in the flowchart on FIG. 24 can be conducted in the following manner.

In other words, when judgment is made that the mode is the night mode, compression characteristic at a high luminance portion can be changed to improve the color.

Figure 26:
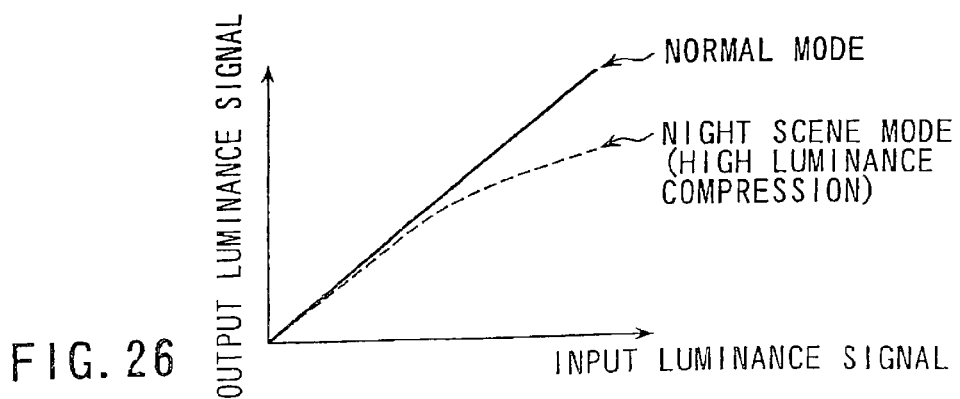

The latitude is improved by changing the compression characteristic of the high luminance portion as shown in FIG. 26, the white jumping is changed, and at the same time, the color is improved.

As has been described above, in the night scene, noises are decreased at the low luminance portion, the latitude at the high luminance portion and the color are improved with the result that natural images can be obtained in the night scene as well.

Next, there will be explained an embodiment of the distance measuring apparatus used in the camera according to the first to the fifth embodiments of the invention.

Figure 27:
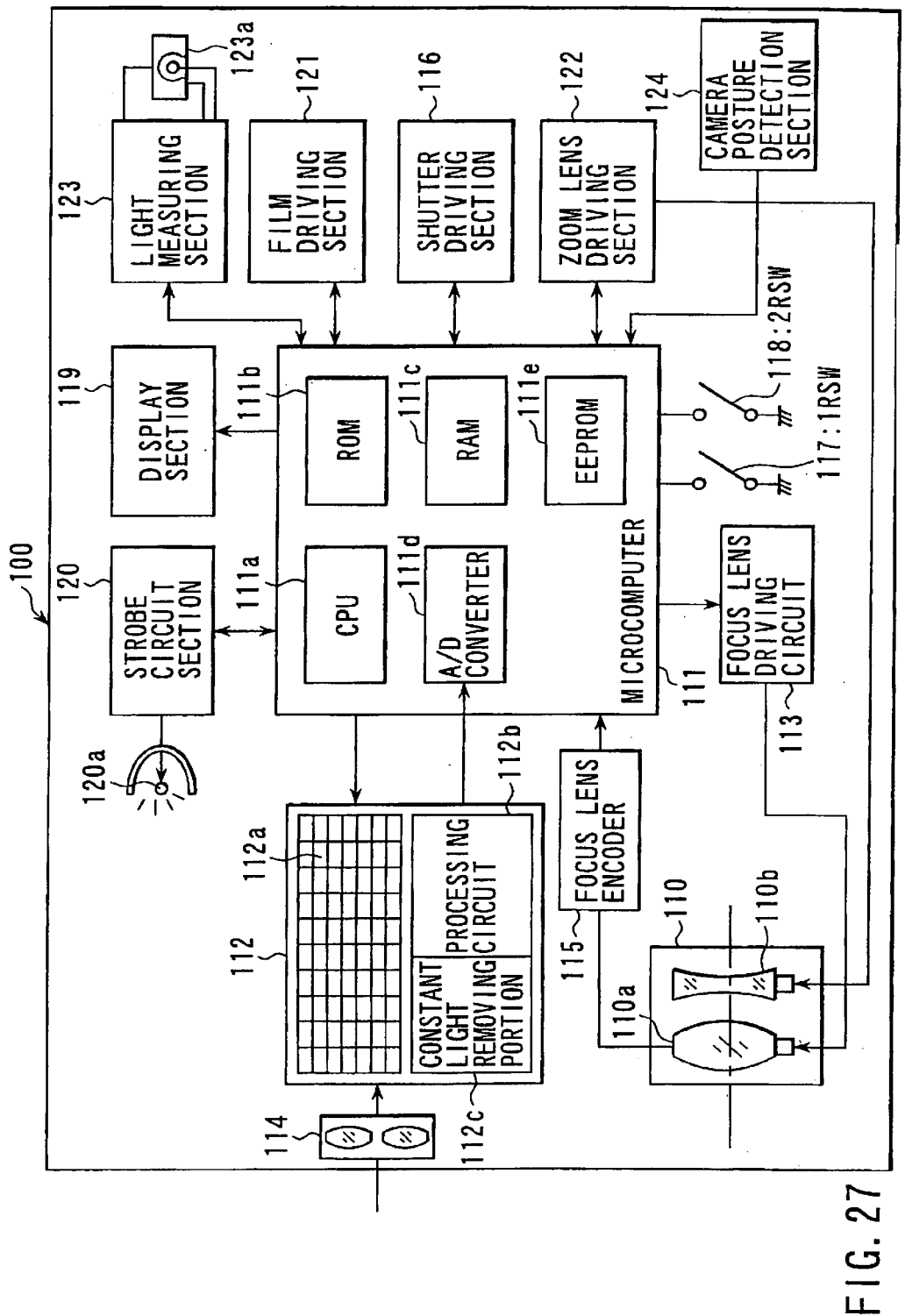
FIG. 27 is a block structural view of an essential portion, the view showing a structure of a camera attached with a distance measuring device according to a sixth embodiment of the present invention.

FIG. 27 is a block structural view showing an essential portion, the view showing the structure of the camera provided with a distance measuring apparatus according to a sixth embodiment of the invention.

a distance measuring apparatus (details thereof will be described later) constituted of an AF area sensor 112 and a distance measuring optical system 114 or the like;

a photographing optical system 110 constituted of a plurality of lenses including a focus lens 110a contributing at least to a focus adjustment and a zoom lens 110b contributing to a scaling operation (zooming operation) for forming an image of an object on a predetermined position by allowing flux of light (flux of light of the object) to pass through the plurality of lenses;

a focus lens driving section 113 for driving the focus lens 110a in a direction along the optical axis of the photographing optical system 110;

a focus lens encoder 115 for generating a predetermined pulse signal in accordance with a movement quantity of this focus lens 110a;

a zoom lens driving section 122 for driving the zoom lens 110b in a direction along the optical axis of the photographing optical system 110;

a film driving section 121 for driving and controlling the movement of a film, such as an automatic loading operation (auto-load) of loading a roll-like photograph film charged in the camera 110, automatic winding up and rewinding of films;

a shutter driving section 116 for driving and controlling a shutter mechanism (not shown) for adjusting an exposure quantity to the film;

a camera posture detection section 124 for detecting the posture of the camera 100, as to whether the photographing screen is placed in a posture at which the screen is placed in a vertical position, or the screen is placed in a horizontal position;

light measuring means comprising a light receiving element 123a for light measurement for receiving a part of the flux of light and photo-electrically converting the flux of light to generate a photo-electric current and a light measuring section 123 or the like for conducting a predetermined signal processing upon receipt of an output signal from the light receiving element 123a for light measurement;

flash light emitting means comprising a strobe light emitting portion 120a for emitting auxiliary light for distance measurement when needed at the time of the distance measurement operation and emitting auxiliary illumination light at the time of conducting an exposure operation, and a strobe circuit section 120 or the like for conducting the control of the light emission, the charging or the like of the strobe light emitting portion 120a;

a display section 119 comprising an liquid crystal display (LCD) or the like for displaying each kind of information in the camera 100 to be visually discriminated;

a first release switch (hereinafter referred to as 1RSW) 117 which is a two-step switch associated with a release button (not shown) which is an operation button used at the time of photograph operation, the 1RSW being turned on through the first step operation for generating, upon receipt of the ON state of the 1RSW, an instruction signal for instructing the execution of light measurement and distance measurement operation which is to be conducted prior to the exposure operation;

a second release switch (hereinafter referred to as 2RSW) 118 which is turned on through the second step operation subsequent to the first step operation for generating, upon receipt of the ON state of the 2RSW, an instruction signal for instructing the execution of the exposure operation and the winding up operation for one frame of the film; and a microcomputer 111 or the like which serves as control means for generally controlling each of these kinds of constituent members, an electric circuit thereof or the like.

The microcomputer 111 comprises:

a ROM 111b having each kind of sequence program for controlling each kind of operation of the camera 110 stored therein, a central processing unit (hereinafter referred to as a CPU) 111a for controlling a series of operation in accordance with a sequence program stored in this ROM 111b, a RAM 111c which serves as a work area at the time of temporarily storing each kind of data or the like and conducting each kind of calculation processing, an A/D converter 111d for converting, upon receipt of an analog signal to from an A/F area sensor, the analog signal into a digital signal, and an EEPROM 111e or the like where peculiar correction data or the like is stored in advance which is required at the time of, for example, a focus detection calculation, a light measurement calculation and an exposure calculation or the like.

Then, the microcomputer 111 controls a integration calculation processing of the AF area sensor 112 and controls the reading of the sensor data as has been described above. Besides, the microcomputer 111 conducts the predetermined processing with respect to the sensor data output from the AF area sensor 112 to conduct-the predetermined distance measuring calculation processing on the basis of the predetermined processing.

Furthermore, the microcomputer 111, which serves as a focus detection means, conducts the predetermined distance measuring calculation processing upon receipt of an output from the AF area sensor 112 as has been described above. The microcomputer 111, upon receipt of the result of calculation, outputs the predetermined driving signal to the focus lens driving section 113.

As a consequence, the focus lens 110a is moved by a predetermined distance, so that the predetermined focus adjustment operation is conducted.

At this time, the microcomputer 111 controls the position of the focus lens 110a by monitoring the output of the focus lens encoder 15.

Furthermore, the microcomputer 111 receives an output signal (an analog signal) for light measurement from the light measuring section 123 and converts this output signal into a digital signal with the A/D converter 11d followed by conducting a light measuring calculation processing for calculating an appropriate exposure value on the basis of the digitalized signal for light measurement.

The distance measuring apparatus of the embodiment comprises a light measuring optical system 114 for forming an image of an object for focus detection by allowing part of flux of light to pass through the photographing optical system 110; and an AF area sensor 112 or the like which is an electric charge accumulation type area sensor for receiving the object for focus detection formed with this distance measuring optical system 114 to generate an electric signal and output the signal as sensor data. As a distance measurement style for measuring a distance up to the object, a so-called external light passive style is applied.

The AF area sensor 112 comprises a plurality of light receiving elements, for example, photodiodes or the like, arranged in a two dimension manner both in the vertical direction and the horizontal direction on the light receiving surface for receiving part of the flux of light of the object; a group 112a of light receiving elements for conducting a photo-electric processing to a flux of light of received object; a processing circuit 112b for conducting a predetermined signal processing upon receipt of an output from this group 112a of light receiving elements for generating sensor data in a predetermined form; and a constant light removing portion 112c or the like for conducting a processing for removing constant light component upon receipt of the output from the group 112a of light receiving element.

Here, a detailed structure of the AF area sensor 112 will be explained hereinbelow.

Figure 28:
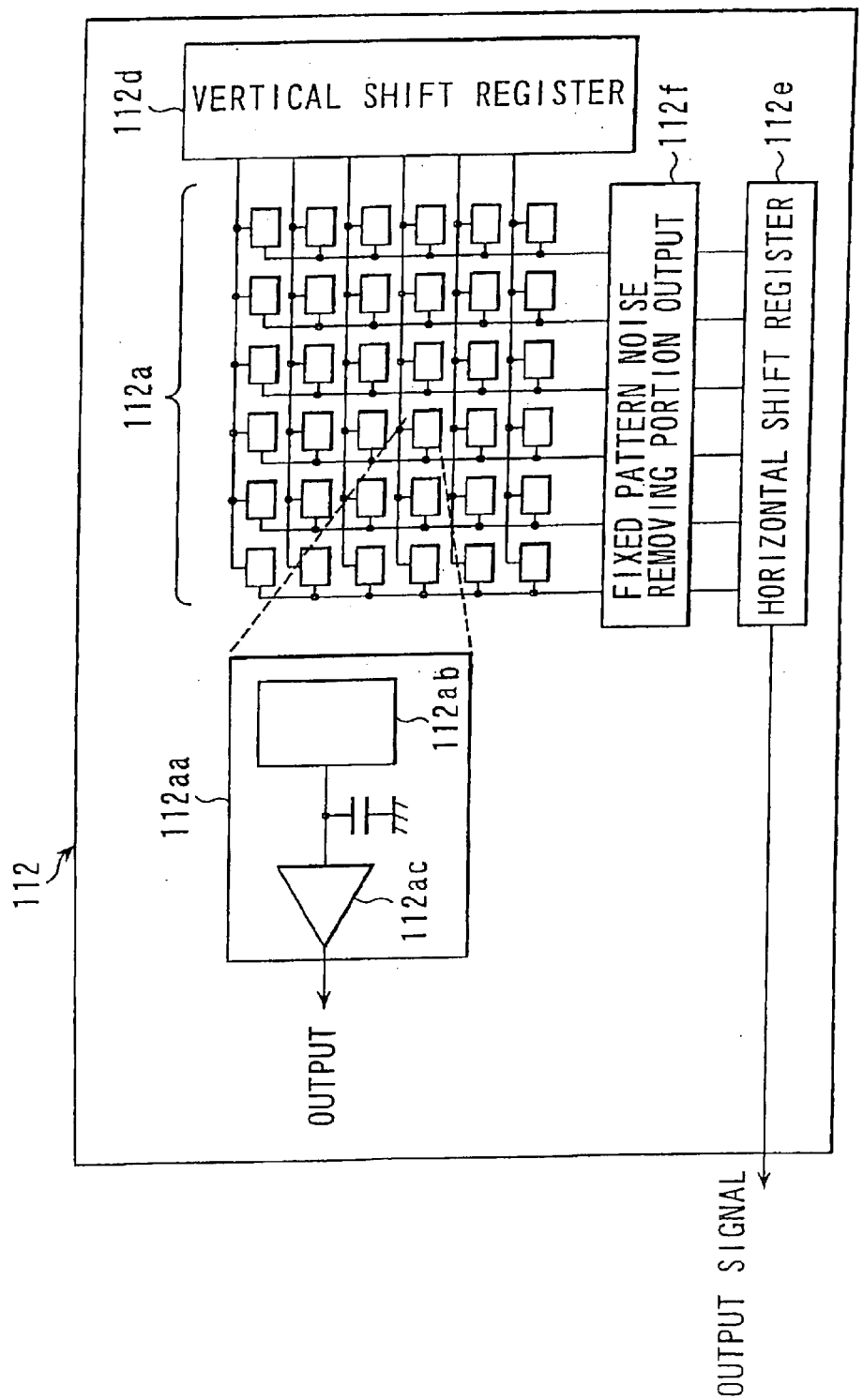
FIG. 28 is a block structural view of an essential portion, the view showing a main portion of a structure of the AF area sensor in the camera of FIG. 27.

FIG. 28 is a block structural view showing a main portion of a structure of the AF area sensor 112 in the camera 100.

As has been described above, the AF area sensor 112 comprises a group 112a of light receiving elements and a processing circuit 112b (not shown in FIG. 28), and a fixed pattern noise removing portion 112f or the like.

Then, the output from the group 112a of light receiving elements is transmitted to the processing circuit 112b via the fixed pattern noise removing portion 112f or the like.

In other words, the group 112a of light receiving elements comprises a plurality of light receiving elements 112aa arranged in a two dimension manner as shown in FIG. 2, and individual light receiving elements 112aa comprise a photodiode 112ab for generating an electric load with incident light and an amplifier 112ac or the like for converting the electric charge generated with this photodiode 112ab into a predetermined voltage.

Furthermore, the constant light removing-portion 112c is provided inside of the amplifier 112ac for each pixel.

The output of this amplifier 112ac is given in the form of a predetermined image signal via a vertical shift register 112d and a horizontal shift register 112e constituting part of the processing circuit 112b, the fixed pattern noise removing portion 112 or the like.

Incidentally, the fixed pattern noise refers to noises generated by the disparity of the amplifier 112ac for each pixel.

Figure 29:
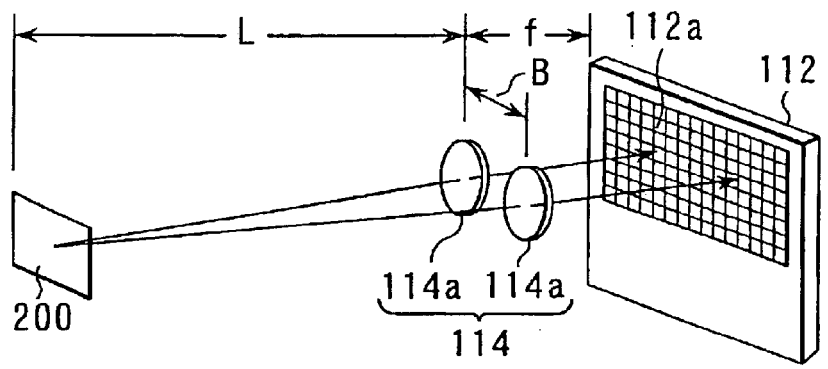
FIG. 29 is a perspective view conceptually showing an arrangement relationship between the distance measuring optical system constituting a distance measuring apparatus in the camera in FIG. 27 and an AF area sensor.
Figure 30:
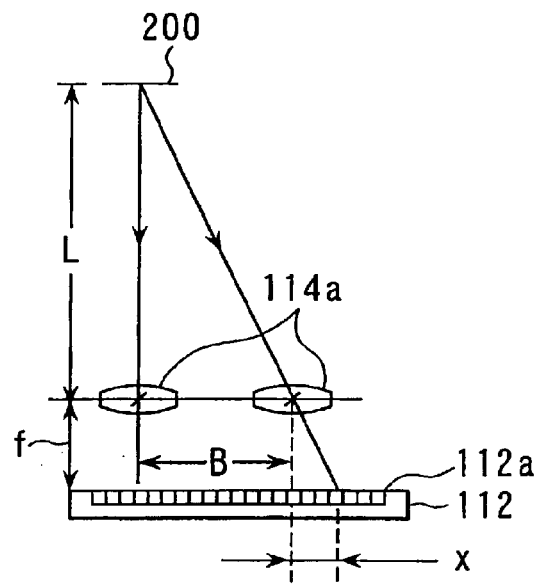
FIG. 30 is an arrangement view conceptually showing an arrangement relationship between the distance measuring optical system constituting a distance measuring device in the camera in FIG. 27 and an AF area sensor.

FIGS. 29 and 30 are views conceptually showing a relationship between the distance measuring optical system constituting a distance measuring apparatus in the camera 100 and an AF area sensor.

The distance measuring optical system 114 comprises a pair of light receiving lenses 114a, and these pair of light receiving lenses 114a serve as a separator lens for receiving flux of light from the object 200 to be photographed to divide an image of the object into two with the result that the divided two images are formed on the light receiving surface of the group 112a of light receiving elements of the AF area sensor 112.

Therefore, a pair of light receiving lenses 114a are arranged side by side in a predetermined distance as shown in FIGS. 29 and 30, that is, the pair of light receiving lenses 114a are arranged so that the lenses are arranged approximately in parallel to each other with a base line B and, at the same time, approximately in a vertical direction with respect to the flux light from the object.

In the distance measuring apparatus according to the embodiment which device is constituted in this manner, a distance up to the object is measured by using the principle of triangulation.

In other words, as shown in FIGS. 29 and 30, the distance up to the object can be determined in the case where the focus distance of the light receiving lens 114a is set to f, the base line length is set to B and a difference in the relative position of the two images formed with the pair of light receiving lenses 114a is set to x (see FIG. 30).

$$L = (B \cdot f)/x$$

On the other hand, as described above, the zoom lens is applied to the photographing optical system 110 of the camera 100.

Consequently, when the focus distance of the photographing optical system 110 is changed through the scaling operation, the detection area (the distance measurement area) in the AF area sensor 112 is changed in accordance with the change of the focus distance of the photographing optical system.

Figure 31:
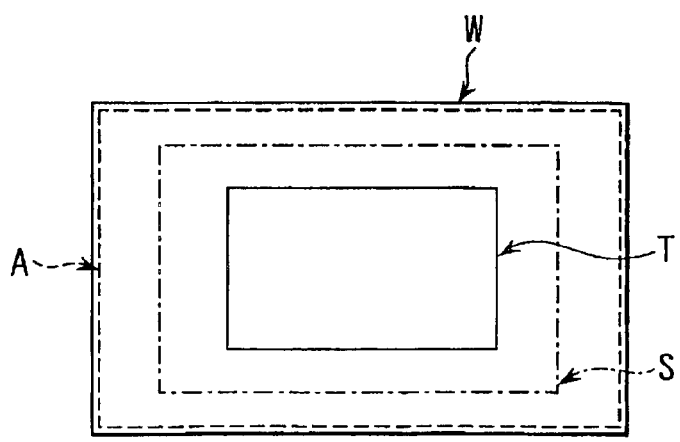
FIG. 31 is a view conceptually showing a relationship between a detection area of the AF area sensor in the camera of FIG. 27 and a photographing screen area at the time when the focus distance of the photographing optical system is changed.

FIG. 31 is a view conceptually showing the relationship between the detection area of the AF area sensor 112 and a photographing screen area at the time of changing the focus distance of the photographing optical system 110.

In FIG. 31, an area denoted by symbol W (an area within the range denoted by a dot line) is a detection area of the AF area sensor 112 used in the focus detection processing at the time when the photographing optical system 110 is set to the side of the widest angle (wide-angle side), namely, a predetermined area within the light receiving surface of the group of light receiving elements 112a (hereinafter referred to as a distance measurement area denoted by symbol A). An area denoted by symbol T (an area within the range shown in a solid line) refers to a predetermined area within the distance measurement area (symbol A) which is used in the focus detection processing when the photographing optical system 110 is arranged on the most remote telephoto side (the telephoto side).

Furthermore, an area denoted by symbol S (an area within the range denoted by a one dot chain line) refers to a predetermined area within the distance measurement area (symbol A) used in the focus processing at the time when the photographing optical system 110 is arranged on a position of an intermediate focus distance, namely, so-called the standard position.

Incidentally, in the camera 110 provided with a distance measuring apparatus according to the embodiment, so-called distance measuring style is adopted wherein the photographing optical system 110 and the distance measuring optical system 114 are arranged in a separate manner respectively, so that the light bundle of the object is received at respective positions.

As a consequence, a visual difference (a paralux) is generated between the photographing screen which is actually photographed with the photographing optical system 110 and the distance measurement area of the AF area sensor 112 on which the image is formed with the distance measuring optical system 114.

Consequently, in consideration of such paralux, the distance measuring apparatus according to the embodiment regulates an area used for conducting focus detection processing in accordance with the focus distance information (zoom information) of the photographing optical system 110.

In such a case, the correction data concerning the distance area position corresponding to the change in the focus distance of the photographing optical system 110 is stored in the EEPROM 111e in advance.

These items of data are to be developed to the RAM 111d after the initialization of the microcomputer 111 has been conducted at the time of the start up of the camera 100 (see step S201 of FIG. 32 which will be described later.)

Then, the microcomputer 111 determines an appropriate distance measurement area which should be used in the focus detection processing out of all the detection areas of the AF area sensor 112 in accordance with the zoom operation by referring to these items of correction data.

In this manner, the microcomputer 111 refers to the focus distance of the photographing optical system 110 set at that time and the correction data of the distance measurement area corresponding to the photographing screen at that time. Then, the sensor data which is not required for the focus detection processing is jumped, so that only the sensor data in the area required for conducting the focus detection processing is read and stored in the RAM 111c.

By doing so, only necessary data is stored in the RAM 111c.

Besides, apart from this, the microcomputer 111 outputs a setting signal in the reading range of the AF area sensor 112, so that only the sensor data required for the focus detection processing may be output to the RAM 111c.

The operation in the camera 111 constituted in this manner will be explained hereinbelow.

Figure 32:
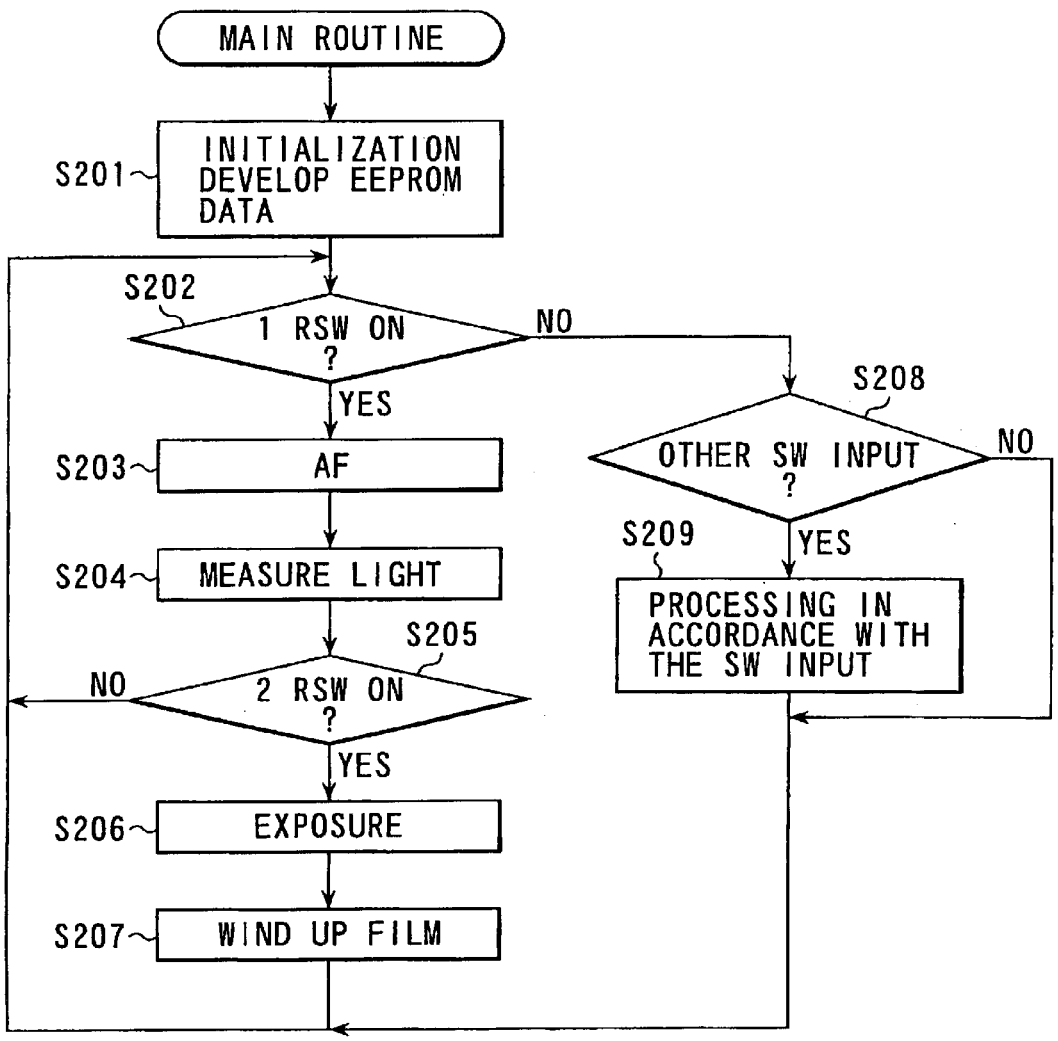
FIG. 32 is a flowchart showing a main routine of a microcomputer, the view showing a flow of a main operation of the camera of FIG. 27.

FIG. 32 is a flowchart showing a main routine of the camera 100, the flowchart showing a main flow of the microcomputer 111.

In the beginning, when a predetermined operation is conducted so that the main power source SW (not shown) is turned on by the photographer (user of the camera) in the state in which a battery (not shown) which serves as a power source is loaded in the camera 100, the microcomputer 111 of the camera 100 reads a predetermined sequence program which is stored in advance in the ROM 111b in itself to execute the program.

In this manner, the camera 100 starts the operation.

In the beginning, at step S201 of FIG. 32, the microcomputer 111 of the camera 100 initializes each constituent block, and at the same time, reads and executes the predetermined sequence program stored in the EEPROM 111e, and develops the program in the RAM 111c.

Next, at step S202, the microcomputer 111 confirms the state of the 1RSS 117 and waits for the turning on of the 1RSW 117.

Here, when it has been confirmed that the 1RSW 117 has been turned on, the microcomputer 111 proceeds to the processing at the next step S203, and executes the predetermined distance measuring processing (hereinafter, referred to as AF processing, see FIGS. 33 and 34. Details thereof will be described later) at this step S203. At the same time, the processing at the next step 204, namely the predetermined light measuring operation is conducted to execute the exposure calculation processing.

Subsequently, at step S205, the microcomputer 111 confirms the state of 2RSW 118.

Here, when the ON state of the 2RSW is confirmed, the microcomputer 111 proceeds to the next step S206 to conduct the predetermined exposure operation at this step S206.

When this exposure operation is completed, the microcomputer 111 then proceeds to the processing at step S207, and winds up the film which has been photographed at this step S207. In other words, after executing the operation of arranging the frames which are not photographed to the predetermined position, namely, the winding up operation of one frame portion of the film, the microcomputer 111 returns to the processing at step S202 which has been described above thereby setting the state of waiting for the input of an instruction signal from the 1RSW 117 or the like again. The processing thereafter will be repeated.

At step S202, at the same time when the microcomputer 111 confirms the state of the 1RWS 117, the microcomputer 111 also monitors the state of other switches.

In other words, at step S202 described above, when it has been confirmed that the 1RSW 117 has been turned off, the microcomputer 111 proceeds to the processing at step S209 in the case where an input signal is detected from other switches other than the 1RSW 117 and the 2RSW 118 at step S208.

At this step S209, the microcomputer 111 executes the predetermined processing in accordance with the input instruction signal (SW input).

For example, at step S208 described above, the microcomputer 111 executes the processing in accordance with the input instruction signal, namely, a predetermined processing for conducting a zoom up operation or a zoom down operation in the case where the instruction signal which has been confirmed is a signal for instructing the zoom up operation or the zoom down operation by means of a zoom switch (not shown) for executing a scaling operation.

Then, when the execution of the predetermined processing is completed, the microcomputer 111 returns to the processing at step S202 to repeat the processing after that.

Next, there will be explained hereinbelow the "AF processing" for executing the automatic focus adjustment operation in this camera 100.

Incidentally, the "AF processing" refers to the processing corresponding to the processing at step S203 in FIG. 32.

Figure 33:
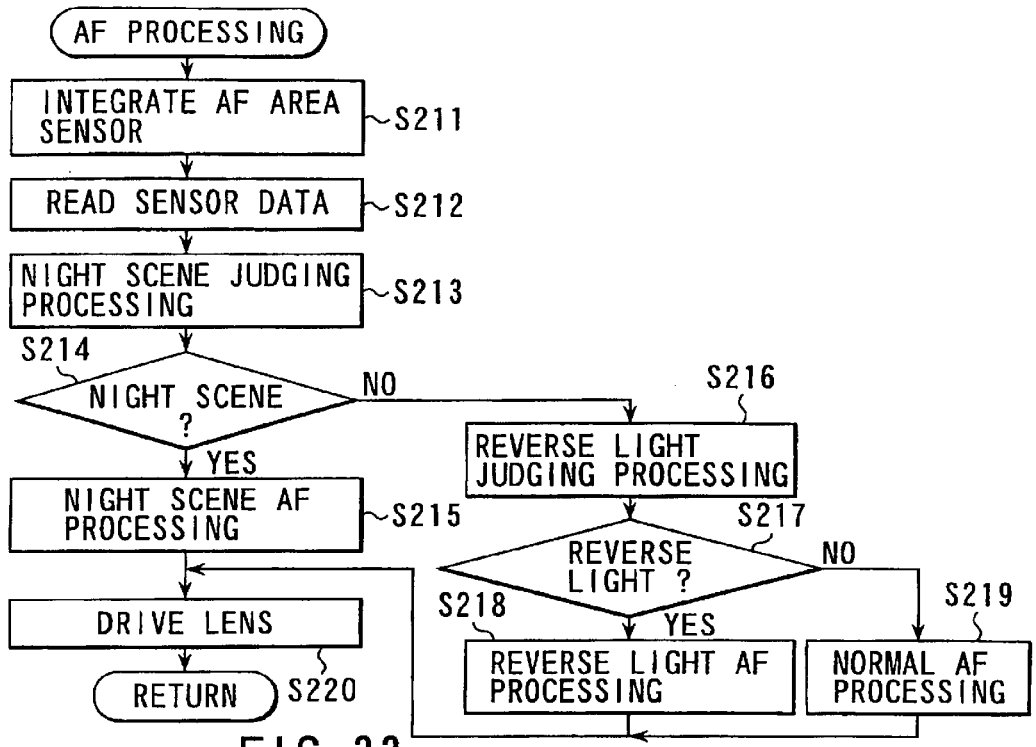
FIG. 33 is a flowchart showing a sub-routine of the "AF processing" of the camera of FIG. 27.

FIG. 33 is a flowchart showing the sub-routine of the "AF processing" of the camera 100.

Furthermore, FIGS. 34A through 34E are timing chart when the "AF processing" of the camera 100 is conducted.

As has been described above, at step 202 of FIG. 32, the ON state of the 1RSW 117 is confirmed, the microcomputer 111 conducts the AF processing, namely, the processing at step S203.

In other words, the flowchart of FIG. 33 corresponds to the "AF processing" at step S203 in FIG. 32.

When the microcomputer 111 proceeds to the sub-routine of the "AF processing", the microcomputer 111, in the beginning, controls the AF area sensor 112 at step S211 shown in FIG. 33 to execute the predetermined integration calculation processing.

In such a case, the microcomputer 111 outputs the predetermined integration control signal.

Then, the AF area sensor 112, upon receipt of this integration control signal, outputs a monitor signal corresponding to a peak output (the brightest pixel output) in a predetermined range within the distance measurement area.

The AF area sensor 112, upon receipt of the monitor signal, outputs the peak signal within the range of the designated distance measurement area to the microcomputer 111.

Figure 34A:
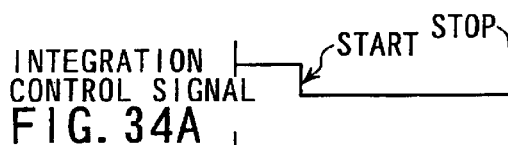
FIGS. 34A to 34E are timing charts at the time when the AF processing of the camera of FIG. 27 is conducted.
Figure 34B:

The microcomputer 111 serving as control means adjusts the integration time (accumulation time) so that received light quantity with respect to the group of light receiving elements 112a of the AF area sensor 112 becomes appropriate (see FIGS. 34A and 34B.)

Subsequently, at step S212, the microcomputer 111 outputs a reading clock (CLK) to the AF area sensor 112 to read sensor data (pixel data) from the AF area sensor 112.

Figure 34C:
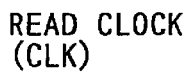
Figure 34D:

Then, after the microcomputer 111, upon receipt of the sensor data, digitizes the signal with the A/D converter 11d, the microcomputer 111 stores the digitized data in RAM 111c (see FIGS. 34C and 34D).

Next, in the processing after step S213, the microcomputer 111 judges the state of the object, on the photographing screen on the basis of the sensor data stored in RAM 111c.

In the beginning, at step 213, the microcomputer 111 proceeds to the sub-routine (see FIG. 38 described later in detail) of the "night scene judging processing" which is a processing for judging whether the scene to be photographed is a night scene (see FIG. 35 described later in detail). Then, at step S214, judgment is made whether or not the scene is the night scene.

Here, in the case where the microcomputer 111 judges that the photograph scene is the night scene on the basis of the sensor data of the AF area sensor 112, the microcomputer 111 proceeds to the next step S215. At this step S215, after executing the predetermined AF processing for conducting an appropriate automatic focus adjustment operation in accordance with the night scene, namely, the night scene AF processing, the microcomputer proceeds to the next step S220.

On the other hand, in the case where judgment is made that the scene is not the night scene, the microcomputer 111 proceeds to step S216. At step S216, the microcomputer 111 proceeds to the sub-routine (details thereof will be described later, see FIG. 44) of the "reverse light judging processing" which is a processing for judging the scene is the reverse light scene.

Then, at step S217, the microcomputer 111 judges whether or not the scene is the reverse light scene.

Here, in the case where judgment is made that the scene is the reverse light scene, the microcomputer 111 proceeds to the next step S218. At this step S218, after executing the predetermined "reverse light AF processing" for conducting appropriately the automatic focus adjustment operation, the microcomputer 111 proceeds to the next step S220.

Furthermore, at the above step S217, in the case where judgment is made that the scene is not the reverse light scene, the microcomputer 111 proceeds to the processing at step S219. At step S219, the microcomputer 111 conducts a normal AF processing followed by proceeding to the next step S220.

Then, as has been described above, after the microcomputer 111 completes any of the "night scene AF processing", the "reverse light AF processing" and the "normal AF processing", the microcomputer 111 proceeds to the processing at step S220. At step S220, the microcomputer 111 controls the driving of the focus lens 110 via the focus lens driving section 113 on the basis of the respective focus detection result by the "night scene AF processing", the "reverse light AF processing" and the "normal AF processing".

Then, when a series of AF processing is completed, the microcomputer 111 returns to the main routine of FIG. 32 as described above.

Incidentally, the processing of the previous light emission of the strobe shown in FIG. 34E will be described later.

Next, the "night scene judging processing" will be explained out of the AF processing described above.

This "night scene judging processing" corresponds to the processing at steps S213 through S215.

Figure 35:
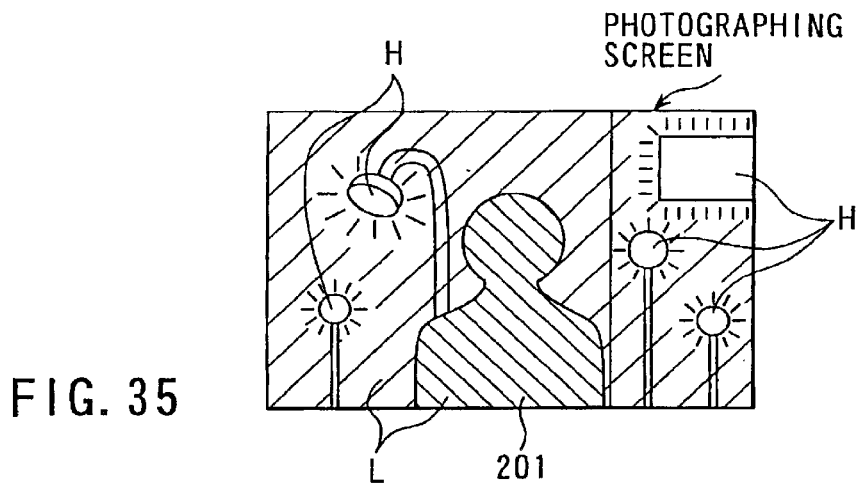
FIG. 35 is a view showing an example of a photographing screen in a typical night scene.

FIG. 35 is a view showing an example of photographing screen in a typical night scene.

In normal cases, the night scene refers to a portion where the whole photographing screen has a low luminance (an area denoted by symbol L in FIG. 35, a part denoted by slant line). It refers to the state in which the image of the object (an area denoted by symbol H in FIG. 35) such as streetlight, neon signs or the like which comes to have a high luminance in the screen is dotted manner.

At the time of photography by using a camera or the like, there is a case in which a main object 201 such as a person or the like is photographed against the background of the night scene (see FIG. 35).

Figure 36:
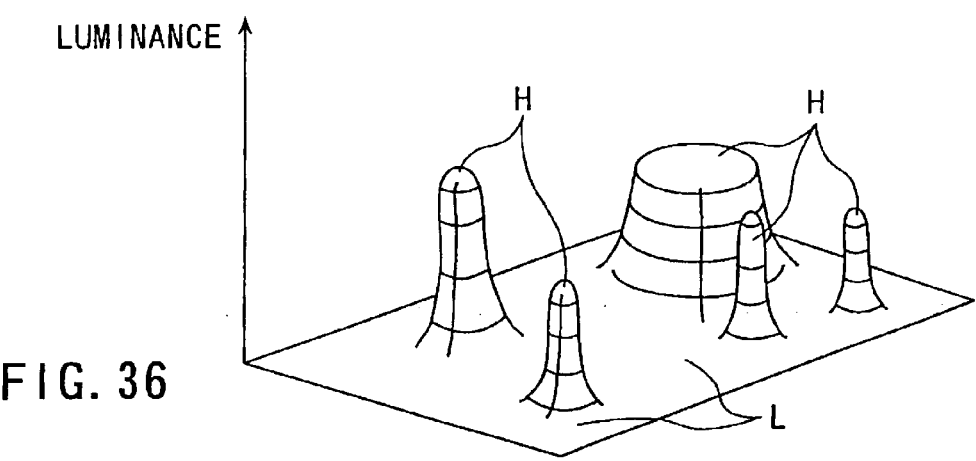
FIG. 36 is a view showing sensor data obtained with an AF area sensor in a three-dimension manner in a photograph scene shown in FIG. 35.

FIG. 36 is a view showing in a three-dimension manner sensor data obtained with the AF area sensor 112 in the scene to be photographed shown in FIG. 35.

Figure 37:
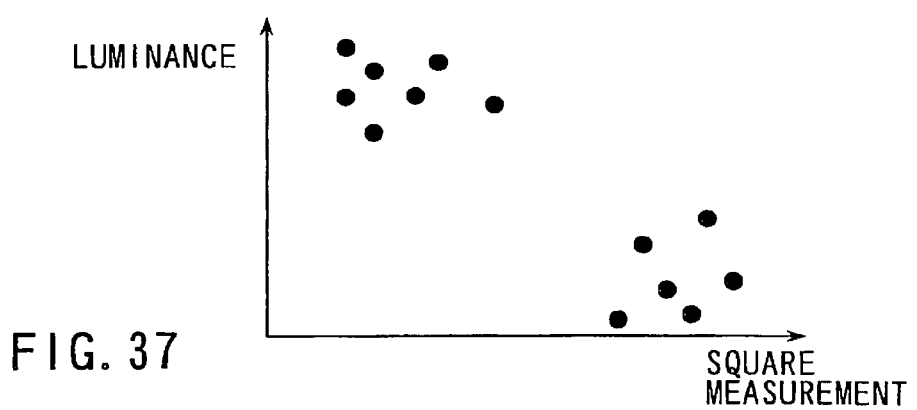
FIG. 37 is a distribution view showing a relationship between the respective square measurements of the continuous high luminance portion (symbol H) and a continuous low luminance portion (symbol L) within the photographing screen shown in FIG. 35, and the luminance of each portion.

Besides, FIG. 37 is a distribution view showing a relationship between respective areas of the continuous high luminance portion (an area denoted by symbol H) within the photographing screen shown in FIG. 35, the continuous low luminance portion (an area denoted by symbol L), and the luminance of each portion.

As shown in FIGS. 36 and 37, in the case where persons or the like are photographed against the background of the scene to be photographed, namely, the night scene as shown in FIG. 35, the luminance distribution within the photographing screen has the following features.

That is, (1) The luminance is on the whole low.
(2) The high luminance portion has a small area with respect to the whole screen, and is dotted.
(3) The low luminance portion occupies a large range with respect to the whole screen.

Consequently, in consideration of these points, judgment can be made whether the scene to be photographed is the night scene on the basis of the sensor data obtained with the AF area sensor 112.

Figure 38:
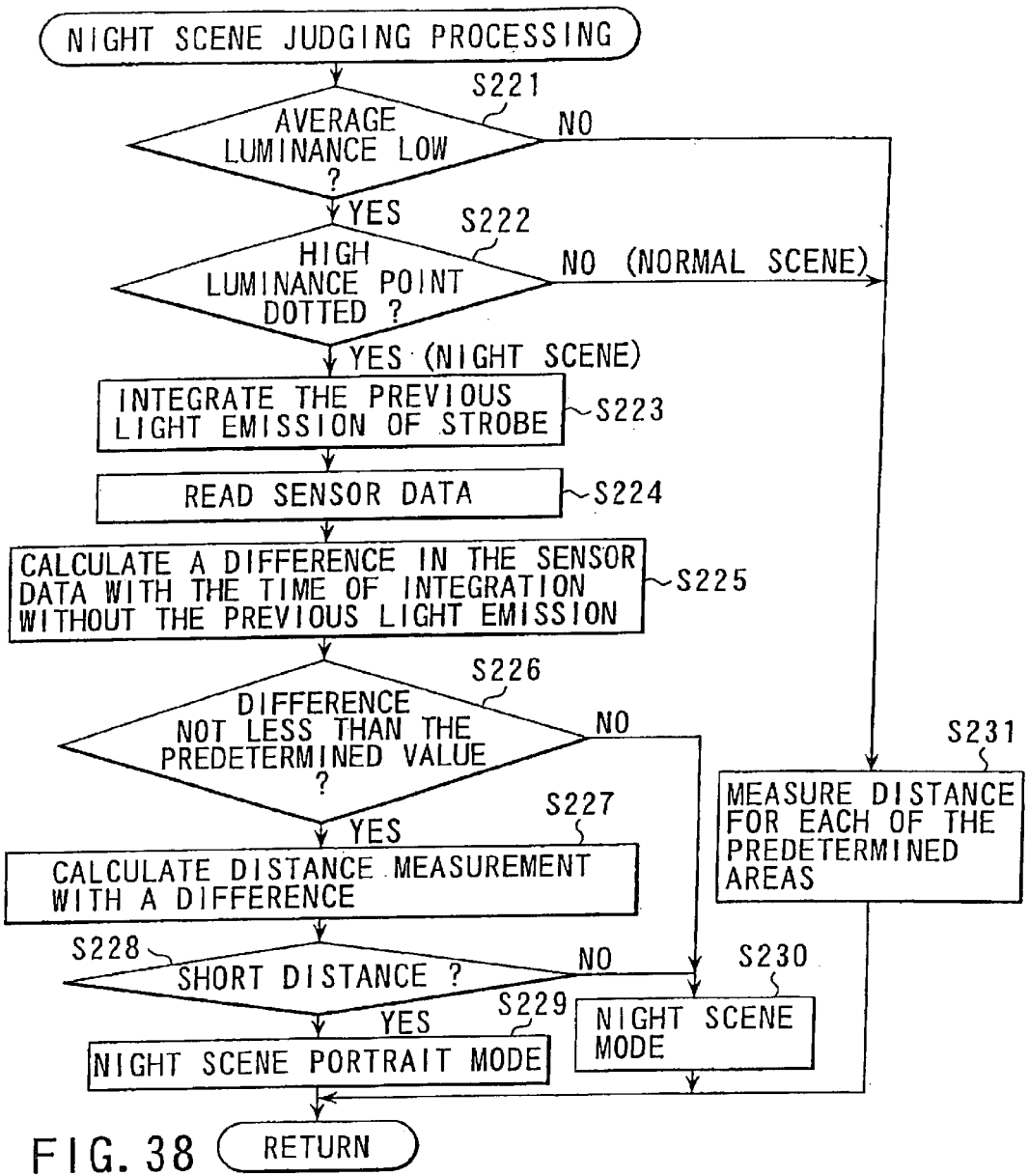
FIG. 38 is a flowchart showing a sub-routine of the "night scene judging processing" in the camera of FIG. 27.

FIG. 38 is a flowchart showing a sub-routine of the "night scene judgment".

When the microcomputer 111 proceeds to the night scene judgment of FIG. 38, the microcomputer 111 (the average luminance calculation section) calculates the sensor data of the whole detection area and the average value of the luminance data of each pixel on the basis of the integration time of the sensor data to compare the average luminance value which is the result of calculation with the predetermined value as to whether the average luminance value is smaller than the predetermined value.

By doing so, the microcomputer 111 judges whether the scene to be photographed is in the low luminance state or not.

Here, in the case where judgment is made that the calculated average luminance is lower than the predetermined value, the microcomputer 111 proceeds to the processing at the next step S222 while in the case where the average luminance value is higher than the predetermined value, the microcomputer 111 proceeds to the processing at step S231.

When judgment is made that the average luminance value is lower than the predetermined value at the above step S221, and the microcomputer 111 proceeds to the processing at step S222; at step S222, the microcomputer 111 detects the distribution of the pixel which constitutes the high luminance portion for confirming whether or not the high luminance portion is dotted in the scene to be photographed.

In other words, the microcomputer 111 (the area discriminating portion) detects the distribution of the pixel showing a value higher than the predetermined value out of the sensor data to judge whether or not there are many continuous areas having a square measurement (a square measurement of the high luminance portion) smaller than the predetermined value wherein the distribution of the detected pixel data is generated in a continuous manner.

Here, in the case where judgment is made that there are many continuous areas having a smaller square measurement wherein the distribution of the pixel data in the high luminance portion continues, the microcomputer 111 judges that the scene is the night scene to proceed to the processing at step S223. In the case where there are few such areas, judgment is made that the scene is not the night scene but is a normal scene to proceed to the processing at step S231.

In this manner, in the case where the conditions at step S221 and S222 are both satisfied, the microcomputer 111 judges that the scene is the night scene.

Then, in the case where judgment is made that the scene is the night scene, at step S223 the microcomputer 111 controls the strobe light emitting portion 120a via the strobe circuit section 120 to conduct a preliminary light emitting operation (a strobe previous light emitting operation; (see FIG. 34E)) and, at the same time, controls the AF area sensor 112 to conduct the integration calculation processing.

Figure 34E:

In such a case, the illumination light generated by the previous light emitting operation of the strobe light emitting portion 120a is reflected by the object, so that the flux of reflection light is received by the AF area sensor 112 (see FIGS. 34A, 34B and 34E).

Then, the integration calculation processing by the AF area sensor 112 at this time is the same as the integration calculation processing in a normal AF processing explained at step S211.

Next, at step S224, after the microcomputer 111 reads the sensor data from the AF area sensor 112 (see FIG. 34C) and converts the data into a digitalized signal by using the A/D converter 111d, the microcomputer 111 calculates a difference between the sensor data stored in thee RAM 111c.

At the next step S225, after the microcomputer 111 reads the data at step S212 of FIG. 33 described above, the microcomputer 111 calculates a difference between the sensor data stored in the RAM 111c, namely the sensor data obtained in the normal integration calculation processing which is conducted without the previous light emitting operation and the sensor data obtained in the integration calculation processing accompanied by the previous light emitting operation conducted at step S223 described above.

Incidentally, details of this calculation will be described later (see FIGS. 45 through 48).

Subsequently, at step S226, the microcomputer 111 confirms the result of calculation at the above step S225, namely the microcomputer 111 confirms whether or not the difference in the sensor data resulting from the presence or absence of the previous light emitting operation is not less than the predetermined value.

Here, in the case where the difference in the sensor data is not less than the predetermined value, the microcomputer 111 calculates the square measurement of the area having the difference. In the case where the square measurement is not less than a predetermined value, the microcomputer proceeds to step S227.

On the other hand, in the case where judgment is made that the difference in the sensor data is less than the predetermined value, or even when the square measurement is narrower than the predetermined value, the microcomputer 111 proceeds to the processing at step S230.

Figure 39:
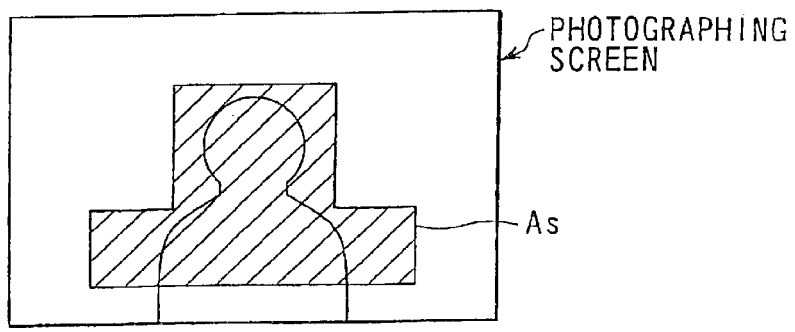
FIG. 39 is a view showing an area where a difference is generated between the sensor data at the time when the previous light emission is conducted in the photographing screen area of the camera of FIG. 27 and sensor data at the time when the previous light emission is not conducted.

Incidentally, as a scene to be photographed in the case where there is a difference in the sensor data because of the presence or absence of the previous light emitting operation, a case as shown in FIG. 39 can be considered.

In other words, in the scene to be photographed in which there is provided a background portion comprising a low luminance portion within the photographing screen, and there is arranged a person or the like in the vicinity of the approximately the central portion, there is generated a difference between the sensor data at the time when the previous light emitting operation is conducted and the sensor data at the time when the previous light emitting operation is not conducted in the area shown by the slanted line of FIG. 39.

Therefore, the area becomes an object for conducting the focus detection processing, namely, the distance measurement area (denoted by symbol As).

Next, at step S227, the microcomputer 111 conducts the predetermined distance measuring calculation on the basis of the sensor data in the area (an area shown by the slanted line of FIG. 39; the selected distance measurement area As).

The distance measuring calculation conducted here is a general distance measuring calculation, that is, the calculation corresponding to the mathematical expression (1) or the like is conducted.

Next, at step S228, the microcomputer 111 judges whether or not the result of the measurement calculated at step S227 is a value showing a short distance than the predetermined distance value.

Here, in the case where judgment is made that the result of the distance measurement is the short distance, the microcomputer 111 proceeds to the next step S229.

At this step S229, the microcomputer 111 sets the photographing mode which enables obtaining an appropriate exposure most suitable to the scene for photographing a main object 201 (see FIG. 35) such as a person or the like against the background of the night scene, namely, the so-called night scene portrait mode, the microcomputer 111 completes the series of sequence (return).

This "night scene portrait mode" is a mode in which the light emission of the strobe light emitting portion 120a is controlled so that an appropriate exposure is provided with respect to the main object 201 (see FIG. 35) located in a relatively short distance, and at the same time an exposure time is set to a long time so that an appropriate exposure is provided with respect to the night scene against a low luminance background.

On the other hand, in the case where judgment is made that the result of the distance measurement is not the short distance at step S228 described above, or in the case where the difference in the sensor data because of the presence or the absence of the previous light emitting operation is not more than the predetermined value at step S226, the microcomputer 111 sets the mode for photographing a normal scene at night, or the normal "night scene mode" and completes a series of sequence (return).

This "night scene mode" is a photographing mode for prohibiting the light emission of the strobe light emitting portion 120a and, at the same time, setting the exposure time to a long level so that an appropriate exposure is provided with respect to the night scene having a low luminance.

On the other hand, in the case where judgment is made at step S221 that the average luminance value on the whole photographing screen is higher than the predetermined value, or in the case where judgment is made at step 222 that the high luminance portion is not dotted despite the fact that the average luminance value on the whole photographing screen is lower than the predetermined value to proceed to step S231, the microcomputer 111 conducts the distance measurement calculation processing for each of the predetermined areas which is set in advance at step S231.

Then, after the result of the distance measurement on the side of the short distance is selected from the result of the distance measurement, the microcomputer 111 sets the photographing mode suitable for conducting a normal photography to complete a series of sequence (return).

In this manner, when the photographing mode appropriate for the scene to be photographed at that time is automatically set on the basis of the sensor data of the AF area sensor 112, the microcomputer 111 completes the sequence of the night scene judging processing to return to the sub-routine of the "IAF processing" of FIG. 33 (return).

In the sub-routine of the "night scene judging processing" shown in FIG. 38, the processing at step S221 will be explained further in detail.

Figure 40:
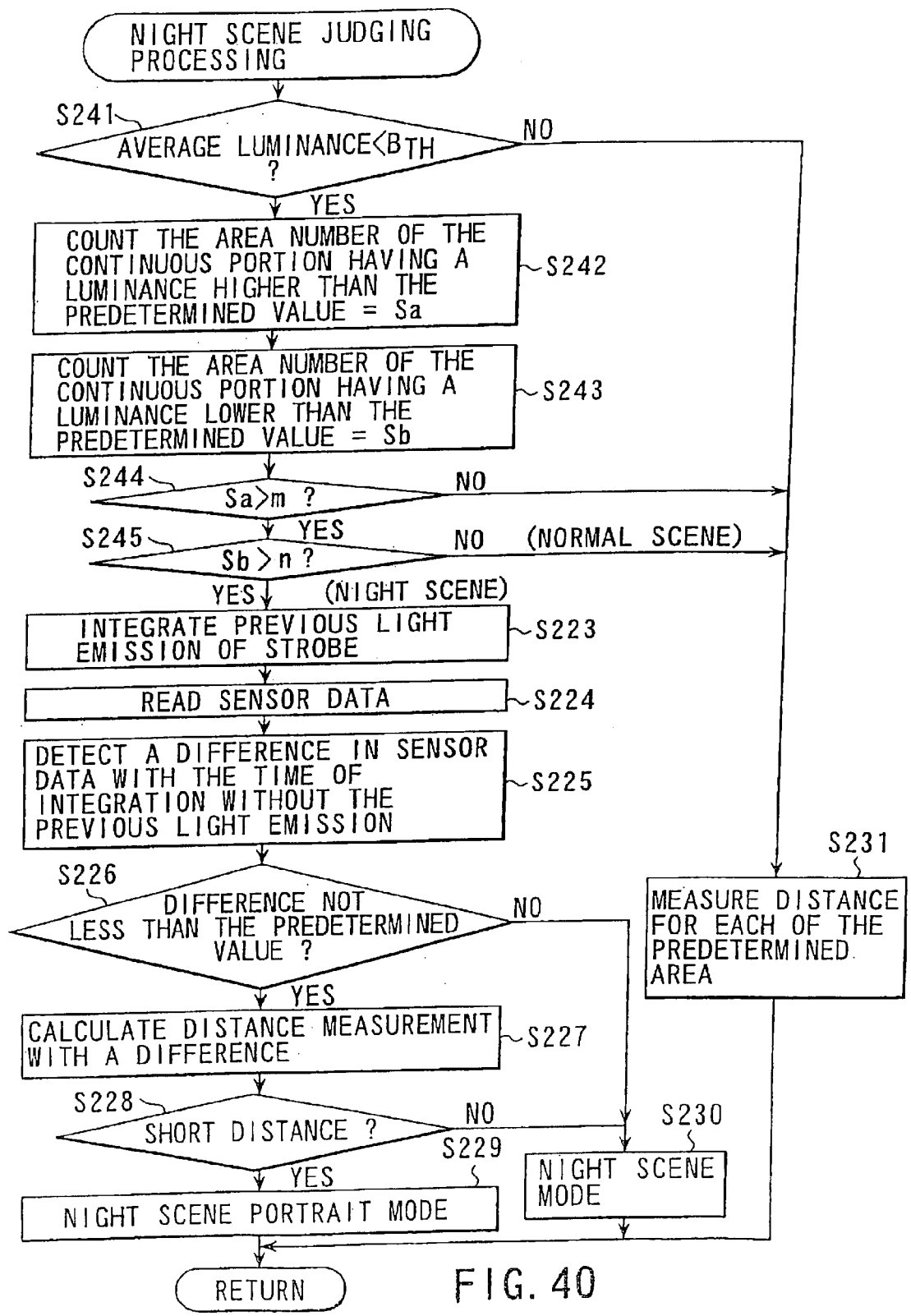
FIG. 40 is a flowchart showing another sub-routine of the "night scene judgment" in the camera of FIG. 27.

In other words, FIG. 40 is a flowchart showing another sub-routine of the night scene judging processing, the view showing the processing at steps S221 and S222 of FIG. 38 for detailed explanation thereof by means of each of the steps S241 through S245.

Incidentally, each of the steps after step S223 is the same as the processing of FIG. 38 described above, and is denoted by the same step number as FIG. 38.

Hereinafter, only parts different from the processing of FIG. 38 will be explained.

In the beginning, at step S241, the microcomputer 111 calculates the average value of the luminance data of each pixel on the basis of the sensor data on the whole detection area of the AF area sensor 112 and the integration time thereof to compare the average luminance value which is the result of calculation and the predetermined thresh value Bth.

Here, in the case where judgment is made that the mathematical expression of the average value<thresh value Bth is established, the microcomputer 111 proceeds to the processing at step S242. In the case where judgment is made that the condition of the average value≧thresh value Bth is established, the microcomputer 111 proceeds to the processing at step S231.

In the case where judgment is made that the average luminance value is lower than the thresh value Bth and the microcomputer 111 proceeds to the processing at step S242, the microcomputer 111 counts the number of continuous areas where the pixel data showing the higher luminance (a large value) than predetermined value is distributed in a continuous manner, thereby setting the count value=Sa.

Subsequently, at step S243, the microcomputer 111 counts the number of continuous areas where pixel data showing a low luminance (a small value) than the predetermined value is distributed in a continuous manner, thereby setting the count value=Sb.

Then, at step S244, the microcomputer 111 compares the count value Sa in the high luminance value area with the predetermined judgment value=m.

This judgment value m is a peculiar established value stored in the EEPROM 111e in advance, and the value m is developed in the RAM 111c at the time of the start-up of the camera 100.

Here, in the case where Sa>m is established, the microcomputer 111 proceeds to the processing at step S245. When the above condition is not established, the microcomputer 111 proceeds to the processing at step S231.

Subsequently, as step S245, the microcomputer 111 compares the count value Sb in the low luminance area with the predetermined judgment value=n.

This judgment value n is a peculiar established value stored in the EEPROM 111e in advance in a similar manner as the above judgment value m, and is developed in the RAM 111c at the time of the start-up of the camera 100.

Then, in the case where Sb>n is established, the microcomputer 111 proceeds to step S223. When the above condition is not established, the microcomputer 111 proceeds to the processing at step S231.

Consequently, when the conditions of Sa>m and Sb<n are satisfied, the microcomputer 111 judges that the average luminance of the scene to be photographed is low at the time of obtaining the sensor data, and a high luminance portion is dotted.

The processing at steps after step S223 is completely the same as the processing of FIG. 38 described above.

Next, the "reverse light judging processing" out of the AF processing described above will be explained.

This "reverse light judging processing" corresponds to the processing at steps S216 through S218 in FIG. 33.

Figure 41:
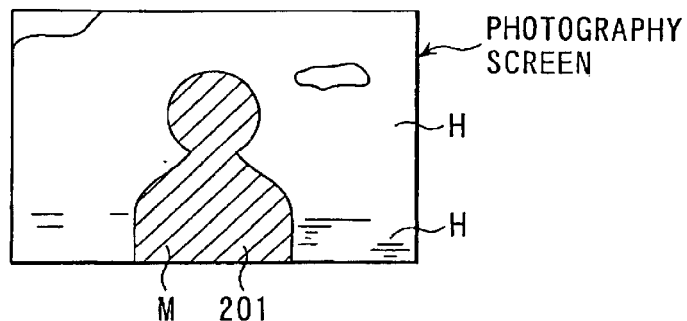
FIG. 41 is a view showing an example of a photographing screen in a typical reverse light scene.

FIG. 41 is a view showing an example of photographing screen in a typical reverse light scene.

In a normal case, the reverse light scene in the state in which a high luminance area (an area denoted by symbol H in FIG. 41) such as, for example, sky, sea or the like is arranged in the background of the main object such as a person or the like.

In this case, the area occupied by the main object 201 such as a person or the like within the photographing screen is distributed as an area (an area denoted by symbol M in FIG. 41) where the luminance based on the pixel data corresponding thereto becomes a medium luminance. Within the photographing screen, there is generated a state in which the low luminance area virtually does not exist.

Figure 42:
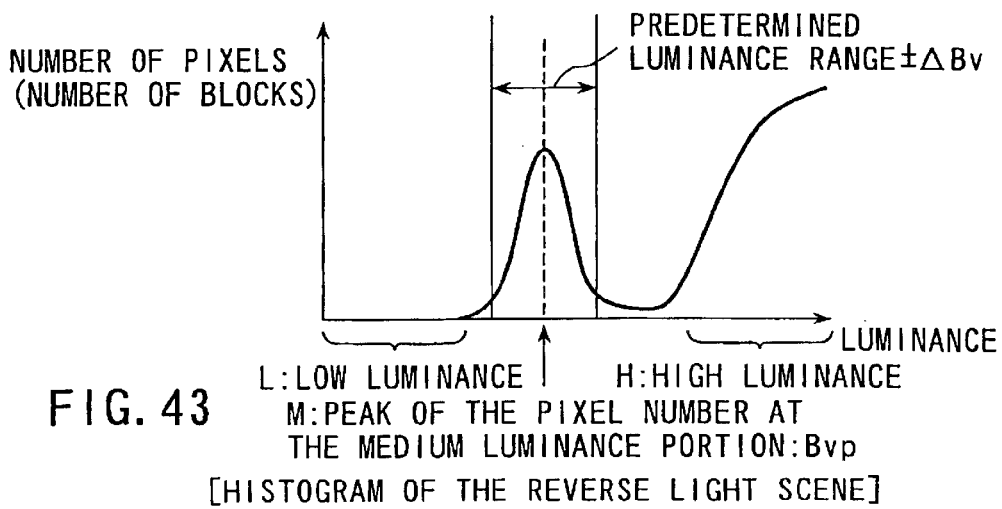
FIG. 42 is a view showing a distribution of the sensor data obtained with the AF area sensor in a three-dimension manner in the case of the reverse light scene shown in FIG. 41.

In the case of the reverse light scene as shown in FIG. 41, when the distribution of the sensor data obtained with the AF area sensor 112 is shown in a three-dimension manner as shown in FIG. 42.

In other words, in the reverse light scene, an area H in a high luminance portion which constitutes a background as shown in FIG. 42 and a medium luminance area M occupied by the object 201 are distributed respectively within the photographing screen.

Then, the average luminance of the whole screen has an inclination of being set to a relatively high luminance.

Incidentally, FIG. 43 shows a luminance histogram in the case of this reverse light scene, namely the distribution of each pixel of the sensor data.

Figure 44:
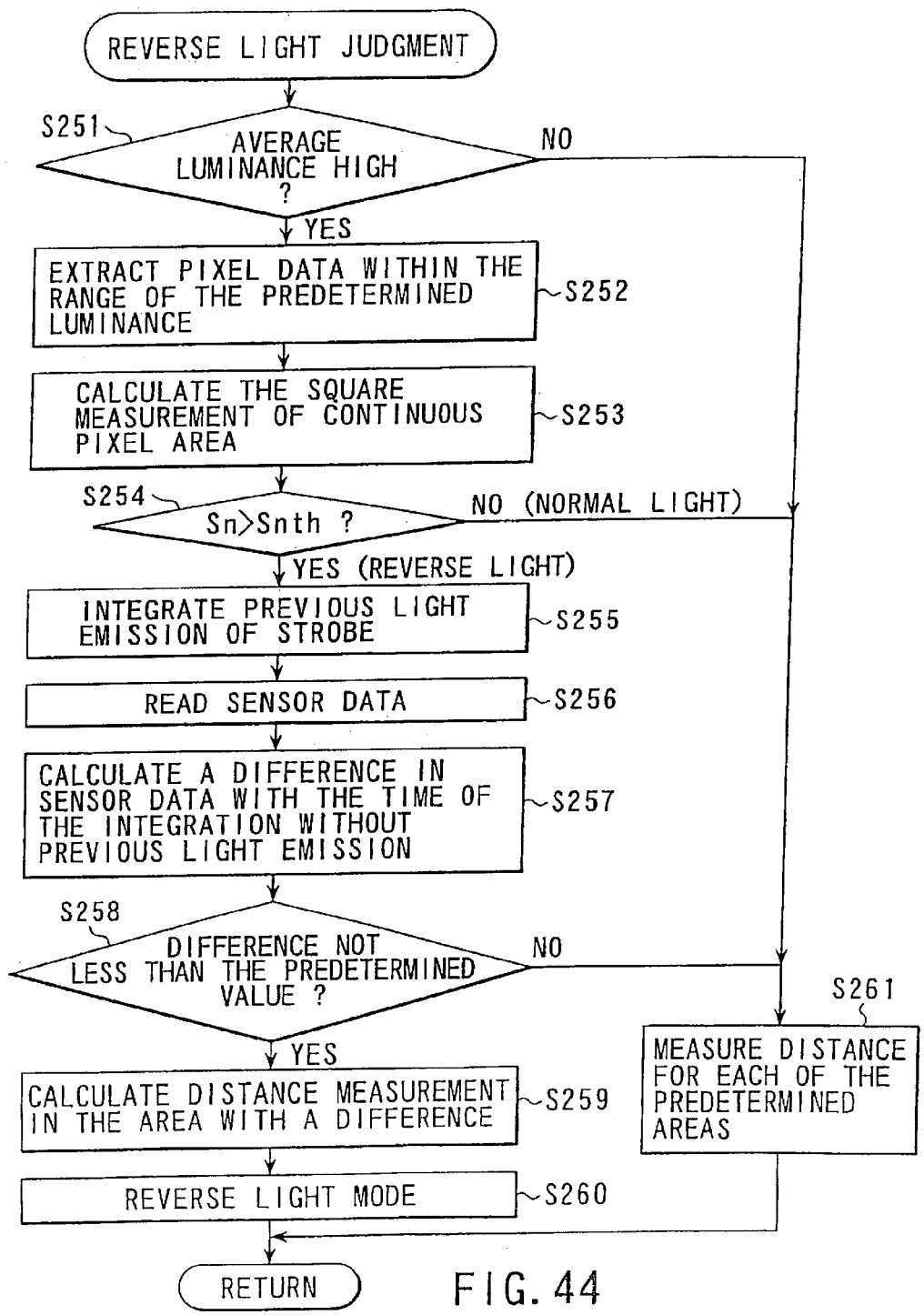
FIG. 44 is a flowchart showing a sub-routine of the "reverse light judging processing" in the camera of FIG. 27.

FIG. 44 is a flowchart showing a sub-routine of the "reverse light judging processing".

Incidentally, the processing at each of the steps S255 through S259 and step S261 corresponds to the processing at each of the steps S223 through S227 and step S231 of the "night scene judging processing" in FIGS. 38 and 40 described above with the result that approximately the same operation is conducted.

As shown in FIG. 44, when the microcomputer 111 proceeds to the sub-routine of the "reverse light judging processing", the microcomputer 111 calculates the average value of the luminance data of each pixel on the basis of the sensor data of the whole detection area of the AF area sensor 112 and the integration time thereof to judge whether or not the average luminance value is larger (higher) than the predetermined value, namely the scene to be photographed is in a high luminance state.

Here, in the case where judgment is made that the calculated average luminance value is higher than the predetermine value, the microcomputer 111 proceeds to the processing at the next step S252. In the case where judgment is made that the average luminance value is lower than the predetermined value, the microcomputer 111 proceeds to the processing at step S261.

Then, at step S252, the microcomputer 111 detects the distribution of the pixel data having a relatively low luminance, namely the distribution having a medium luminance. Furthermore, after the microcomputer 111 extracts the pixel data within the range of the predetermined luminance range from the distribution with the medium luminance, the microcomputer 111 proceeds to the processing at the following step S253.

Here, as the predetermined luminance range that is regulated, the range of the predetermined luminance value= ±ΔBv centering upon the luminance value=Bvp corresponding to the medium luminance portion area=the peak value of the pixel number of M out of the photographing screen shown in FIG. 41 is set to a predetermined range (see FIG. 43).

Subsequently, at step S253, after the microcomputer 111 calculates an square measurement of the continuous area=Sn where the pixel data is continuously distributed which is extracted within the range of the predetermined luminance described above (±ΔBv centering on Bvp), the microcomputer 111 proceeds to the processing at step S254.

At step S254, the microcomputer 111 compares the square measurement of the continuous area=Sn where the pixel data is continuously distributed which is extracted within the range of the predetermined luminance described above (±ΔBv centering on Bvp) with the predetermined judgment value (judgment thresh)=Snth.

This predetermined judgment value=Snth is a peculiar established value which is stored in advance in the EEPROM 111e, and is a value which is developed in the RAM 111c at the time of the start-up of the camera 100.

Then, here, in the case where Sn>Snth is established, the microcomputer 111 judges that the scene to be photographed is the reverse light scene which is set in the reverse light state, the microcomputer 111 proceeds to the processing at step S255.

That is, in the case where the scene is the reverse light scene shown in FIG. 41, the square measurement=Sn occupied by the main object 201 occupies a relatively large square measurement with respect to the whole photographing screen.

Consequently, judgment is made that Sn>Snth is established and the scene is the reverse light scene.

Furthermore, at step S254, in the case where Sn>Snth is not established, the microcomputer 111 judges that the scene to be photographed is not the reverse light scene but is in an ordinary light state, and proceeds to the processing at step S261.

At step S255, the integration calculation processing is conducted by the AF area sensor 112 accompanied by the previous light emitting operation. In this "reverse light judging processing", the AF area sensor 112 conducts the integration calculation processing while removing constant light by operating thee constant light removing portion 112c at the same time (see FIGS. 34A and 34B and 34E.)

Furthermore, at step S256, the microcomputer 111 reads the sensor data (see step S211 of FIG. 33) generated by the AF area sensor 112.

After this, the microcomputer 111 calculates at step S257 a difference between the sensor data by the normal integration calculation processing without the previous light emitting operation and the sensor data by the integration calculation operation accompanied by the previous light emitting operation.

The means of calculation will be described in detail hereinbelow.

Figure 45:
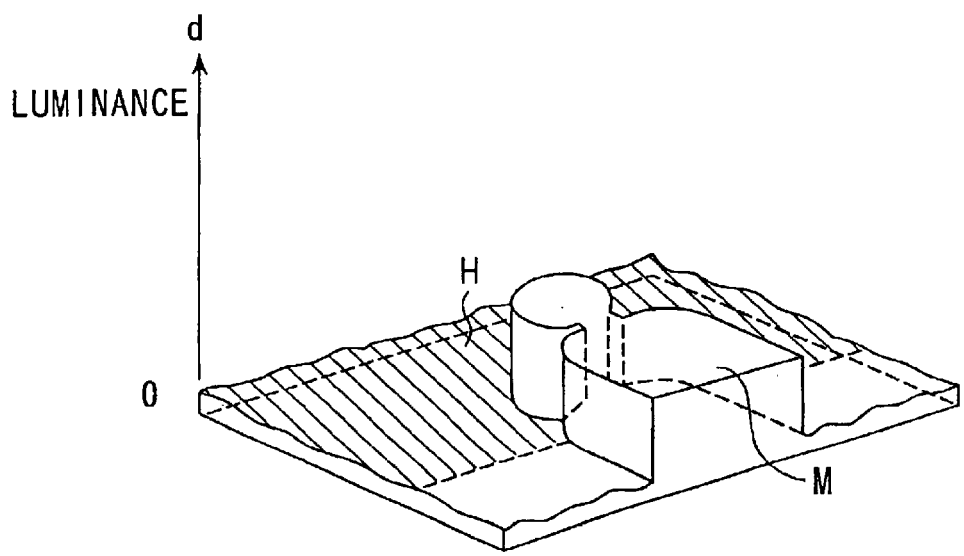
FIG. 45 is a view showing the distribution of sensor data obtained with the AF area sensor at the time when integration calculation processing accompanied by the previous light emitting operation is conducted in a three-dimension manner in the photograph scene shown in FIG. 41.

FIG. 45 is a view showing in a three-dimension manner a distribution of the sensor data obtained with the AF area sensor 112 at the time when the integration calculation operation accompanying the previous light emitting operation is conducted in the scene to be photographed shown in FIG. 41.

In such a case, the reflection light from the object 201 such as a person or the like located at a relatively near position from the camera becomes large, and the reflection light from the object in the far distance which constitutes the background becomes small, so that the flux of light of the object which can be received by the AF area sensor 112 is changed as shown in FIG. 45.

A procedure will be done as follows at the time of calculating a difference between the sensor data by the normal integration calculation processing without the previous light emitting operation and the sensor data by the integration calculation processing accompanied by the previous light emitting operation.

That is, the microcomputer 111 analyzes the sensor data in whole area of the photographing screen obtained by the AF area sensor 112 in the desired scene to be photographed, and standardizes all the sensor data by referencing the sensor data in the area which occupies a large square measurement in the whole area, followed by calculating a difference at the same position of the sensor data at the normal time and at the time of the previous light emission.

The photographing screen of FIG. 41 described above will be explained by giving an example. In the beginning, in the scene to be photographed of FIG. 41, the microcomputer 111 conducts the calculation of the standardized data with respect to the sensor data (see step S211 of FIG. 33) obtained by conducting a normal integration operation processing.

In this case, the average value of the sensor data in the area denoted by symbol H of FIG. 42 is regulated as the reference value of the standardized data.

Then, after the microcomputer 111 determines a constant k1 of the ratio at which this average value x1 is forced to agree with r0 in the vicinity of the central portion of the dynamic range of the sensor data, the microcomputer 111 multiplies constant k1 with all the sensor data.

$$K1 = r0/x1$$

Figure 46:
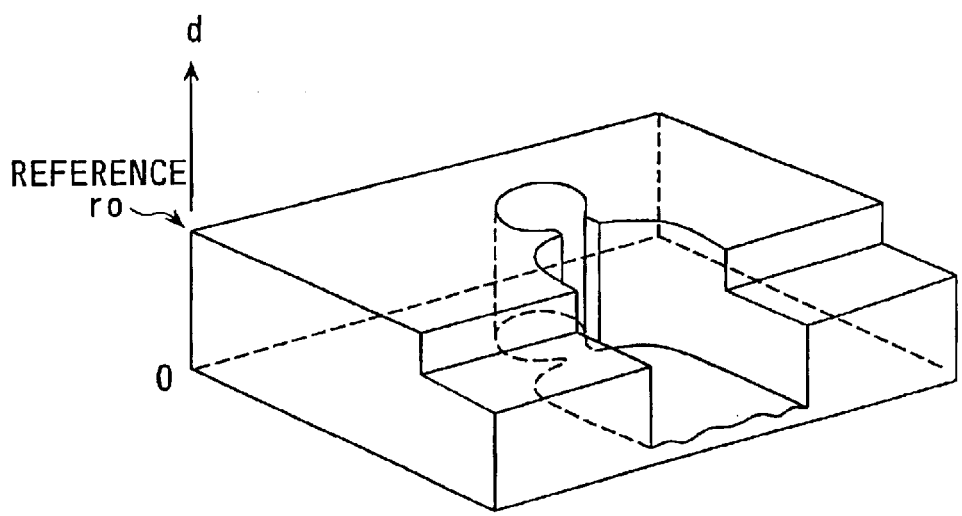
FIG. 46 is a view showing the distribution of standardized data in which sensor data at the time of normal integration is standardized in a three-dimension manner.

The distribution of the sensor data calculated from the above mathematical expression will be obtained as shown in FIG. 46.

Next, the microcomputer 111 conducts the calculation processing of the standardized data in a similar manner with respect to the sensor data by the integration calculation processing accompanied by the previous light emitting operation.

The sensor data at the time of the previous light emission is regulated as the reference value of the standardized data of the sensor data in the area denoted by symbol H of FIG. 45.

Then, after the microcomputer 111 determines a constant k2 of the ratio at which the average value x2 is forced to agree with r1 in the vicinity of the center of the dynamic range of the sensor data, the microcomputer 111 multiplies a constant k2 with all the sensor data.

$$K2 = r0/x1$$

Figure 47:
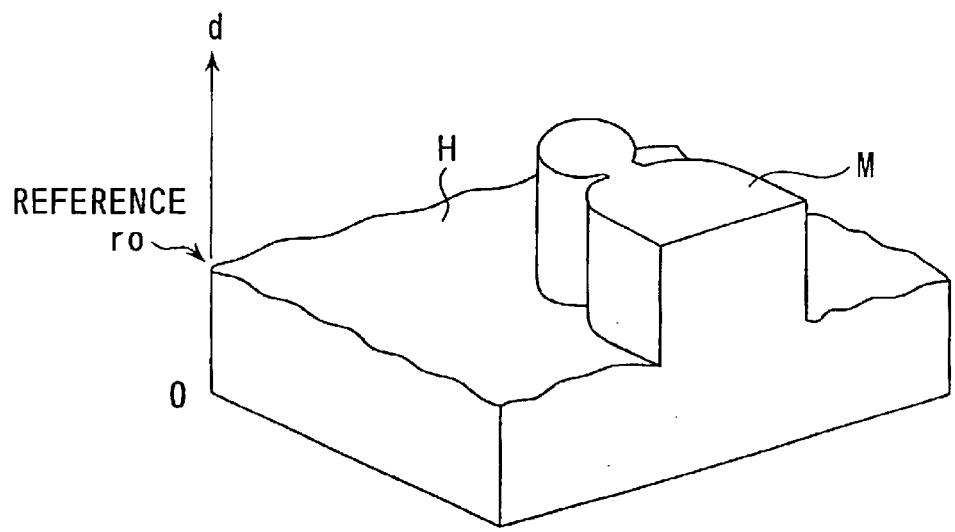
FIG. 47 is a view showing the distribution of standardized data in which sensor data at the time of previous light emission integration is standardized in a three-dimension manner.

The distribution of the sensor data (standardized data at the time of the previous light emission integration) calculated in this manner is shown as seen in FIG. 47.

In this manner, after the microcomputer 111 standardizes the sensor data by the normal integration calculation processing without the previous light emitting operation and the sensor data accompanied by the previous light emitting operation, the microcomputer 111 calculates a difference in the same position between the two sensor data in the whole screen area.

Figure 48:
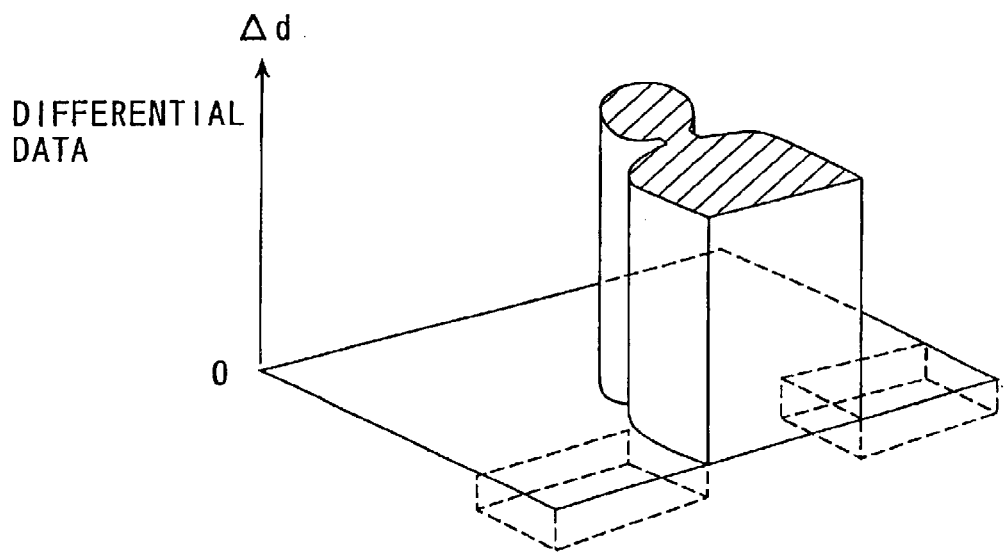
FIG. 48 is a view showing a distribution of differential data calculated on the basis of the standardized data of FIGS. 46 and 47 in a three-dimension manner.
Figure 49:
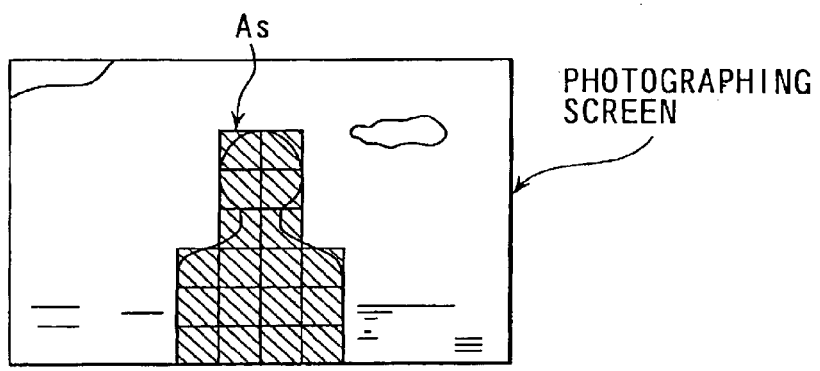
FIG. 49 is a view showing a distance measurement area which becomes an object of the distance measuring calculation processing within the photographing screen of the camera of FIG. 27.

The distribution of the sensor data (the differential data) calculated in this manner is shown as seen in FIG. 48 in a three-dimension manner.

FIG. 48 is a view showing in a three-dimension manner the distribution of the differential data Δd of the sensor data calculated with the calculation means described above with respect to the sensor data obtained with the AF area sensor 112.

Incidentally, in the example described above, a predetermined calculation processing is conducted with respect to all the sensor data which can obtained with the AF area sensor 112. The example is not restricted thereto. For example, only the sensor data within the predetermined range may be treated.

Furthermore, in the example described above, the standardization of all the sensor data is calculated by referencing the area occupying the largest square measurement in the sensor data at the time of the normal integration. The invention is not restricted thereto. For example, the standardized data may be calculated on the basis of the sensor data at the time of the previous light emission integration.

Referring back to FIG. 44, at step S258, the microcomputer 111 judges whether or not there is an area where the differential data Δd becomes larger than the predetermined value dth.

Here, the microcomputer 111 calculates a continuous area pixels having the differential data Δd exceeding the predetermined value dth are continuously distributed, namely, the square measurement Sm of the area denoted by symbol M of FIG. 48.

Then, in the case where this square measurement is the predetermined value Smth or more, the microcomputer 111 judges that the main object is present in this area, thereby setting this area as a distance measurement area.

In other words, the distance measurement area denoted by symbol A becomes an object which is subjected to the distance measuring processing.

Incidentally, the predetermined value (the judgment thresh)=dth is a peculiar established value which is stored in advance in the EEPROM 111e and is a value which is developed in the RAM 111c at the time of the start-up of this camera 100.

On the other hand, at step S258, in the case where judgment is made that the differential data Δd is not the predetermined value dth or more, or in the case where the square measurement is not the predetermined value dth or more, the microcomputer 111 proceeds to the processing at step S261.

At step S259, the microcomputer 111 conducts the predetermined calculation processing with respect to the distance measurement area As.

In this manner, the microcomputer 111 specifies the position of the main object to set the photographing mode to so-called reverse light mode for photographing the main object such as, for example, a person or the like at step S260 so as to reflect this information in the exposure thereof.

Then, the microcomputer 111 completes the sequence of this series of reverse light judging processing (return) to proceed to the processing at step S220 of FIG. 33 described above.

That is, on the basis of the result of the distance measuring calculation processing at step S259 described above, the microcomputer 111 conducts the lens driving processing for driving the focus lens 110a via the focus lens driving section 113.

Incidentally, in the light measuring operation (see step S204 of FIG. 32) in the reverse light mode, the light measuring data is adopted in the light measuring sensor area corresponding to the position of the main object.

Furthermore, apart from this, the luminance data determined from the sensor data of the AF area sensor 112 may be added separately as a light measuring value.

Still furthermore, the predetermined exposure calculation processing (light measuring operation) may be conducted on the basis of the luminance value determined from the sensor data of the AF area sensor 112.

Here, as means for obtaining an appropriate exposure value with auxiliary illumination light with respect to the main object in the reverse light state, namely, in the exposure calculation processing in the reverse light scene, means is provided for applying auxiliary illumination light to the main object by means of the flash light emitting means at the time of exposure operation.

In this case, it is possible to obtain an image with an appropriate exposure value with the auxiliary illumination light of the flashlight emitting means with respect to the main object in the reverse light state. On the other hand, it is also to obtain an image with a normal exposure value because the auxiliary illumination light does not affect the background.

In this manner, the exposure operation at step S206 of FIG. 32 is conducted so that an appropriate exposure can be obtained with respect to the main object in the reverse light state.

On the other hand, judgment is made so that the scene is the reverse light state. In the case where the microcomputer 111 proceeds to the processing at step S261, the microcomputer 111 conducts a normal AF processing at step S261.

In other words, a predetermined distance measuring calculation processing is conducted for each of the predetermined area set in advance, so that the result of the distance measurement located at the nearest distance side is selected.

As has been explained above, according to the sixth embodiment, light emission in the light quantity providing an appropriate exposure with respect to the main object which is discriminated is conducted with the flashlight emitting means in the night scene. At the same time, an appropriate exposure is obtained with respect to the background of the low luminance portion with the result that the noise reduction in the low luminance portion and the latitude and the color reproducibility in the high luminance portion are improved. Thus, a favorable photo image can be obtained even in the night scene.

Furthermore, in the reverse light scene, a medium luminance portion which has a relatively low luminance is detected. Then, judgment is made that the main object is present in the medium luminance area which is detected. Since the exposure value is set by placing an emphasis on the area, the influence of the luminance of the background portion which provides a high luminance and which is free from the presence of the desired image of the object is removed with the result that photography is conducted by an appropriate exposure with respect to the desired main object, for example, a person or the like.

Consequently, the main object can be photographed with an appropriate exposure, and a favorable photo image can be obtained.

Then, the position of the main object image within the photographing screen is discriminated with certitude, and a focus detection processing is conducted with respect to the desired main object so that a highly precise distance measuring processing (AF processing) is conducted thereby securing a comfortable operability.

Incidentally, in the camera 100 provided with a multiple-point distance measuring apparatus according to the sixth embodiment, a signal processing is conducted by using all the pixel data(sensor data) which can be obtained with the group 112a of light receiving elements of the AF area sensor 112 at the time of the "reverse light judging processing". In this case, there is a tendency that the capacity of the sensor data increases to a huge quantity with an increase in the number of light receiving elements (the number of pixels) constituting the group of light receiving elements 112a.

When the capacity of the data in the sensor data increases, time for conducting each kind of calculation is prolonged with the result that time is prolonged for conducting a predetermined calculation upon receipt of the generation of an instruction signal until the series of processing is completed. Thus, time lag increases.

When the time lag increases in this manner, the operability of the camera itself is hindered.

Then, for example, a means can be considered for dividing the light receiving surface (whole distance measurement area) formed of the group of light receiving elements 112a of the AF area sensor 112 into a predetermined plurality of blocks and subjecting the sensor data inside of this divided block to addition processing to handle the data as one pixel data.

When the capacity of the sensor data can be decreased, this can contribute toward an increase in the speed of calculation so that the problem of the time lag can be settled.

In this case, when the photographing optical system for dividing the light receiving surface (whole the distance measuring surface) of the AF area sensor into a predetermined plurality of blocks is a zoom lens whose scaling can be changed, setting the size (the pixel number of blocks and light receiving surface) of the unit blocks to be divided to be definite at all times irrespective of the focus distance, the sensor data quantity in the case where the photography angle is set to a wide angle side becomes larger than the sensor data quantity in the case where the photography angle is set to the telephoto screen side having a narrower angle, so that the sensor data quantity increases with the change in the focus distance and time required for calculation processing largely changes.

Consequently, a variation corresponding thereto will be described hereinbelow.

In the beginning, the light receiving surface of the AF area sensor 112 is equally divided into a predetermined unit blocks (the number of pixels or the light receiving surface square measurement in one block), so that the setting is made in such a manner that the size (the square measurement of this one block) is rendered variable in accordance with the focus distance of the photographing optical system set at each time of photography.

Such procedure enables the prevention of a large change in the time required for the calculation processing corresponding to the change in the focus distance of the photographing optical system.

Figure 50:
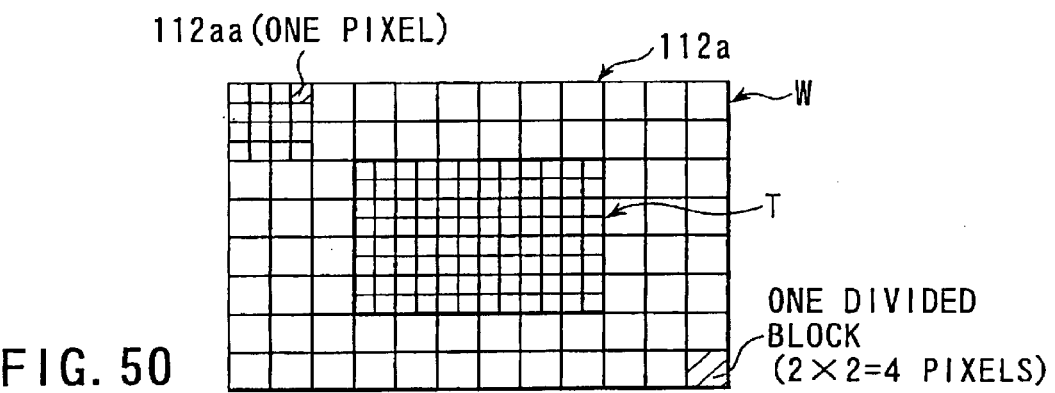
FIG. 50 is a conceptual view showing a first variation of a sixth embodiment of the present invention when the whole light receiving surface of the light receiving element of the AF area sensor is divided into predetermined units of blocks, the view showing, at the same time, a light receiving area in accordance with a focus distance of a photographing optical system with respect to the whole light receiving area of the AF area sensor.

In other words, FIG. 50 is a view showing a first variation of the sixth embodiment described above. The view is a conceptual view at the time of dividing the whole area of the light receiving surface of the group of light receiving elements 112a of the AF area sensor 112, the view showing a light receiving area corresponding to the focus distance of the photographing optical system with respect to the entire light receiving area of the AF area sensor 112.

In FIG. 50, the area denoted by symbol W becomes a light receiving surface of the AF area (in this case, the whole light receiving area corresponds thereto) at the time when the photographing optical system is set to the side of the short focus (the wide-angle and the telephoto screen).

In this manner, on the side of the short focus, the number of light receiving elements 112a (the number of pixels) of the AF area sensor corresponding to the photographing screen increases.

Consequently, for example, two pixels X two pixels=four pixels is set as one divided block, so that four pixels included in this one block is subjected to addition processing with the result that the pixels are treated as one piece of pixel data.

The addition processing of the sensor data conducted here is a calculation processing conducted with the microcomputer 111 on the basis of information on the focus distance or the like of the photographing optical system.

Incidentally, apart from this, it is considered that an analog addition processing is conducted in a processing circuit on the side of the AF area sensor 112 upon receipt of a predetermined instruction signal from the microcomputer 111.

As this analog addition processing means, there can be considered means for conducting addition processing with the level of the electric load generated by the photodiode or the like, means for conducting addition processing of a voltage output of the pixel amplifying circuit or the like.

On the other hand, an area denoted by symbol T in the above FIG. 50 becomes a light receiving area of the AF area sensor 112 at the time of arranging the photographing optical system to the side of a long focus (the telephoto screen).

In this manner, on the side of the long focus, the number of light receiving elements 112$aa$ (the number of pixels) of the AF area sensor 112 corresponding to the photographing screen at the time of setting the system to the side of long focus as compared with the setting of the system to the short focus.

Consequently, the sensor data of one pixel is treated as pixel data for one pixel portion as it is.

By doing so, there is no change between the capacity of the sensor data treated on the short focus (wide-angle) side and the capacity thereof treated on the side of the long focus (the telephoto angle) side. Thus, it never happens that the calculation time largely changes because of the difference in the focus distance.

Incidentally, in the above example, four pixels are treated as one block. However, the setting of the number of pixels or the like is not restricted thereto. The setting of the number of pixels can be changed and applied in various manner depending upon various conditions such as the total number of pixels of the AF area sensor 112, the focus distance and the scaling of the photographing optical system or the like.

Besides, apart from this, the same advantage can be obtained by conducting a thin-out processing for a predetermined time with respect to all the sensor data which can be obtained with, for example, the AF area sensor 112 to decrease the capacity of the sensor data.

By the way, in the camera 100 provided with the multiple-point distance measuring apparatus of the sixth embodiment of the invention, means shown in the following (second variation) can be considered as a variation for conducting the "reverse light judging processing".

That is, this is means for considering and discriminating the configuration of the main person or the like, and the size (square measurement) occupied by the main object in the photographing screen.

In this case, for example a person is considered as the main object, the configuration of the portion corresponding to the face portion and the head portion is formed approximately in a circular configuration while the body corresponding to the body portion is formed approximately in a rectangular configuration.

Furthermore, in the case where the main object is a person, it is natural that differences exist for each age, and for each individual. The size of the image of a person formed on the light receiving surface of the AF area sensor 112 is such that an approximately standard size can be regulated in accordance with a distance to the object.

Consequently, in this variation, data on the size of a standard person in accordance with the distance to the object (hereinafter referred to as an object data) is prepared in the EEPROM 111$e$ or the like, and this object data is compared with the size of the image formed on the light receiving surface of the AF area sensor 112, so that judgment is made whether or not the image of the object is a person or not.

Figure 51:
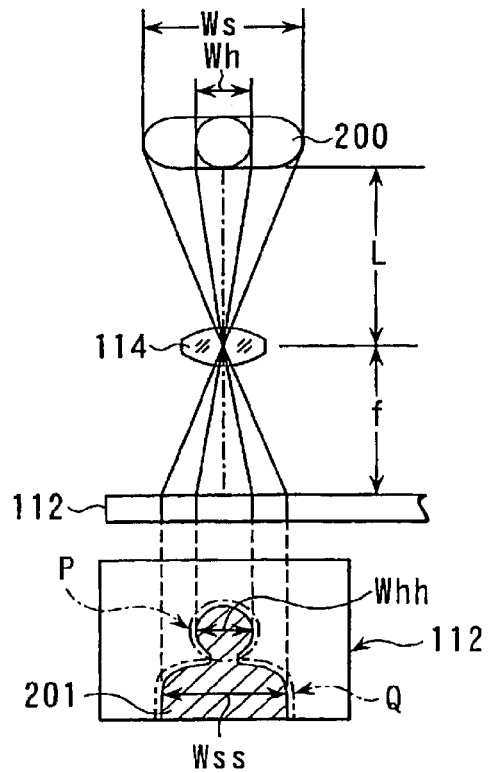
FIG. 51 is a view showing a second variation of the sixth embodiment of the present invention, the view explaining means for discriminating a main object image in the case where the main object is a person at the time of conducting the "reverse light judging processing".

FIG. 51 is a view showing a second variation of the sixth embodiment, the view explaining means for discriminating the image of the main object in the case where the main object is a person at the time of conducting the "reverse light judging processing".

As shown in FIG. 51, in the case where the distance measuring apparatus of this variation is arranged so as to be located opposite to the main object 200 such as a person or the like, the flux of light from the side of the main object 200 passes through the distance measuring optical system 114 of the distance measuring apparatus, so that the image of the object is formed with the result that the image 201 of the main object is formed on the light receiving surface of the AF areas sensor 112.

Here, the width size of the object itself which runs approximately parallel to the light receiving surface of the AF area sensor 112, namely the width size of the portion corresponding to the head portion of the object is denoted by symbol Wh while the width size (specifically, the width of the shoulder of the person 200) of the object itself at a portion corresponding to the body portion is denoted by symbol Ws.

Furthermore, the distance to the object from the distance measuring optical system 114 is denoted by symbol L, while the distance between the distance measuring optical system 114 and the light receiving surface of the AF area sensor 112, namely the focus distance of the distance measuring optical system 114 is denoted by symbol f.

With respect to the image 201 of a person in the light receiving surface of the AF area sensor 112 at this time, the width Whh of the image corresponding to the head portion and the width Wss of the portion corresponding to the body portion can be represented in the following way.

In other words, $Whh = Wh \times f/L$ $Wss = Ws \times f/L$

In this manner, when the predetermined object data in accordance with the distance to the object is prepared in the EEPROM 111$e$ or the like in advance, the predetermined object data can be compared with the data such as the configuration of the object and the size (measurement) based on the sensor data obtained by the AF area sensor 112 to judge whether the object image is a person or not.

Incidentally, the processing for discriminating on the basis of the configuration of the object image or the like as to whether or not the object is the main object is referred to as configuration differentiation processing.

Figure 52:
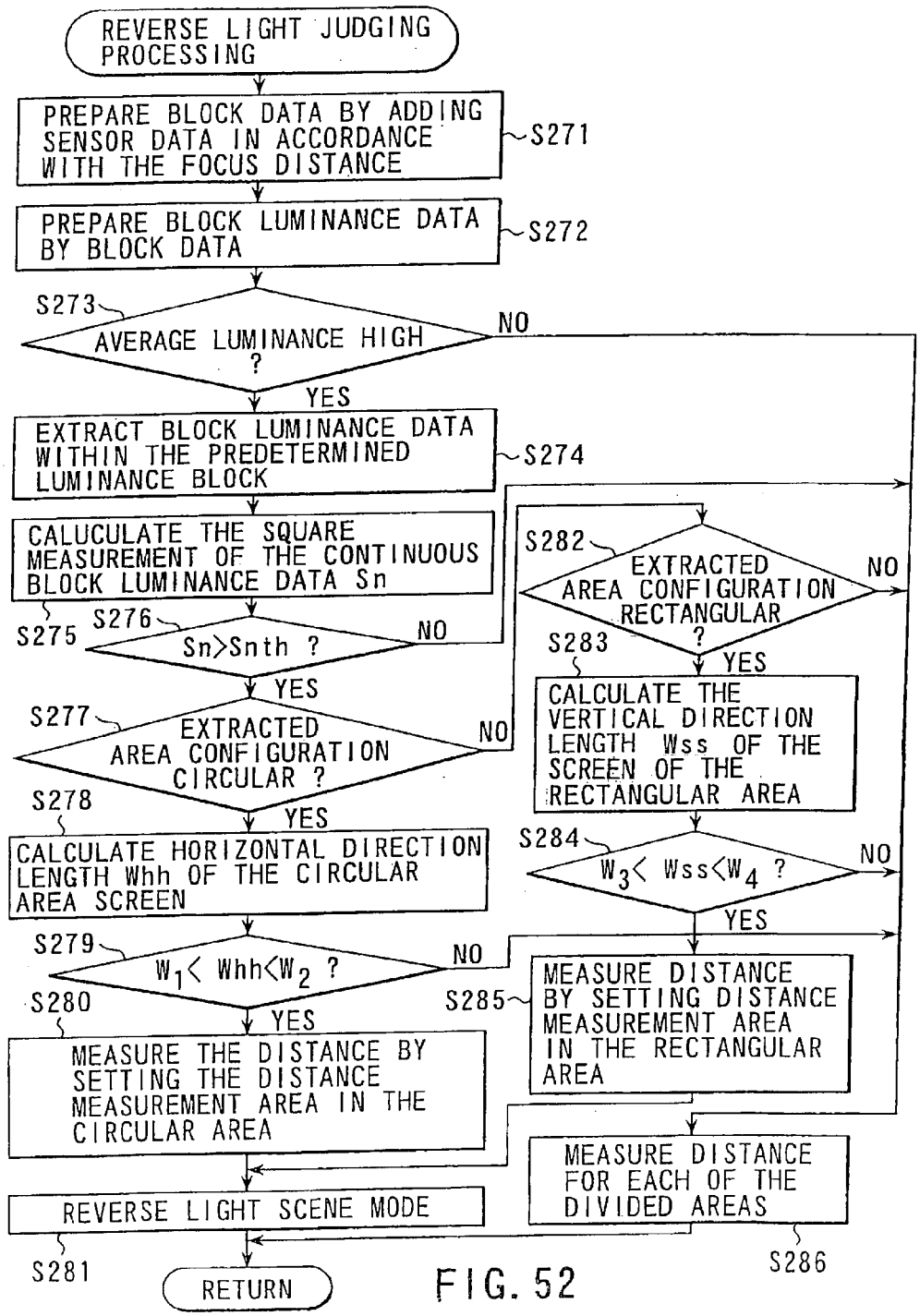
FIG. 52 is a flowchart showing a sequence of the "reverse light judging processing" in the second variation of FIG. 51.

FIG. 52 is a flowchart showing a sequence of the reverse light judging processing in this variation, which comprises a sequence added with the configuration differentiation processing described above.

The action at the time when the reverse light processing is conducted in this variation in this flowchart will be explained as follows.

In the beginning, at step S271, the microcomputer 111 prepares block data by conducting addition processing of the sensor data read in accordance with the focus distance information.

The processing which is conducted here is a processing which has been explained in the first variation described above (see FIG. 50).

Next, at step 272, the microcomputer 111 prepares luminance data for each block from the block data prepared at step 272, and at the same time, calculates the average luminance on the basis of the whole luminance data that has been prepared.

Subsequently, at step S273, the microcomputer 111 judges whether or not the average luminance data of the whole sensor data is higher than the predetermined value.

Here, in the case where judgment is made that the average luminance is higher than the predetermined value, the microcomputer 111 proceeds to step S274. In the case where judgment is made that the average luminance is lower than the predetermined value, the microcomputer 111 proceeds to the processing at step S286.

At step S274, since the microcomputer 111 judges that the luminance is high, the microcomputer 111 conducts the processing of extracting the luminance data of the block within the predetermined luminance range. At the next step S275, the square measurement of the continuous block luminance data is calculated so that the square measurement is set to square measurement=Sn.

Next, at step S276, the microcomputer 111 compares the square measurement=Sn calculated at step S275 described above with the predetermined judgment value Snth.

Here, in the case where Sn>Snth is established, the microcomputer 111 proceeds to the processing at step S277. In the case where Sn>Snth is not established, in other words, Sn≦Snth is established, the microcomputer proceeds to the processing at step S286.

At step S277, the microcomputer 111 conducts the configuration judging processing as to whether or not the image configuration of the extracted area has an approximately circular configuration.

Here, in the case where judgment is made that the configuration of the extracted area is approximately circular, the microcomputer 111 proceeds to the processing at the subsequent step S278. In the case where judgment is made that that the configuration is not approximately circular, the microcomputer 111 proceeds to the processing at step S282.

Here, details of the configuration judging processing will be explained.

The area extracted at the above step S274 and step S275 described above is an area P (the square measurement thereof=Sc is established) and an area Q (the square measurement thereof=Sd is established) (see FIG. 51).

Here, in order to differentiate the configuration of the image, means by the pattern matching with the predetermined image is generally used.

That is, in the extracted area, it is possible to specify from the square measurement of the image of the area P the radius of the circular configuration which has a square measurement=Sc.

Consequently, the microcomputer 111 sets the circular configuration as a reference circle and calculates the correlation between the image of the extracted area and the reference circular image to differentiate a circular configuration when the correlation is higher than the predetermined value.

At step S278 of FIG. 52, since judgment is made that the configuration of the area extracted in the differentiation at step S277 is approximately circular, the microcomputer 111 calculates the length Whh in the width direction of the image of this approximately circular area (a circular area).

Next, at step S279, the microcomputer 111 judges whether or not the relationship between the length Whh in the width direction of the approximately circular area and the predetermined lengths W1 and W2 stored in the EEPROM 111e in advance is the relationship of W1<Whh<W2.

Here, in the case where the relationship of W1<Whh <W2 is established, the microcomputer 111 proceeds to the processing at the subsequent step S280. In the case where the relationship is not established, the microcomputer 111 proceeds to the processing at step S286.

Figure 53:
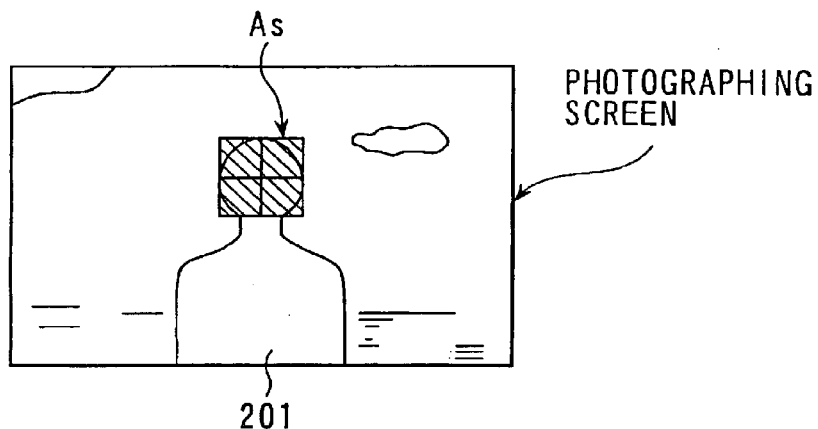
FIG. 53 is a view showing a distance measurement area which becomes an object for conducting distance measuring calculation processing within the photographing screen of the camera of FIG. 51.

At step S280, the microcomputer 111 prepares the distance measurement area by setting at least one distance measurement area As (see FIG. 53) in the circular area P (see FIG. 51) followed by conducting the predetermined distance measuring calculation processing with respect to this distance measurement area.

Incidentally, in the case where a plurality of distance measurement areas are set, the microcomputer 111 prepares one item of distance measurement data by conducting the predetermined distance measuring calculation processing for each of the distance measurement areas and conducting, for example, the nearest selection processing, the average processing or the like with respect to the result of a plurality of distance measurement calculations.

Then, at step S281, the microcomputer 111 completes the sequence of a series of reverse light judging processing after setting the photographing mode of the camera to the reverse light mode (return).

On the other hand, at the above step S277, the microcomputer 111 proceeds to the processing at step S282 in the case where judgment is made that the configuration of the image in the extracted area is not approximately circular, the microcomputer 111 proceeds to the processing at step S282. At step S282, the microcomputer judges whether or not the configuration of the image in the extracted area is approximately rectangular.

The configuration differentiation processing in this case is the same as the configuration judging processing of the approximately circular configuration judging processing which is conducted at the above step S277.

That is, the configuration judging processing conducted at step S282 is conducted with respect to the area Q of FIG. 51.

At step S282, in the case where judgment is made that the configuration of the image in the extracted area is approximately rectangular, the microcomputer 111 proceeds to the processing at step S283. In the case where judgment is made that the configuration is not approximately rectangular, the microcomputer 111 proceeds to the processing at step S286.

At step S283, the microcomputer 111 calculates the length Wss in the width direction of the image in the extracted area, namely, approximately rectangular area (a rectangle area). At the step S284 described above, judgment is made on the result of the calculation at step S283 as to whether the relationship between the length Wss in the width direction of the approximately rectangular configuration and the predetermined judgment values W3 and W4 stored in the EEPROM 111e is the relationship of W3<Wss<W4.

Here, in the case where the relationship of W3<Wss<W4 is established, the microcomputer 111 proceeds to the processing at the next step S285. In the case where the above relationship is not established, the microcomputer 111 proceeds to the processing at step S286.

At step S285, after setting at least one distance measurement area in the rectangular area Q (see FIG. 51), the microcomputer 111 conducts the predetermined distance measuring calculation processing with respect to this distance measurement area to prepare the distance measurement data.

Incidentally, in the case where a plurality of areas are set here, the microcomputer 111 prepares one distance measurement area by conducting the predetermined distance calculation processing for each of the distance measurement areas and conducting, for example, the nearest selection processing, the average processing or the like with respect to the result of a plurality of distance measuring calculation results.

Then, the microcomputer 111 proceeds to the processing at step S281. Here, after setting the photographing mode of the camera to the "reverse light scene mode", the microcomputer 111 completes the sequence of a series of "reverse light scene mode" (return).

On the other hand, as has been described above, (1) In the case where judgment is made that the average luminance of all the sensor data is set to be lower than the predetermined value at step S273 described above, (2) In the case where Sn>Snth is not established (Sn≦Snth is established) at step S276 described above, (3) In the case where the relationship of W1<Whh<W2 is not established at step S279 described above, (4) In the case where judgment is made that the configuration of the image of the extracted area is not approximately circular, and the configuration of the image of the extracted area at step 282 described above is not approximately rectangular at step S277 described above, (5) In the case where the relationship of W3<Wss<W4 is not established at step S284, the microcomputer 111 proceeds to step S286. Then, the microcomputer 111, at this step S286, conducts a normal distance-measuring calculation processing, namely, the predetermined distance measuring calculation processing for each of the divided distance measurement areas, so that the microcomputer 111 conducts the nearest distance selection processing, the average processing or the like with respect to a plurality of calculation results obtained in the above procedure to prepare one distance measurement data, followed by completing the sequence of a series of reverse light judging processing (return).

Incidentally, in this case, the photographing mode is not changed over, so that the normal photographing mode is being set.

Incidentally, at step S279 and at step S284, the predetermined judgment values W1, W2, W3, W4 read from the EEPROM 111e are values set in consideration of the distance range where the person (the object) is present who is set in the reverse light state out of the photographing screens, namely the range where the photographing scale is set to 1/30 to 1/80, and at the same time, in consideration of the individual difference.

On the other hand, after preparing the distance measurement data at the above step S280 or S285 described above, the microcomputer 111 may conduct the following processing.

In other words, after preparing the distance measurement data, the microcomputer 111 compares this distance measurement data Ls and the length=Whh in the image width direction of the approximately circular configuration and the length=Wss in the image width direction of the approximately rectangular area with the predetermined object data present in the EEPROM 111e in advance, namely, each data of the image width Wha for the portion corresponding to the head portion and the image width Wsa for the portion corresponding to the body portion.

Then, by doing so, the distance measurement precision can be improved with more certitude.

That is, the following mathematical expressions are given.

$$Wha+\Delta W1h < Wh \cdot Ls/f < Wha+\Delta W2h$$

$$Wsa+\Delta W1s < Ws \cdot Ls/f < Wsa+\Delta W2s$$

Here, symbols ΔW1h·ΔW2h·ΔW1s·ΔW2s represent constants showing the tolerable scopes respectively.

The distance measurement areas selected only in the case where such relationship is established are adopted.

Incidentally, this second variation provides the following advantage.

Figure 54:
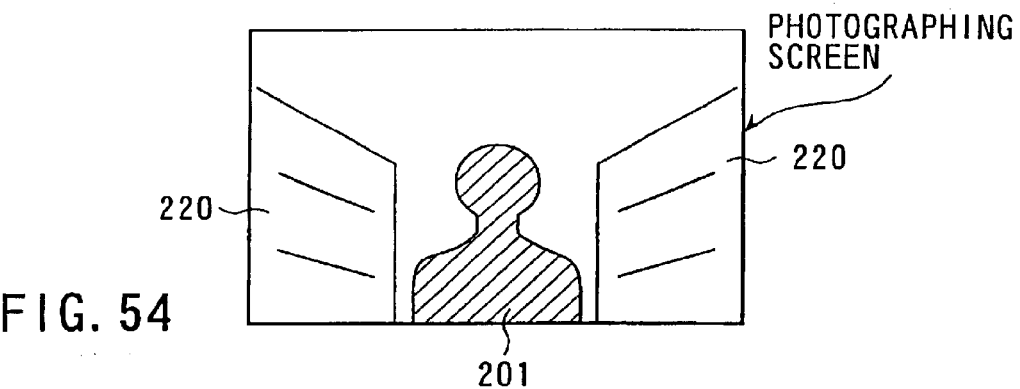
FIG. 54 is a view showing an example of a structure of the photographing screen in the case where a non-main object is present in a nearer distance than the main object.

FIG. 54 shows a structure example of the photographing screen in the case where the non-main object is present in a nearer distance than the main object.

As the structure of the photographing screen shown in FIG. 54, there is shown a case in which, for example, in the reverse light state the main object image (a person or the like) 201 is arranged approximately in the central portion, and another object (non-main object 220) is located at a nearer distance than the object 201.

In such a case, the configuration of the non-main object 210 is not approximately circular, and the size thereof is different from the person image 201. That is, since the non-main object 210 is located at a nearer distance than the person image 201 so that the length of the non-main object in the width direction thereof is larger than the predetermined image width Whh·Wss of the person image 201 respectively. Thus, the image of this region is not extracted, and the area corresponding to the person image 201 can be extracted with certitude.

Consequently, in the case of such photographing screen structure, the distance measurement area is set with certitude with respect to the person image 201. On this basis, the predetermined focus detection processing is conducted.

Next, as the third variation of the "reverse light judging processing" in the camera 100 provided with the distance measuring apparatus of the sixth embodiment described above, there is considered means for setting to different values the square measurement judgment value Snth and the main object judgment value Smth for conducting the "reverse light judging processing" depending upon the position within the photographing screen.

Figure 55:
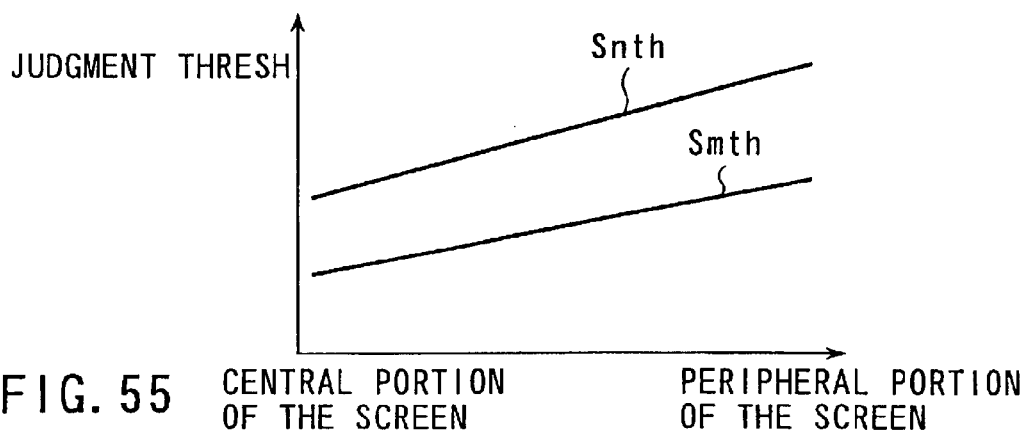
FIG. 55 is a view showing a third variation of the sixth embodiment of the present invention, the view showing a relationship between the position of the photographing screen and the judgment thresh value.

FIG. 55 is a view showing a relationship between the position of the photographing screen and the judgment threshold value in the third variation.

As shown in FIG. 55, the judgment threshold value is set in such a manner that the value becomes small approximately in the central portion of the photographing screen and the value becomes large in the peripheral portion thereof.

Normally, as a structure of the photographing screen in the case where the photography is conducted, there is a tendency that the main object such as, for example, a person or the like is arranged approximately in the vicinity of the central portion of the photographing screen.

Consequently, it can be considered that the "reverse light judging processing" is facilitated by setting the judgment thresh value approximately in the central portion of the photographing screen to be small as compared with the value in the peripheral portion thereof.

Furthermore, there is also provided an advantage in that when the square measurement of the area used for conducting the "reverse light judging processing" becomes small, the amount of data to be treated decreases so that an increase in the speed of conducting the processing can be facilitated.

Furthermore, apart from this, there is considered means for changing the square measurement Snth for conducting the "reverse light judging processing" and the main object judgment value Smth in accordance with each kind of photographing screen.

For example, in the portrait mode used for conducting primarily the photography of persons or the like, a scheme is general wherein the main object such as a person or the like is arranged in the vicinity of the approximately central portion of the photographing screen.

Then, the case increases wherein at this time the main object image occupies a relatively large area with respect to the whole area of the photographing screen.

Consequently, in such a case, setting the judgment values Snth·Smth to be smaller than the case of other photographing modes, namely, the scene mode and the macro mode facilitates the reverse light judging processing and contributes toward the increase in the speed of the processing.

On the other hand, in the case where the main object is a person or the like, the main object is arranged at a position deviated toward the lower side of the photographing screen. There can be seen many schemes in which the side deviated toward the upper side becomes a background.

The portion which becomes the background at this time is occupied by the high luminance area, so that it can be considered that the detection of this area is relatively easy.

Consequently, a fourth variation can be considered wherein judgment is made where the scene is the reverse light scene including such scheme information (position information or the like of the main object image in the photographing screen).

In normal cases, the photographing screen of the camera 100 is usually set to be rectangular.

Consequently, in the case where photography is conducted, a desired scheme can be determined by means of the horizontal position photography in which the rectangular photographing screen is set so that the horizontal side becomes longer and the vertical position photography in which the rectangular photographing screen is set so that the vertical side becomes longer.

Figure 56:
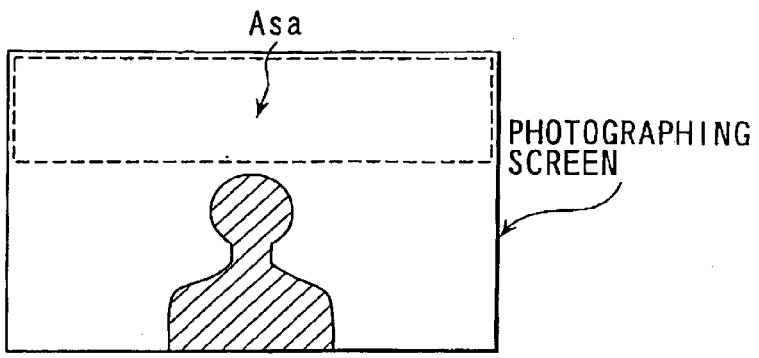
FIG. 56 is a view showing an example of a structural view of a case of horizontal position photographing operation at the time when a person or the like is photographed as a main object in the fourth variation of the sixth embodiment of the present invention, the view showing a distance measurement area together therewith.
Figure 57:
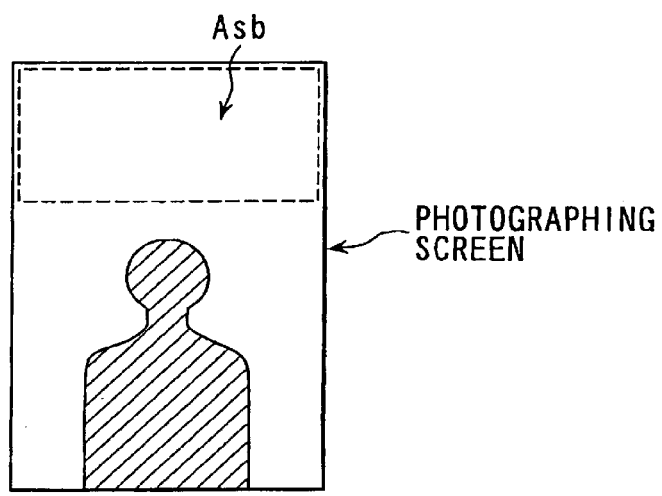
FIG. 57 is a view showing the fourth variation of FIG. 56, the view showing a structural view of the case of the vertical position photographing operation at the time when a person or the like is photographed as a main object, the view also showing a distance measurement area.

FIGS. 56 and 57 show examples of a scheme in the case where persons or the like are photographed as a main object.

FIG. 56 shows an example in the case of the horizontal position photography.

FIG. 57 shows an example in the case of the vertical position photography.

As shown in FIGS. 56 and 57, an area which constitutes a background in the case of the horizontal position photography, namely, the detection area Asa, and an area which constitutes a background in the case of the vertical photography, namely, the detection area Asb are located at different positions.

In consideration of this fact, in this variation, the detection area is set in accordance with the direction of the photographing screen by detecting whether the photographing screen is set to the horizontal position or the vertical position prior to the judgment of the photographing screen.

Consequently, in the camera 100 of the variation, a camera posture detection section 124 is arranged for detecting the posture of the camera 100 at the time of photography (see FIG. 27).

Then, in this variation, the camera posture detection section 124 detects whether the photographing screen of the camera 100 is set to the vertical position or to the horizontal position, so that the position of the detection area is set on the basis of the direction of the photographing screen detected in this manner.

Figure 58:
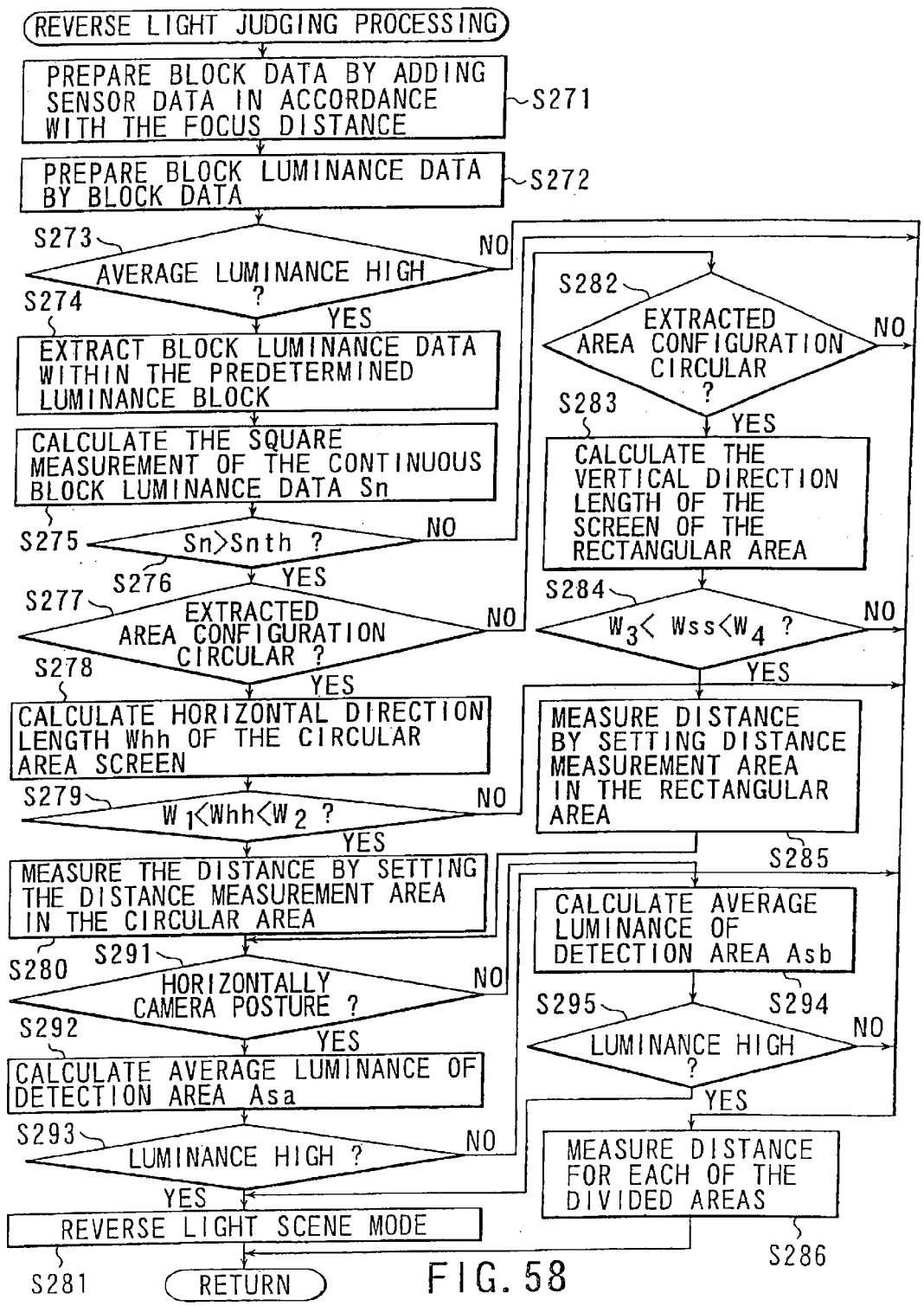
FIG. 58 is a flowchart showing a sequence of the reverse light judging processing in the fourth variation of the sixth embodiment of the present invention.

Here, an operation of the "reverse light judging processing" in this variation will be explained hereinbelow in the flowchart of FIG. 58.

Incidentally, the "reverse light judging processing" of this variation is such that the above processing, namely, the vertical and horizontal processing and the processing for judging the luminance of the detection area according to the direction of the photographing screen is added to the sequence (see FIG. 52) of the "reverse light judging processing" of the second variation described above.

Consequently, an explanation is omitted with respect to the portion explained in the second variation described above. An explanation is given only with respect to the portion explained in the second variation described above.

The microcomputer 111 enters the "reverse light judging processing" to judge that the photographing screen which becomes an object is the reverse light scene via the processing at steps 271 through 285, and conduct the focus detection processing in the predetermined distance measurement area. Thereafter the microcomputer 111 proceeds to the processing at step S291.

At this step S291, in the beginning, the camera posture detection section 124 detects the posture of the camera 100.

In the case where judgment is made that the photographing screen of the camera 100 is located in the horizontal position, the microcomputer 111 proceeds to the processing at the next step S292. In the case where judgment is made that the photographing screen is located in the vertical position, the microcomputer 111 proceeds to the processing at step S294.

Since the photographing screen is located in the horizontal position at step S292, the microcomputer 111 sets the area Asa shown in FIG. 56 as the detection area (also referred to as the detection area) to calculate the average luminance value in this detection area Asa.

Subsequently, at step S293, the microcomputer 111 judges whether or not the average luminance value of the detection area Asa which value is calculated at the above step S292 is not less than the predetermined value, namely the detection area Asa has a high luminance.

Here, in the case where judgment is made that the detection area Asa has a high luminance value, the microcomputer 111 judges that the scene to be photographed is the reverse light scene to proceed to the processing at step S281.

Furthermore, in the case where judgment is made that the scene does not have a high luminance, the microcomputer 111 proceeds to the processing at step S286.

The processing at steps after step S286 is described above (see FIG. 52).

On the other hand, in the above step S291, judgment is made that the photographing screen is located in the vertical position instead of the horizontal position, the microcomputer 111 proceeds to the processing at step S294. At step S294, the microcomputer 111 sets the area Asb shown in FIG. 57 as the detection area to calculate the average luminance value in this detection area Asb.

Subsequently, at step S295, the microcomputer 111 judges whether or not the average luminance value of the detection area Asb calculated at the above step S294 is not less than the predetermined value, namely the detection area Asb has a high luminance.

Here, in the case where judgment is made that the detection area Asb has a high luminance, the microcomputer 111 judges that the scene to be photographed is the reverse light scene to proceed to step S281.

Furthermore, in the case where judgment is made that the detection area Asb does not have a high luminance, the microcomputer proceeds to the processing at step S286.

The processing at steps after step S286 is as has been described above (see FIG. 52).

In this manner, according to the fourth variation described above, judgment can be made with more certitude and accuracy as to whether or not the scene is the reverse light scene or not by adding a processing of confirming the luminance in the background area.

By the way, with respect to the "night scene judging processing", according to the sixth embodiment, judgment is made as to whether the high luminance portion is dotted. Apart from this, a fifth variation can be considered which is shown hereinbelow.

In a normal case, there is a tendency that a high contrast image is provided because the difference in the luminance is large between the high luminance portion and the low luminance portion in the night scene (see FIG. 35).

That is, the night scene has the following features.
(1) The scene is generally low in luminance (the average luminance is low).
(2) The sum total of the contrast in the photographing screen is higher than the predetermined value (the absolute value of the luminance difference) (the contrast is high).

Consequently, it is thought that it is easy to judge whether or not the scene is the night scene by detecting a portion which provides a high contrast in the photographing screen.

Figure 59:
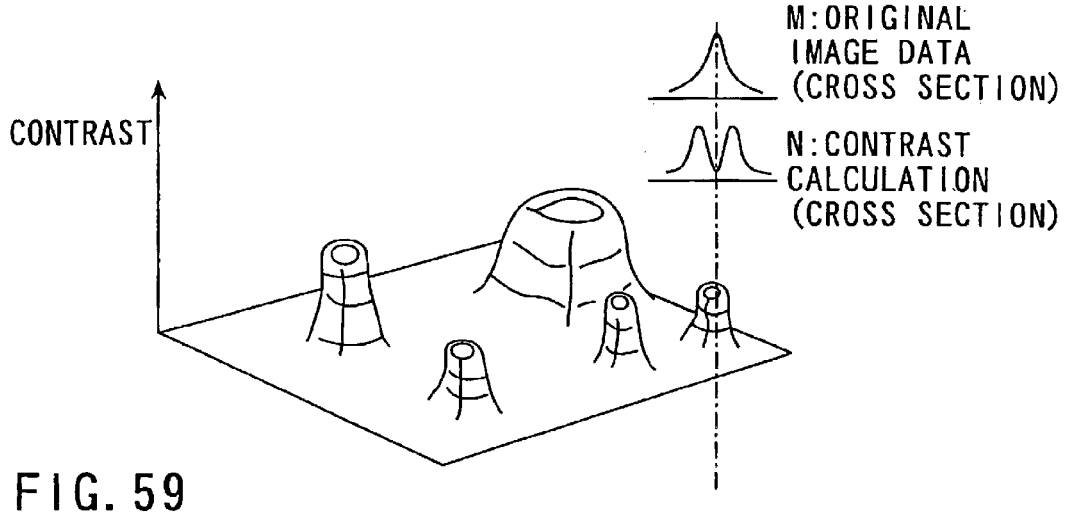
FIG. 59 is a view showing a fifth variation of the sixth embodiment of the present invention, the view showing a contrast distribution based on sensor data of a night scene (FIG. 36) obtained with the AF area sensor of the camera (FIG. 27) in a three-dimension manner.

FIG. 59 is a view showing in a three-dimension manner a contrast distribution based on the sensor data of the night scene (see FIG. 35) obtained with the AF area sensor of the camera provided with the multiple-point distance measuring apparatus of the sixth embodiment described above.

The contrast of the image can be calculated by calculating a sum of the contrast value of all the pixels in the predetermined area after determining the absolute value (the contrast value) of the difference between the individual pixel data (sensor data) obtained with individual light receiving element 112*aa* of the group 112*a* of light receiving elements of the AF area sensor 112 and the pixel data (sensor data) in the peripheral portion.

Incidentally, the sectional configuration on the distribution view after the contrast calculation processing will be as denoted by symbol N with respect to the sectional configuration (denoted by symbol M) on the distribution view of the sensor data which constitutes the core as shown in FIG. 59.

In other words, it is shown that the highest contrast is provided on the boundary portion between the area of the high luminance portion and the area of the low luminance portion.

Figure 60:
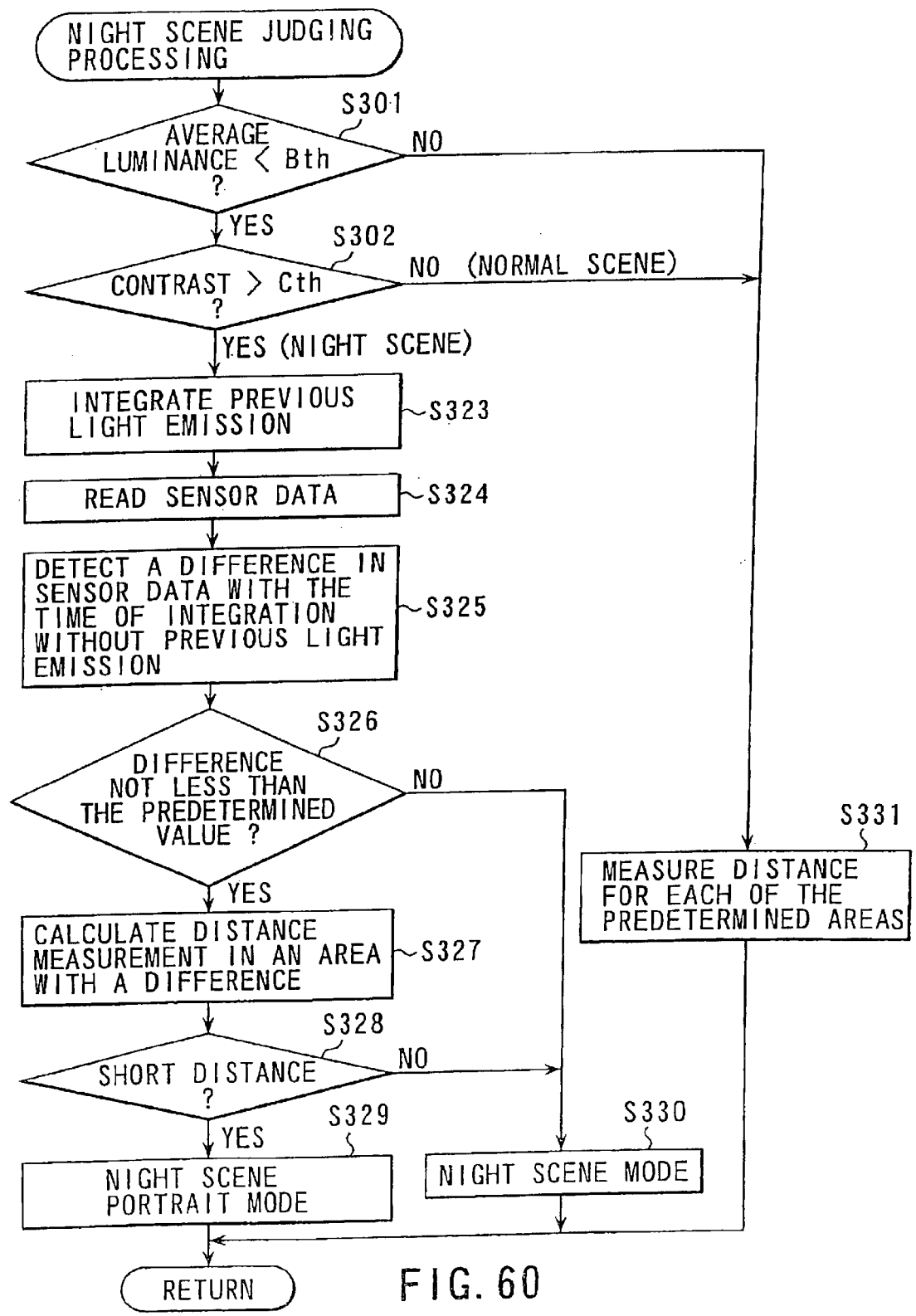
FIG. 60 is a flowchart showing a sequence of the "night scene judging processing" based on a contrast value of a photographing screen according to a fifth variation of the sixth embodiment of the present invention.

Next, the operation at the time of conducting the night scene judging processing on the basis of the contrast value of the photographing screen will be as shown in the flowchart shown in FIG. 60.

Incidentally, FIG. 60 is different in that the processing at steps S301 and S302 is conducted in place of each of the processing at steps S221 and S222 in the sequence (FIG. 38) of the "night scene judging processing" in the sixth embodiment described above.

That is, in this variation, when proceeding to the "night scene judging processing" of FIG. 60, the microcomputer 111 calculates the average value of the luminance data of each pixel on the basis of the sensor data in the whole area of the detection area of the AF area sensor 12 and the integration time to judge whether or not the scene to be photographed is in a low luminance state by comparing the data as to whether or not the average luminance value obtained as a result of the calculation is smaller than the thresh value Bth representing the predetermined luminance value.

Here, in the case where judgment is made that the calculated average luminance value is lower than the predetermined value Bth, the microcomputer 111 proceeds to the processing at step S302. On the other hand, in the case where judgment is made that the calculated luminance value is higher than the predetermined value, the microcomputer 111 proceeds to the processing at step S231.

At the above step S301, when judgment is made that the average luminance value is lower than the predetermined value Bth and the microcomputer 111 proceeds to step the processing at step S302, the microcomputer 111 conducts at step S302 the above predetermined contrast calculation processing with respect to the whole scene to be photographed to compare the calculation result as to whether the calculation result is higher than the predetermined thresh value Cth.

Here, in the case where judgment is made that the result of calculation is higher in contrast than the predetermined value Cth, the microcomputer 111 judges that the scene is the night scene to proceed to the processing at step S223. In the case where judgment is made that the scene is low in contrast, the microcomputer 111 judges that the scene is not the night scene but is a normal scene to proceed to the processing at step S231.

In this manner, when both the condition at step S301, namely the average value<Bth, and the condition at step S302, namely the contrast value>Cth are satisfied, the microcomputer 111 judges that the scene is the night scene mode.

Then, in the case where judgment is made that the scene is the night mode, the microcomputer conducts a series of processing at steps after step 223.

Incidentally, the series of processing at steps after step S223 is the completely same as the processing explained in the above FIG. 38, and a detailed explanation thereof is omitted.

According to the fifth variation according to the sixth embodiment will be explained.

Next, the sixth variation of the sixth embodiment described above will be explained.

In this sixth variation, by citing the case shown in FIG. 35 as an example, there will be explained a case in which the processing at steps S225 through S227 is conducted, namely the case in which judgment is made as to whether or not the photographing mode to be set is to be set to the "night scene portrait mode" or to the normal "night scene mode" at the time of judging that the scene is the night scene (incidentally, see FIGS. 45 through 48).

Figure 61:
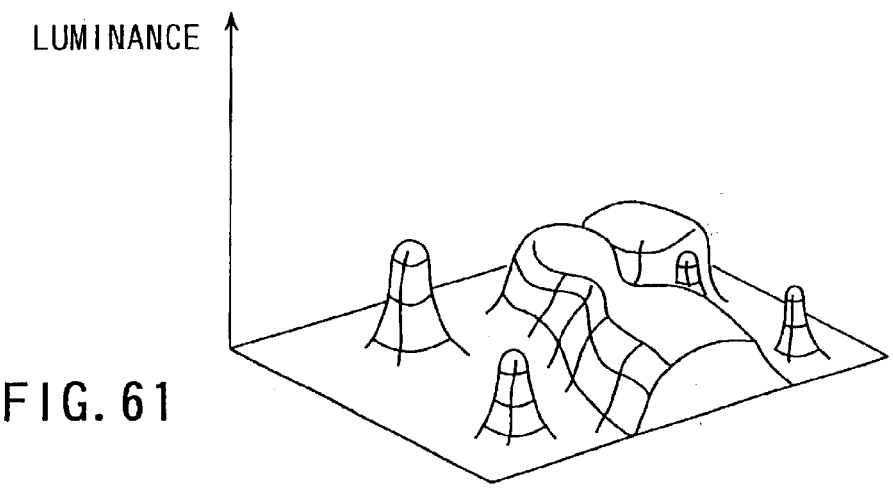
FIG. 61 is a view showing a sixth variation of the sixth embodiment of the present invention, the view showing the sensor data obtained in the integration calculation processing of the AF area sensor at the time when the previous light emitting operation is conducted with respect to the photograph scene of FIG. 35 in a three-dimension manner.

FIG. 61 is a view showing in a three-dimension manner the sensor data obtained in the integration calculation processing by the AF area sensor 112 in the case where the previous light emitting operation is conducted for allowing the strobe light emitting portion 120*a* to emit light with respect to the scene to be photographed of FIG. 35.

Figure 62:
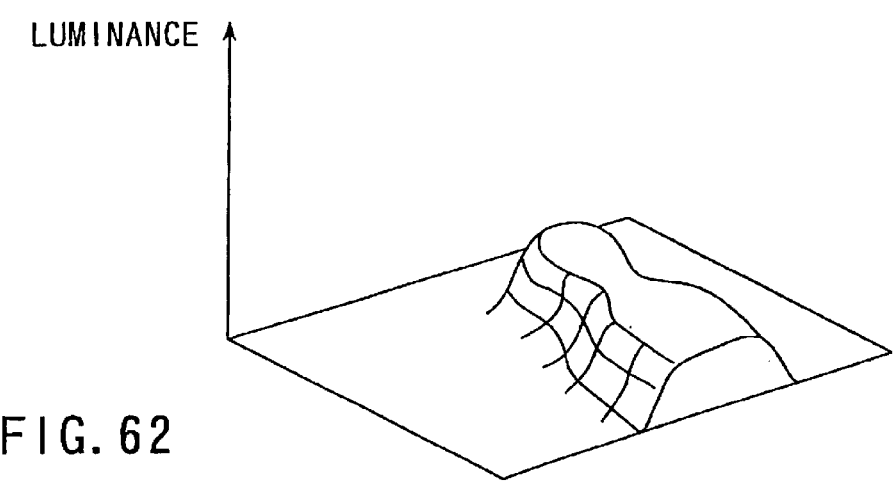
FIG. 62 is a view showing a sixth variation of the sixth embodiment of the present invention, the view showing sensor data obtained by extracting only a portion where a difference is present between the sensor data without the previous light emission with respect to the photography scene of FIG. 35 and the sensor data with the previous light emission in a three-dimension manner.

Furthermore, FIG. 62 is a view showing in a three-dimension manner the sensor data obtained by extracting only a portion having a difference when comparing the sensor data at the peak value of luminance and the sensor data accompanied by the previous light emission with respect to the scene to be photographed of FIG. 35.

Here, in the case where the sensor data is compared, for example, means is used for standardizing both data at the peak value of luminance, and calculating a difference for each of the corresponding sensor data or areas.

In the night scene as shown in FIG. 35, in the case where the main object 201 such as a person or the like is present at a position relatively near (the position in the short distance) from the camera, there is generated a difference in the image data obtained by the presence or the absence of the strobe light emission as shown in FIGS. 61 and 62.

Then, it is possible to presume that the main object 201 is present in the portion (an area) with this difference.

Consequently, in this case, the microcomputer 111 sets the photographing mode to the "night portrait mode" thereby setting the area with this difference, namely, the area denoted by symbol As of FIG. 39 to the distance measurement area so that the predetermined distance measuring calculation processing is conducted in this distance measurement area As.

On the other hand, in the case where the object 201 such as a person or the like is not present at the position in the short distance from the camera in the night scene, no difference is generated in the image data obtained with the presence or the absence of the strobe light emission.

Consequently, in this case, the microcomputer 111 sets the mode to the normal "night scene mode".

In this case, since it is considered that the scene of the night scene itself can be considered as the main object, the focus adjustment operation may be set to the infinite far distance.

In this manner, the change-over of the night scene portrait mode and the normal night scene mode is made out of the photographing mode suitable for the photography of the night scene in the case where judgment is made that the scene to be photographed is the night scene.

According to such a procedure, it becomes possible to obtain the result of the favorable photography at all times because the appropriate photographing mode is automatically changed in accordance with the scene to be photographed.

Furthermore, in the case where the scene to be photographed is as shown in FIG. 35, as means different from the above embodiment, a seventh means can be considered with respect to the change-over of the photographing mode which should be set at the time of judging that the scene is the night scene, namely, the change-over judging processing as to whether the photographing mode is to be set to the night scene portrait mode or the normal night scene.

Figure 63:
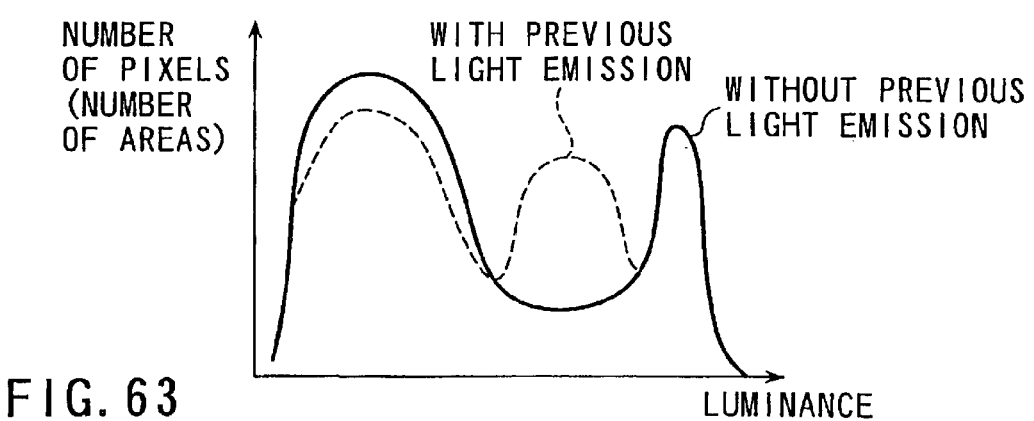
FIG. 63 is a view showing a seventh variation of the sixth embodiment, the view showing a relationship between the luminance in the photography scene of FIG. 36, and the number of pixels or the number of areas corresponding thereto.

FIG. 63 is a view showing a relationship between the luminance in the scene to be photographed of FIG. 35 and the pixel number corresponding thereto or the number of areas.

Noting the relationship between the luminance and the pixel number or the number of areas corresponding thereto on the basis of the sensor data obtained with the AF area sensor 112, the following tendency can be seen in the normal night scene.

That is, (1) The distribution of the area of the low luminance portion and the area of the high luminance portion is deviated while the area of the medium luminance portion is scarce.

(2) In the case where the main object is present in the short distance, there is a difference observed in the luminance distribution between the sensor data at the time when the previous light emission is conducted and the sensor data at the time when the previous light emission is not conducted. Thus, the area of the medium luminance portion increases in the sensor data at the time when the previous light emission is conducted as compared with the sensor data at the time when the previous light emission is not conducted.

(3) In the case where no main object is present in the short distance, scarcely no difference can be observed in the luminance distribution irrespective of the presence or the absence of the previous light emission.

Consequently, when such tendency is considered, the following judgment standard can be regulated.

That is, (1) In the case where the distribution of the high luminance portion and the low luminance portion is deviated, and the distribution of the area of the medium luminance portion is scarce, judgment is made that the scene is the night scene to set the mode to the normal "night scene mode".

(2) In the case where a difference can be observed in the luminance distribution when respective sensor data obtained with the presence and the absence of the previous light emitting operation is compared, judgment is made that the main object such as a person or the like against the background of the night scene is present in the short distance to set the mode to the "night scene portrait mode" suitable to the portrait photography in the night scene.

(3) In the case where no difference can be observed in the luminance distribution when respective sensor data obtained with the presence or the absence of the previous light emitting operation, judgment is made that the scene is the normal night scene for photographing only the night scene as a scenery to set the mode to the normal "night scene mode".

Figure 64:
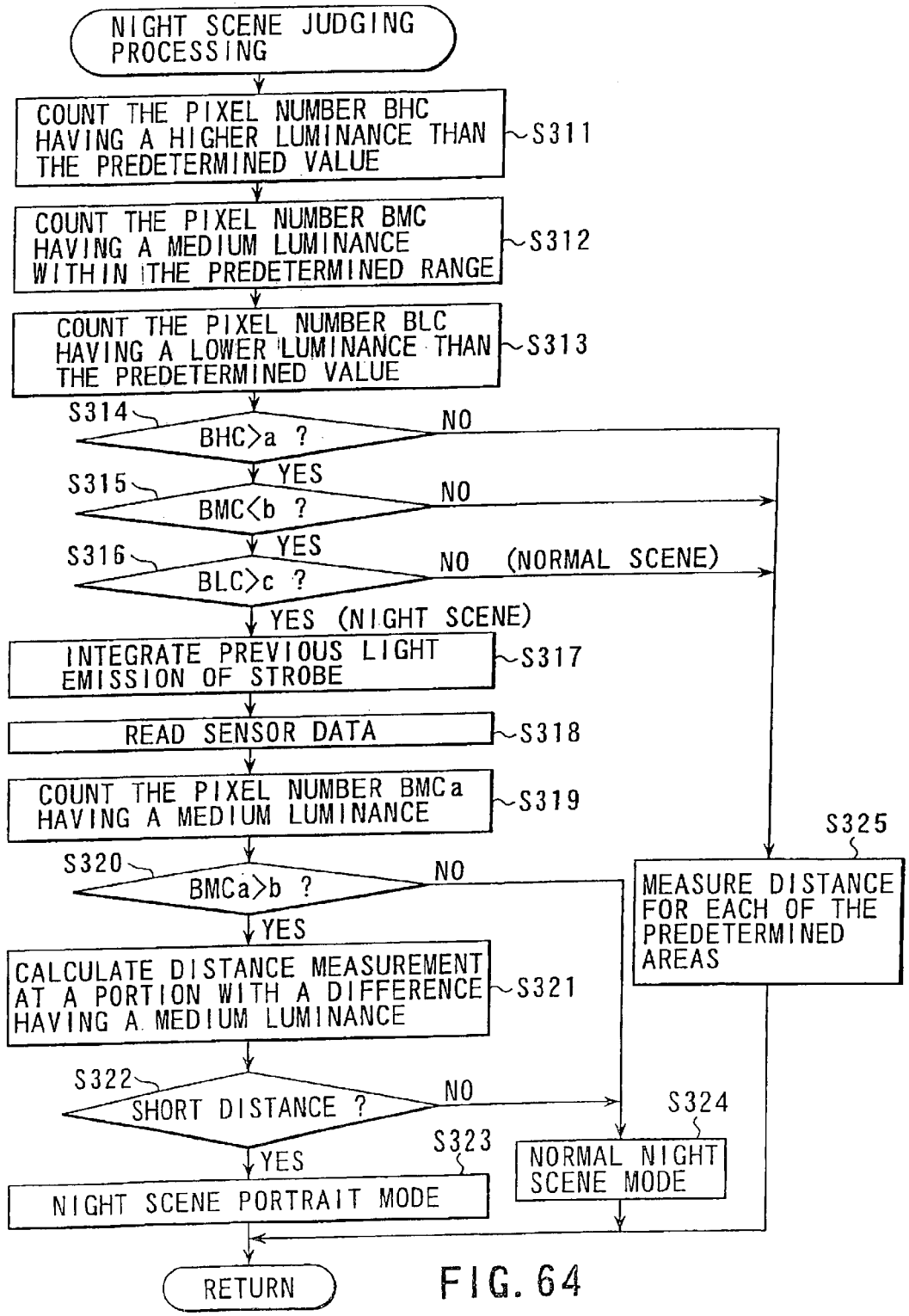
FIG. 64 is a flowchart showing a sequence of the "night scene judging processing" in the seventh variation of the sixth embodiment according to the present invention.

The sequence of the "night scene judging processing" in this variation when the above judgment standard is regulated will be explained hereinbelow in accordance with the flow-chart shown in FIG. 64.

In the beginning, at step S311, the microcomputer 111 counts the number of pixels having a higher luminance than the predetermined value with respect to the area (distance measurement area) within the predetermined range corresponding to the photographing screen to set this number to the count value BHC.

Next, at step S312 as well, in the similar manner, the microcomputer 111 counts the number of pixels having a medium luminance within the predetermined luminance value range with respect to the area (the distance measurement area) within the predetermined range corresponding to the photographing screen to set this number to the count value BMC.

Subsequently, at step S313 as well, in the similar manner, the microcomputer 111 counts the number of pixels having the lower luminance than the predetermined value with respect to the area (a distance measurement area) within the predetermined range corresponding to the photographing screen to set this number to the count number BLC.

At step S314 through S316, the microcomputer 111 compares each of the count values BHC, BMC, BLC with the predetermined judgment values a, b, c respectively.

That is, at step S314, the microcomputer 111 compares the count value BHC and the predetermined value a. When the relationship of BHC>a is established, the microcomputer 111 proceeds to the processing at step S315. At step S315, the microcomputer 111 compares the count value BMC with the predetermined judgment value.

Here, when the relationship of BMC<b is established, the microcomputer 111 proceeds to the processing at the next step S316. At step S316, the microcomputer 111 compares the count value BLC with the predetermined judgment value c. When the relationship of BLC>c is established, the microcomputer 111 proceeds to the processing at step S317.

In this manner, the relations of BHC>a, BMC<b and BLC>c are all satisfied respectively, judgment is made that the scene to be photographed is the night scene.

In the case where judgment is made that the scene is the night scene as described above, the microcomputer 111 conducts the previous light emission so as to force at the next step S317 the strobe light to emit light, and forces the AF area sensor 112 to conduct the integration calculation. Subsequently, at step S318 the microcomputer 111 reads the sensor data from the AF area sensor 112.

Subsequently, at step S319, the microcomputer 111 counts the number of pixels which have the medium luminance on the basis of the sensor data in the predetermined distance measurement area to set the number to the count value BMca.

At step S320, the microcomputer 111 compares the above count value BMca with the predetermined value b.

Here, in the case where the relationship of BMca>b is established, the microcomputer 111 judges that the main object is present against the background of the night scene to proceed to the processing at the next step S321.

Furthermore, the relationship of BMCa>b is not established, the microcomputer 111 judges that the scene is the normal night scene to proceed to the processing at step S324.

At step S321, the microcomputer 111 sets to the distance measurement area the area in which the number of pixels providing the medium luminance has increased to conduct the predetermined distance measuring calculation processing to proceed to the next step S322.

At step S322, the microcomputer 111 judges on the basis of the result of the distance measuring calculation at step S321 described above whether or not the distance up to the object is short.

Here, in the case where judgment is made that the object is present in the short distance, the microcomputer 111 proceeds to the processing at step S323. On the other hand, in the case where judgment is made that the scene is the normal night scene in which the object is not in the short distance, the microcomputer 111 proceeds to the processing at step S324.

Then, in the case where judgment is made that the object is in the short distance at step S322 described above and the microcomputer proceeds to step S323, the microcomputer 111 sets at this step S323 the photographing mode to the "night scene portrait mode" to complete a series of night scene judgment (return).

On the other hand, in the case where judgment is made at step S320 and S322 that the scene is the normal night scene and the microcomputer 111 proceeds to step S324, the microcomputer 111 sets the scene to be photographed to the normal "night scene mode" to complete the sequence of the series of night scene judging processing (return).

Incidentally,

In the case where the relationship of BHC>a is not established at step S314,

In the case where the relationship of BMC<b is not established at step S115,

In the case where the relationship of BLC>c is not established at step S116,

The microcomputer 111 judges that the scene is the normal scene to be photographed in any case (the normal scene) to proceed to the processing at step S325.

Then, at step S325, the microcomputer 111 conducts the distance measuring calculation processing of each of the predetermined areas.

Then, the microcomputer 111 selects the distance measurement result on the short distance side from the distance measuring result and sets the photographing mode suitable to the normal photography followed by completing the series of sequence (return).

In this manner, in the seventh variation as well, an automatic change-over is conducted so that an appropriate photographing mode is provided in accordance with the scene to be photographed with the result that a favorable photography result can be obtained at all times.

By the way, in the camera provided with a distance measuring apparatus according to the sixth embodiment and the variation thereof, in the case where judgment is made that the scene is the night scene, the shutter speed value is usually delayed in normal cases to control the exposure quantity.

Consequently, a favorable photography result cannot be obtained because of hand shivering or the like when the photographer holds the camera 100 with hands.

In such a case, it is desirable that the photography is conducted in the state in which the camera 100 is fixed by using a tripod or the like.

Then, when judgment is made that the photographing screen is the night scene as described above; in the case where there arises a situation in that the hand shivering is more likely to be generated because the shutter speed value based on the exposure value calculated by the light measuring means is relatively slow, the display of the information showing such situation is provided by making use of the display section 119 (see FIG. 27). Thus, a predetermined warning may be given to the photographer of the camera 100 in this manner.

With respect to the warning display, for example, a warning index displayed on the light receiving surface of the display section 119 is provided, and this index is flickered and displayed.

Furthermore, apart from this, sound generation means is provided which is capable of generating a warning sound or the like. The warning may be given by using a beep sound or a sound or the like.

Furthermore, the exposure value determined by the light mounted to the camera 100 measuring means is determined in accordance with the photographing screen. Normally, the film conditions, namely, the sensitivity of films or the like are considered in addition to the above condition.

Consequently, it is already known that in a situation where the appropriate exposure value provides a slow shutter speed value, the same exposure value can be obtained with films having higher sensitivity even when the shutter speed value is set to a higher level.

Then, as described above, in the case where judgment is made that the scene is the night scene, and the shutter speed value for realizing the appropriate exposure value at that time becomes a relatively slow value, information soliciting the usage of high sensitivity film may be displayed or uttered as a warning sound as a warning display by means of the display section 119 or a warning sound by the means of the sound means.

Besides, apart from this, means can be also considered for allowing the display section 119 to display the sensitivity information or the like which is suitable to the scene to be photographed.

In this manner, in the case where information soliciting the film replacement is provided by the camera 100, the user of the camera conducts the predetermined operation of winding up the film mounted in the camera 100 in the midst and take out the film to the outside. Then the user can continue the photography without trouble by loading the high sensitive film suitable to the photographing screen at that time in the place of the film which has been taken out to the outside.

Incidentally, a camera provided with a film midroll change function and a film loaded in a cartridge is generally put into practice; the function enabling winding up the currently used film in the halfway and taking out of the film from the camera, and then loading the film in the camera again after the film is wound up to the position of the unused frame next to the already photographed frame thereby enabling the reuse of the film continuously.

By the way, as a method of the distance measuring apparatus used in cameras or the like for photography, for example, the following device is generally put into practice; such as a so-called active style distance measuring apparatus for measuring a distance up to the object by applying, for example, infrared ray or the like to a desired object and receiving the reflection light, a so-called passive style distance measuring apparatus for calculating a distance up to the object from a deviation quantity of a pair of object images formed by a pair of light receiving lens, a hybrid style distance measuring apparatus which is constituted of the active style device and the passive style device so that the two style devices can be changed over depending upon the distance up to the object.

Then, as a camera provided with a distance measuring apparatus according to a seventh embodiment of the invention, a camera wherein the so-called super combination distance measuring apparatus is adopted will be explained, the super combination distance measuring apparatus enabling the detection of a main object within the photographing screen by using both the active style distance-measuring device and the passive style distance-measuring device instead of a simple hybrid combination of the two style devices.

Incidentally, the camera provided with the distance measuring apparatus according to the seventh embodiment has approximately the same structure as the sixth embodiment described above, so that only the style of the multiple-point distance measuring apparatus to be applied is different.

Consequently, with respect to the same structure as the sixth embodiment described above, a detailed explanation is omitted, and only different points will be explained.

Figure 65:
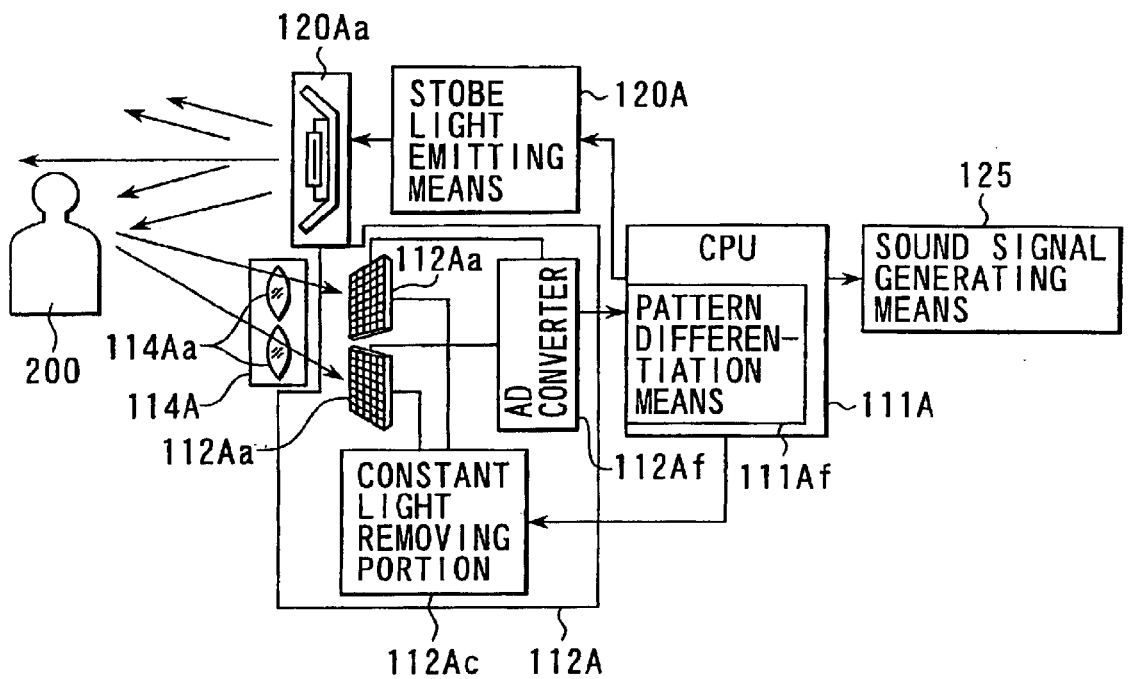
FIG. 65 is a block structural view of an essential portion, the view showing an main structure member of the camera provided with a distance measuring apparatus according to the seventh embodiment of the present invention.

FIG. 65 is a block structure view of an essential portion showing a main structure member of a camera provided with the multiple-point distance measuring apparatus.

The structure of the camera provided with the multiple-point distance measuring apparatus according to the present embodiment will be explained with reference to FIG. 65.

As shown in FIG. 65, the multiple-point distance measuring apparatus which is applied to the camera is constituted of the AF area sensor 112A and the distance measuring optical system 114A or the like.

The distance measuring optical system 114A is provided on the side of the front surface of the camera and is constituted of a pair of light receiving lenses 114Aa or the like for transmitting the flux of light from the object 200 to form two object images.

The object image formed by the pair of light receiving lenses 114Aa of this distance measuring optical system 114A is arranged at a predetermined position so as to form an image on the light receiving surface of the AF area sensor 112.

The AF area sensor 112A comprises a group of pairs of light receiving elements 112Aa for receiving light from the pair of the object images formed by a pair of light receiving lenses 114Aa of the distance measuring apparatus 114A to object the images to photoelectric conversion, constant light removing means 112Ac for receiving an output from the group of pairs of light receiving elements 112a to remove the constant light component, an A/D converter 112Af for converting an output from a group of pairs of light receiving elements 112a into a digital signal to output the signal to the microcomputer 111A arranged at a predetermined position inside the camera, and a processing circuit (not shown) for generating a sensor data in a predetermined form by conducting a signal processing or the like which is required upon receipt of an output from the group of pairs of light receiving elements 112Aa.

Incidentally, the group of pairs of light receiving elements 112Aa comprises a light receiving element such as a plurality of diodes arranged in two dimensions in the horizontal direction and the vertical direction on the light receiving surface of the flux of light of the object.

Furthermore, the constant light removing means 112Ac is controlled with the microcomputer 111A together with the strobe light emitting means 120A, so that the operation of the constant light removing means at the time of the application of the illumination light from the strobe light emitting means 120Aa whose light emission is controlled with the strobe light emitting means 20A results in the removal of a direct current light signal which is constantly applied from the output signal of the group of pairs of light receiving elements 112Aa.

Consequently, an output signal from the group of pairs of light receiving elements 112Aa at this time becomes an output signal based only on the flux of pulse light from the strobe light emitting portion 20Aa.

Then, the multiple-point distance measuring apparatus according to the embodiment which is constituted in this manner is controlled with the microcomputer 111A on the side of the camera.

Furthermore, the microcomputer 111A comes to control the strobe light emitting portion 120Aa via the strobe light emitting means 120A as has been described above.

On the other hand, with the camera provided with the multiple-point distance measuring apparatus, the sound signal generating means 125 is further provided, and this sound signal generating means 125 is also controlled with the microcomputer 111A.

Furthermore, inside of the microcomputer 111A there is provided a pattern discriminating means 111Af for analyzing an image pattern of an object image formed on the light receiving surface of the group of pairs of light receiving elements 112Aa of the AF area sensor 112A in addition to members such as the CPU, the ROM, the RAM, the EEPROM 111e or the like in the same manner as the seventh embodiment.

In the seventh embodiment which is constituted in this manner, the flux of light from the object 200 is processed in the following manner.

In other words, the flux of light of the object which passes through the pair of light receiving lenses 114As to be incident on the light receiving surface of the pair of AF area sensors 112A, that is, the group of light receiving elements 112Aa.

Then, the light receiving elements 112As conducts a predetermined signal processing, namely, photoelectric conversion processing or the like with respect to the optical object formed on its own light receiving surface so that the image becomes an electric image signal through a predetermined signal processing with the result that the optical image is output to the A/D converter 112Af.

Then, the image signal which has been converted into a digital signal at the A/D image converter 112Af is transmitted to the microcomputer 111A.

At this time, the microcomputer 111A controls the constant light removing means 112Ac when needed to activate the means. At the same time, there is a case in which the strobe light emitting portion 120Aa is controlled via the strobe light emitting means 120A to apply predetermined illumination light to the object.

For example, in the case where the scene to be photographed is a night scene or the like, the AF processing is conducted which is accompanied by the previous light emission operation.

Figure 66:
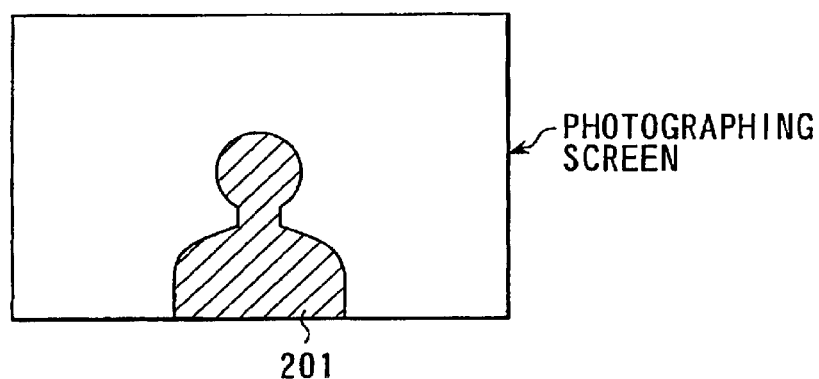
FIG. 66 is a view showing an area of an image corresponding to an output signal from the AF area sensor at the time when a constant light removing means and strobe light emitting means are activated in the camera of FIG. 65.

In such a case, the reflection light by the object of the illumination light flux from the strobe light emitting portion 120Aa is incident on the AF area sensor 112 via the distance measuring optical system 114, so that an output signal of an area (portion denoted by slanted lines of FIG. 66) denoted by reference numeral 201 shown in FIG. 66 out of the object image formed on the light receiving surface of the AF area sensor 112, namely, a direct current light signal which is constantly applied by the operation of the constant light removing means 112Ac with the result that the output signal based only on the pulse light of the strobe light emitting portion 120As is output from the AF area sensor 112A.

FIG. 66 is a view showing an image area corresponding to an output signal from the AF area sensor when the constant light removing means and the strobe light emitting means is operated.

Then, upon receipt of this output signal, the microcomputer 111A analyzes a pattern of the image formed on the light receiving surface of the AF area sensor 112A with the pattern differentiation means 111Af incorporated in the microcomputer 111Af.

Then, in the case where judgment is made from the result of the analysis that the image is the configuration of a person, the microcomputer 111A assumes this is the main object.

Figure 67:
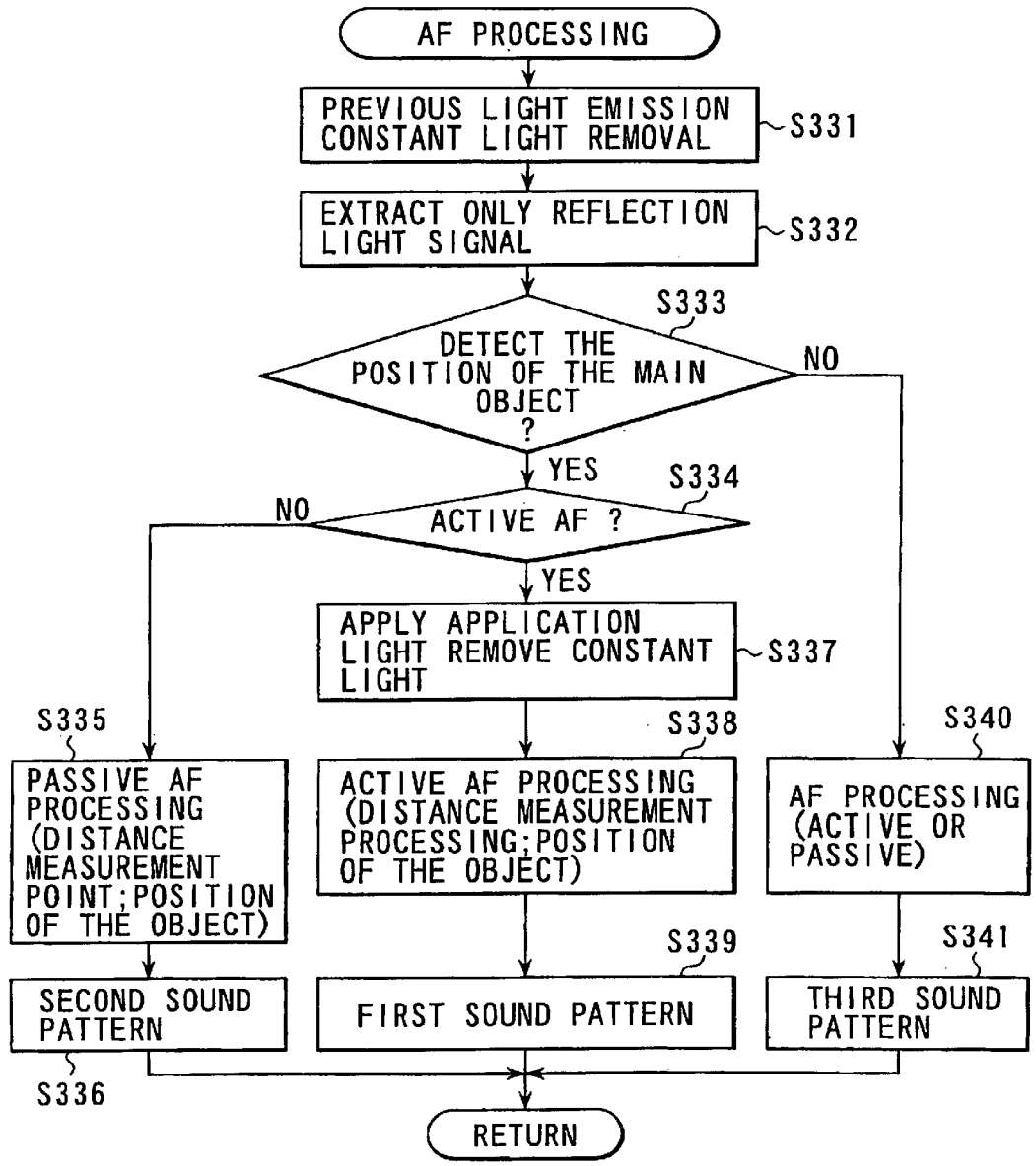
FIG. 67 is a flowchart showing a sequence of the "AF processing" in the camera of FIG. 65.

FIG. 67 is a flowchart showing the sequence of the AF processing in the camera provided with the multiple point distance measuring apparatus according to the embodiment.

Incidentally, the AF processing is an AF processing in the main routine according to the sixth embodiment, namely the processing corresponding to the step S203 of FIG. 32.

In the beginning, when the microcomputer proceeds to the AF processing, at step S331, the microcomputer 111A controls the strobe light emitting portion 120As via the strobe light emitting portion 120A and controls the AF area sensor 112A to conduct the integration calculation processing accompanied by the previous light emitting operation.

At this time, the microcomputer 111A operates the constant light removing means 112Ac at the same time.

As a consequence, at the next step S332, only a signal in the area of the image 201 shown in FIG. 66, namely, the pattern signal (hereinafter referred to as reflection signal light) by the reflection light flux by the illumination light of the strobe light emitting portion 120Aa is extracted from the AF area sensor 112A.

This data is output to the microcomputer 111A.

Subsequently, at step S333, the microcomputer 111A receives the sensor data extracted at the above step S331 to differentiate the configuration of a signal by the reflection signal light with the pattern differentiation means 111Af.

Here, in the case where judgment is made that the pattern of the reflection light is the main object of the predetermined person or the like, the microcomputer 111A detects the position within the distance measurement area corresponding to the inside of the main object followed by proceeding to the processing at the next step S334.

The position of the object is detected by the differentiation of whether the predetermined contrast is incorporated depending upon whether or not the strength of the image signal for forming a pattern of the reflection signal is on predetermined level.

At step S334, the case where the microcomputer 111A selects the style of the AF processing to be conducted as to which of the two styles is to be used, the active style or the passive style.

That is, at step S334, in the case where judgment is made that the contrast of the image signal does not attain the predetermined level, the microcomputer 111A proceeds to the processing at the next step S337 in order to conduct the AF processing by the active style.

At step S337, in the case where judgment is made that the contrast of the image signal does not attain the predetermined level, the microcomputer 111A allows the accompaniment of the illumination operation of the illumination light by the strobe light emitting portion 120Aa, and, at the same time, the microcomputer 111A conducts the integration calculation operation which allows the constant light removing means 112Ac to be operated. Then, at step S338, the microcomputer 111A conducts the active style AF operation.

Incidentally, in this case, by setting an area of an image on the basis of the sensor data extracted in the previous integration operation, namely the area of the image shown in FIG. 66 as the distance measurement point, the microcomputer 111A conducts the predetermined calculation operation with an emphasis on this distance measurement point.

Subsequently, at step S339, the microcomputer 111A controls the sound signal generating means 125 to output sound information by the first sound pattern representing the notification that the active style AF processing has been conducted.

Then, the microcomputer 111A completes a series of sequence (return).

On the other hand, at the above step S333, in the case where judgment is made that the strength of the reflection light signal does not attain the predetermined level (the signal is weak), the microcomputer 111A proceeds to step S334 to select the fact that the passive style AF processing should be conducted here, thereby proceeding to the next step S335.

At step S335, the microcomputer 111A conducts the passive style AF processing.

In this case as well, by setting the area of the image (the area of the image 201 in FIG. 66) based on the sensor data extracted in the previous integration calculation processing as the distance measurement point, the microcomputer 111A conducts the previous calculation processing with an emphasis on this distance measurement point.

Subsequently, at step S336, the microcomputer 111A controls the sound signal generating means 125 to output the sound information by the second sound pattern representing the notification that the passive style AF processing has been conducted.

Then, the microcomputer 111A completes a series of sequence (return).

On the other hand, at the above step S333, in the case where the pattern of the reflection signal light extracted in the processing at the above step S332 does not coincide with the pattern configuration of the predetermined person or the like so that judgment is made that the person is not the main object, the microcomputer 111A proceeds to the processing at step S340.

At step S340, the microcomputer 111A adds the luminance information or the like to force either of the active or the passive style distance measuring means to conduct the AF processing.

In this case, by setting the portion in the vicinity of the central portion of the screen which has a high possibility that the object is arranged in the largest number within the photographing screen, the microcomputer 111A conducts the predetermined distance measuring calculation with an emphasis on this distance measurement point.

Next, at step S341, the microcomputer 111A controls the sound generating means to output the sound information by the third sound pattern representing the notification that the normal AF processing (the normal hybrid style AF processing by means of either the active style or the passive style) has been conducted.

Then, the microcomputer 111A completes a series of processing (return).

In this manner, according to the seventh embodiment, the distance measuring operation is not only conducted in accordance with the situation of the scene to be photographed in a simple hybrid combination of the active style AF processing and the passive style AF processing, but can conduct more secured AF processing because the main object image within the photographing screen is detected when the AF processing accompanied by the previous light emitting operation of the strobe of night scenes or the like is conducted.

Furthermore, according to the seventh embodiment, after each of the AF processing is conducted, the sound information by the sound signal generating means 125 in accordance with the processing is generated. This can contribute toward the improvement in the operability for users of the camera.

By the way, in recent years, apart from cameras or the like for conducting photography by using a conventional film, a so-called electronic photographing device (hereinafter referred to as an electronic camera) is widely prevalent which enables recording on a predetermined recording medium into a predetermined form, for example, digital data the electric image signal generated by the photoelectric conversion of the optical object image with the pickup elements such as CCD's or the like.

In the image obtained in the case where the night scene is photographed by using such a conventional camera or the like, there is a tendency that a so-called color jumping phenomenon is generated in a so-called high luminance portion and an unnatural state is seen in the whole image which is photographed as a result of the deterioration in the S/N ratio or the like.

Furthermore, in the image obtained as a result of the reverse light scene, there can be seen a phenomenon that the low luminance portion of the main object such as a person or the like is blackened and hidden under the influence of the high luminance portion which constitutes a background.

Then, in order to solve these problems, it is thought that the multiple-point measuring-device of the present invention is applied.

The multiple-point distance measuring apparatus according to the eighth embodiment of the invention is an example in the case where the present invention is applied in the electronic camera or the like.

Figure 68:
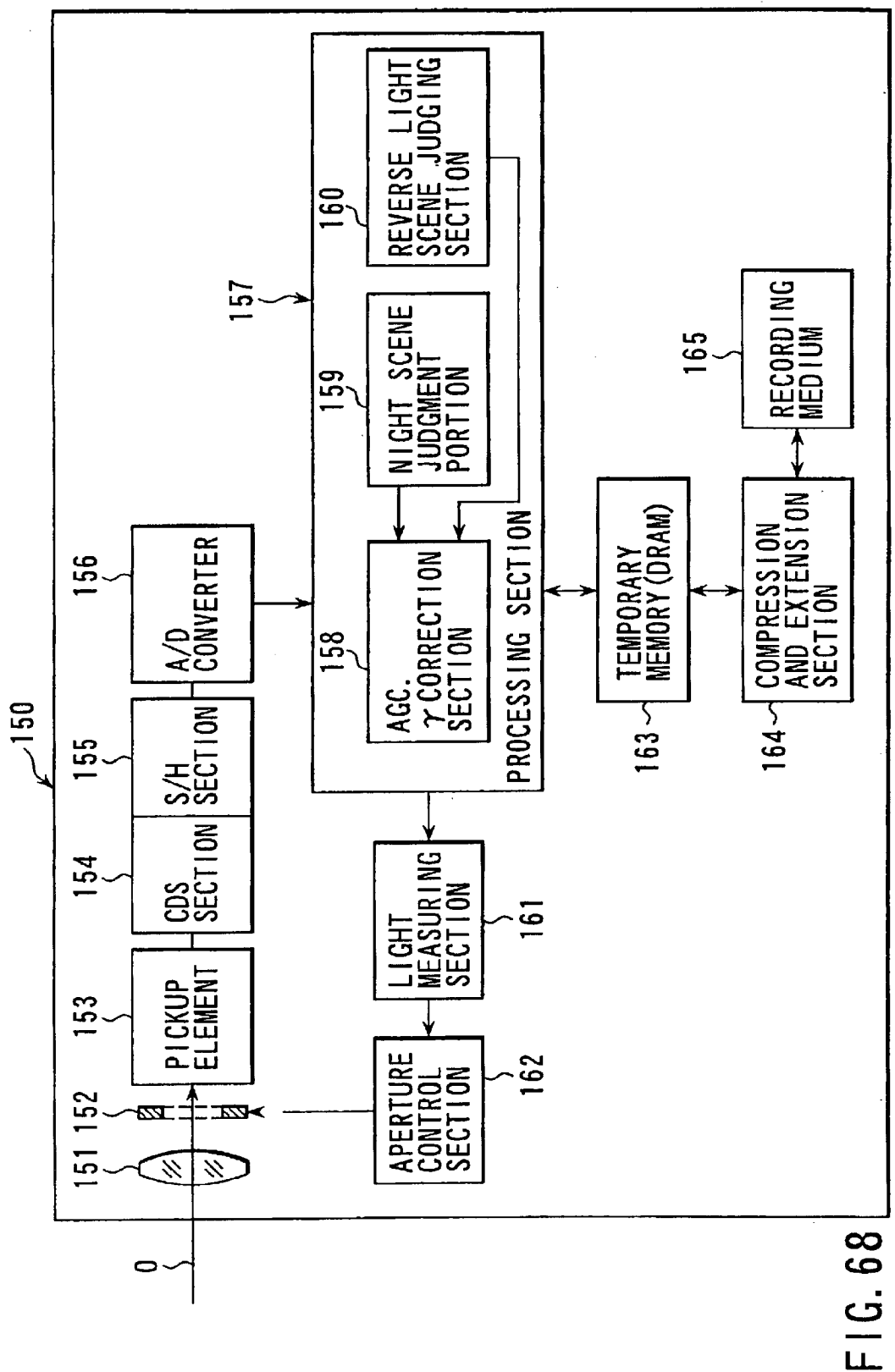
FIG. 68 is a block structural view of an essential portion, the view showing a structure of an electronic camera provided with a distance measuring apparatus according to an eighth embodiment of the present invention.

FIG. 68 is a block diagram of an essential portion showing a structure of the electronic camera provided with the multiple-point distance measuring apparatus according to the eight embodiment of the present invention.

This electronic camera 150 comprises:

photographing optical system 151 comprising a plurality of lenses or the like for allowing the flux of light 0 of the object to pass through the lens to form an image of the object image on a predetermined position;

a pickup element 153 which is an photoelectric conversion element such as an CCD or the like for converting an optical object image formed by this photographing optical system 151 into an electric signal;

an aperture section 152 for regulating the incident quantity to the pickup element 153 of the light flux 0 of the object provided between the photographing optical system 151 and the pickup element 153 to pass through the photographing optical system 151;

a CDS section 154 and a sample holding circuit (hereinafter referred to as S/H section) 155 for removing predetermined reset noises by conducting correlative double sampling or the like upon receipt of an output signal of the pickup element 153;

an A/D converter 156 for converting an output signal (an analog signal) output via this CDS section 154 and the S/H section 155 into a digital signal;

a processing section 157 for conducting each kind of image processing or the like upon receipt of the digital signal from the A/D converter 156;

a temporary memory 163 comprising a DRAM or the like for receiving the output signal (an image signal) from the processing section 157 to temporarily store this signal;

a compression and extension section 164 for reading compressed data recorded in a predetermined form on the recording medium 165 while converting the signal same as the image signal stored on this temporary memory so as to be converted into an optimal form and conducting the extension processing so as to be converted into a signal in a predetermined form to be stored into the temporary memory 163;

a recording medium 165 such as a magnetic recording medium or a semiconductor memory or the like for recording image data in a predetermined form;

a light measuring section 161 for measuring the luminance or the like upon receiving a processed signal in the predetermined form to set the luminance or the like of the object; and an aperture control section 162 or the like driving and controlling the aperture section 152 upon receiving the predetermined value or the like set by this light measuring section 161.

Then, the processing section 157 comprises each kind of circuit such as an AGC·γ correction section 158 for conducting, for example, an auto gain control or the like;

a night scene judging section 159 for judging whether or not the scene to be photographed is the night scene; and a reverse light scene judging section 160 for judging whether or not the scene to be photographed is the reverse light scene.

An operation of this electronic camera 150 which is constituted in this manner will be explained hereinbelow.

After the light flux of the object which passes through the photographing optical system 151 is regulated to a predetermined incident quantity at the aperture section 152, the light flux is incident on the pickup element 153 so that the object image is formed on the light receiving surface.

The pickup element 153 receives the incident light flux of the object and conducts the photoelectric conversion processing of the light flux thereof thereby generating an image signal in accordance with the object image formed of this light flux.

The image signal which is generated by the pickup element 153 is subjected to a predetermined signal processing at the CDS section 154 and the S/H section 155, and then is output to the A/D converter 156 to be digitized.

The image signal which is converted into this digital signal in this manner is output to the processing section 157, so that the gain control processing and γ conversion processing is conducted with the AGC·γ correction section 158.

Furthermore, in the night scene judging section 159 and the reverse light judging section 160, judging processing is conducted at to whether the scene to be photographed is the night scene or the reverse light scene (details thereof will be described later).

Next, at the light measuring section 161, the predetermined distance measuring calculation processing is conducted on the basis of the output of the processing section 157 so that the set value of the aperture section optimal for the scene to be photographed and the electronic shutter speed value of the pickup element 153 or the like are calculated.

Then, on the basis of the calculation result by this light measuring section 161, the aperture section 152 is driven and controlled with the aperture control section 162.

On the other hand, the image signal processed with the processing section 157 is also output to the temporary memory 163. After the image signal is stored in the temporary memory 163, the signal is output to the compression and extension section 164. The image data in the form most suitable for recording is generated by subjecting the image signal to the predetermined compression processing or the like.

Then, this image data is output to the recording medium 165, so that the image data is recorded on this recording medium 165.

Figure 69:
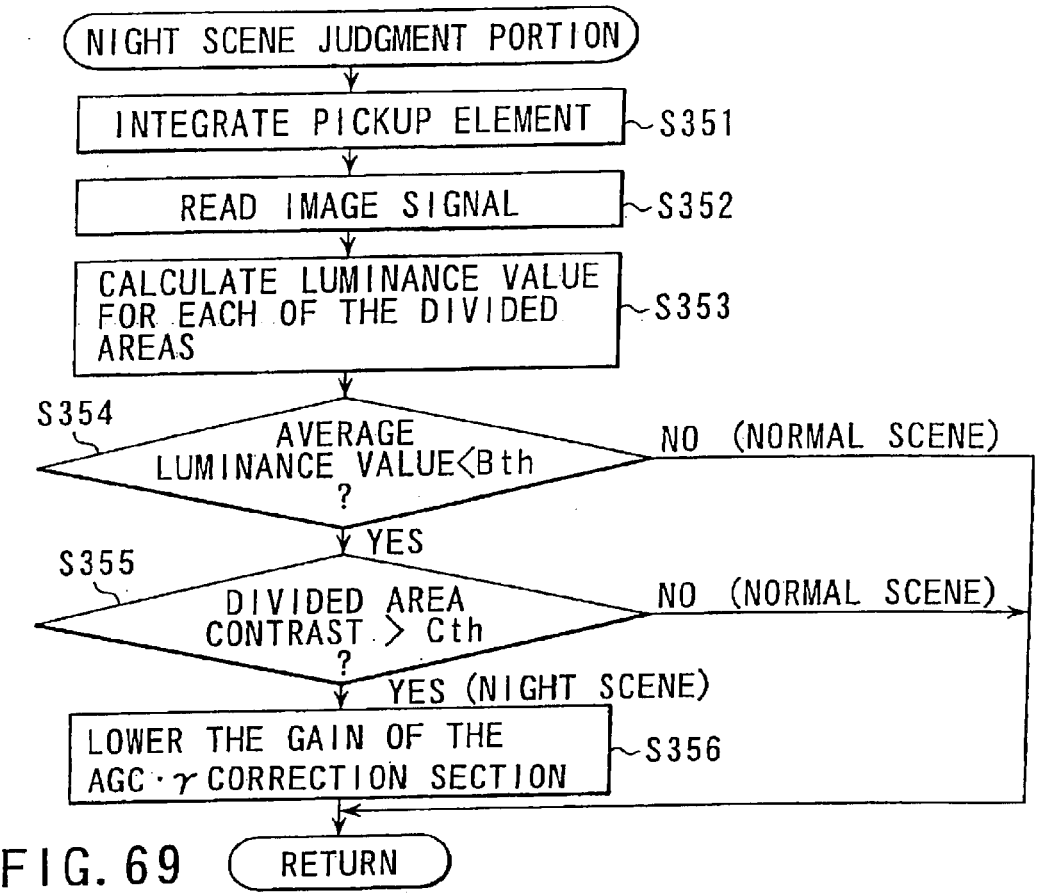
FIG. 69 is a flowchart showing a sequence of the "night scene judging processing" in the camera of FIG. 68.

FIG. 69 is a view showing a sequence of the "night scene judging processing" which is conducted in the electronic camera 150.

In the electronic camera 150 provided with the distance measuring apparatus of the embodiment, the "night scene judging processing" as shown is conducted on the basis of the image signal generated with the pickup element 153 at the night scene judging section 159 of the processing section 157.

As shown in FIG. 69, in the beginning, at step S351, the predetermined integration processing by the pickup element 153 is conducted, so that the image signal generated by the pickup element 153 is conducted at the next step S352.

This reading processing includes each kind of signal processing which is respectively conducted at the CDS section 154, the S/H section 155 and the A/D circuit 156 or the like.

Next, at step S353, the night scene judging section 159 of the processing section 157 measures the luminance of the scene to be photographed.

Figure 70:
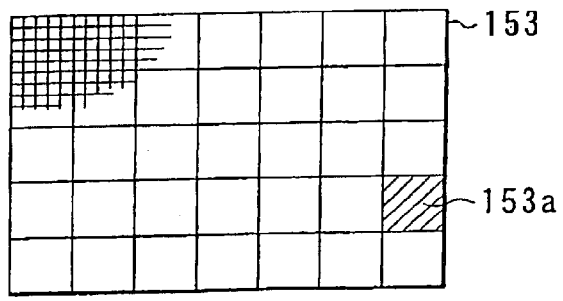
FIG. 70 is a conceptual view showing a divided area in the state in which a light receiving surface of a photograph element of the camera of FIG. 68 is divided into a plurality of areas.

In this case, the night scene judging section 159 assumes the state in which the light receiving surface of the pickup element 153 shown in FIG. 70 is divided into a plurality of areas to calculate respective luminance values with respect to each of divided areas 153a, so that a processing for calculating the average value of the whole photographing screen is conducted.

Subsequently, at step S354, the night scene judging section 159 compares the average luminance value calculated at the above step S353 with the thresh value Bth representing the predetermined luminance value.

Here, in the case where the relationship of the average luminance value<Bth is established, the night scene judging section 153 proceeds to the processing at step S355. At this step S355, the divided area contrast value and the predetermined thresh value Cth are compared.

Here, in the case where the relationship of the divided area contrast value>Cth is established, the night scene judging section 159 judges that the scene is the night scene to proceed to the processing at the next step S356.

Here, the divided area contrast value refers to the value obtained by determining a difference in the luminance value between the divided area and the divided area in the peripheral portion for each of the divided areas to calculate a sum of the absolute value of the difference in the luminance value corresponding to each of the divided area which is calculated in this manner.

Incidentally, at the above step S354, in the case where the relationship of the average luminance value<Bth is not established at the above step S354, and in the case where the relationship of the divided area contrast value>Cth is not established at the above step S355, the night scene judging section 159 judges that the scene is the normal scene to be photographed (normal scene) in any case thereby completing this series of sequence (return).

Then, in the case where judgment is made that the scene is the night scene as described above, the night scene judging section 159 controls the setting so as to lower the gain of the of AGC·γ correction section 158 followed by completing the series of the sequence return).

That is, in the scene to be photographed having a low luminance on the whole like the night scene, the gain level set by the AGC·γ correction section 158 would otherwise be set to an extremely high level.

That is, in the scene to be photographed having a low luminance on the whole like the night scene, the gain level set by the AGC·γ correction section 158 will be set to an extremely high level.

Consequently, in this case, noises (image deterioration) of the low luminance portion, namely, a dark portion as a night scene of the image will become conspicuous.

Then, as described above, in this embodiment, processing is provided for judging whether or not the scene to be photographed is the night scene. As a consequence, in the case where judgment is made that the scene is the night scene, the generation of unnecessary noises can be suppressed by controlling the gain level of the AGC·γ correction section 158 to be lowered.

Incidentally, in the "night scene judging processing" in the above eighth embodiment, as shown in step S356 of FIG. 69, the image deterioration of the low luminance portion is prevented by controlling the gain level of the AGC·γ correction section 158 to be lowered. Apart from this, the following means can be considered.

That is, when judgment is made that the scene is the night scene at step S355 of FIG. 69, the generated color of the image which should be displayed based on the image signal is improved by controlling the compression characteristic with respect to the high luminance portion in the AGC·γ correction section 158 so as to be different between the processing in the case of the normal scene and the processing in the case of the night scene.

Figure 71:
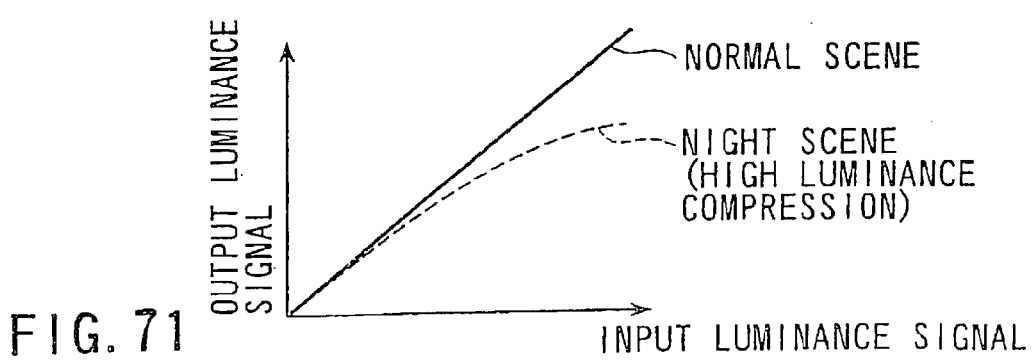
FIG. 71 is a view showing a relationship between the result of the signal processing conducted by the AGC·γ correction section and the output luminance signal with respect to the input luminance signal.

FIG. 71 is a view showing a relationship of the output luminance signal with respect to the input luminance signal as a result of the signal processing conducted with the AGC·γ correction section 58

As shown in FIG. 71, in the case of the normal scene, the output luminance signal with respect to the input luminance signal is output while maintaining approximately the proportional relationship. On the other hand, in the case of the night scene, in the high luminance portion, a high luminance compression processing is conducted for suppressing and outputting the output luminance signal with respect to the input luminance signal.

By doing so, since the latitude of the whole photographing screen can be improved, the deterioration of the image resulting from the so-called white jump phenomenon generated at the high luminance portion can be improved, and, at the same time, the generated color can be improved.

Next, the "reverse light judging processing" in this embodiment will be explained hereinbelow.

Figure 72:
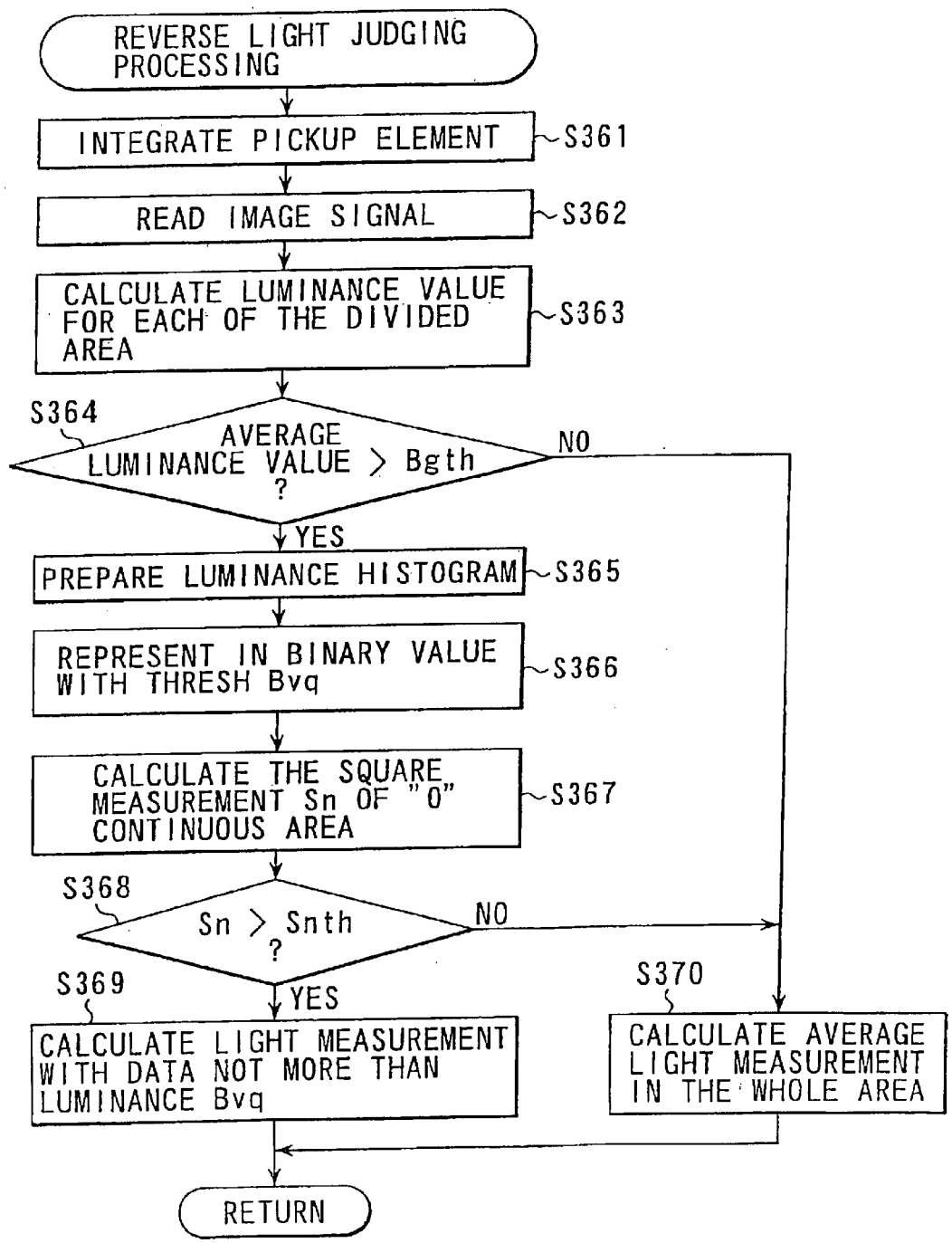
FIG. 72 is a flowchart showing a sequence of a "reverse light judging processing" in the camera of FIG. 68.

FIG. 72 is a flowchart showing a sequence of the "reverse light judging processing" which is conducted in this embodiment.

With the electronic camera 150 provided with the distance measuring apparatus of the embodiment, the "reverse light judging processing" as shown hereinbelow is conducted on the basis of the image signal generated with the pickup element 153 in the reverse light scene judging section 160 of the processing section 157.

As shown in FIG. 72, in the beginning, at step S361, the predetermined integration processing is conducted by the pickup element 153. At the next step S362, the reading processing of the generated image signal is conducted.

Subsequently, at step S163, the reverse light scene judging section 160 of the processing section 157 measures the luminance of the scene to be photographed.

Incidentally, the processing at steps S361 through S363 is approximately the same as the processing as the processing at steps S351 through S353 (see FIG. 69).

Subsequently, at steps S364, the reverse light judging section 160 compares the average luminance value calculated at step S363 and the thresh value Bgth representing the predetermined luminance value.

Here, in the case where the relationship of the average luminance value>Bgth is established, the reverse light judging section 160 proceeds to the processing to step S365. At this step S365, the processing for representing in histogram as shown in FIG. 73 the luminance value in each of the divided area.

FIG. 73 shows a luminance histogram prepared at step S365 described above.

As a scene to be photographed at this time is based on the reverse light scene shown in FIG. 41 in a similar manner as luminance histogram of FIG. 43 in the above sixth embodiment.

Next, at step S366, the reverse light judging section 160 conducts binarizing processing of the sensor data by using the predetermined thresh value Bvq on the basis of the luminance histogram shown in FIG. 73.

That is, as shown in FIG. 73, the reverse light judging section 160 sets as the thresh value Bvq a value corresponding to the luminance value at which the pixel number (block number=one area in the divided area) is the smallest in the medium luminance portion between the peak value of the medium luminance portion and the peak value of the high luminance. On the basis of the thresh value Bvq, a binarizing processing of the sensor data (luminance data) is conducted.

Here, the binarizing processing refers a processing in which the sensor data having the (bright) luminance value higher than the thresh value Bvq is set to "1" while the (dark) sensor data having a low luminance value is set to "0".

Subsequently, at step S367, the reverse light scene judging section 160 calculates the square measurement of the area where the pixel distribution of "0" continues out of the sensor data obtained in the above binarizing processing. Then, at the next step S368, the square measurement Sn and the predetermined judgment value Snth are compared with the predetermined judgment value Snth to judge whether or not the square measurement Sn of the continuous area is larger than the predetermined judgment value Snth.

Here, in the case where the relationship of Sn>Snth is established, namely, in the case where the area Sn of the continuous area is larger than the predetermined value Snth, the reverse light scene judging section judges that the scene to be photographed is the reverse light scene to proceed to the processing at the next step S369.

For example, in the case of the reverse light scene shown in FIG. 41, the image of photographing screen represented by the sensor data (image signal) subjected to the binarizing processing will be as shown in FIG. 74.

FIG. 74 is a view showing a luminance distribution for each of the divided area represented by the sensor data subjected to the binarizing processing.

In this case, the average luminance of the whole photographing screen is in the state of high luminance. In the low luminance portion corresponding to the main object such as a person or the like, when the relationship of the square measurement of the area where data "0" continues and the predetermined value Snth is in the relationship of Sn>Snth, judgment is made that the scene is the reverse light scene.

Then, when the microcomputer 111 proceeds to the next step S369, the reverse light scene judging section 160 conducts the predetermined light measuring processing in which an emphasis is placed on the low luminance portion.

That is, in the luminance histogram shown in FIG. 73, a light measuring calculation processing based on the data at a portion which is equal to or lower than the luminance thresh value Bvq is conducted.

On the other hand, in the case where the relationship of the average value>Bgth is not established at step S364, and in the case where the relationship of Sn>Snth is not established as step S368, the reverse light judging section 160 conducts at step S370 a normal light measuring calculation, namely, the predetermined average light measuring calculation processing with respect to the whole photographing screen, followed by completing the series of sequence (return).

In this manner, in the case where the scene to be photographed is the reverse light scene, in the beginning, detection is made as to whether the scene to be photographed is in the state of the reverse light. In the case where judgment is made that the scene is the reverse light scene, the luminance value of the area where the main object such as a person or the like should be located, namely, the predetermined light measuring processing is conducted with an emphasis placed on the image which is arranged approximately in the central portion by means of the image signal which is subjected to the binarizing processing.

As has been described above, according to the eighth embodiment, in the electronic camera, the same advantage as each of the above embodiments can be provided, so that an electronic image data representing a favorable quality image can be easily obtained.

Consequently, as has been described above, according to the sixth to the eight embodiments of the present invention, there is provided a distance measuring apparatus of the camera which allows a secured discrimination of the position within the photographing screen of the main object on the basis on the image signal obtained with the area sensor, and execution of a high precision distance measuring processing by conducting a focus detection processing with certitude with respect to the desired main object image.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A camera comprising:
   a pickup element;
   a judging section for judging whether or not a scene to be photographed is a night scene on the basis of an average luminance value and luminance distribution of a whole photographing screen obtained from an output of the pickup element, the judging section judging the scene being the night scene in a case where the average luminance value of the whole photographing screen is lower than a predetermined value and the high luminance area is dotted within the photographing screen; and
   a setting section for setting a photographing mode in accordance with a judging result of the judging section.

2. The camera according to claim 1, further comprising:
   a strobe light emitting portion for previously emitting light in a case where the judging section judges that the scene to be photographed is the night scene; and a distance measuring section which conducts a distance measuring calculation with respect to an area in which a difference between the sensor data at a time of a previous light emission integration and the sensor data at a time of integration without the previous light emission is not less than the predetermined value.

3. The camera according to claim 2, wherein the setting section sets the photographing mode to the night scene portrait mode in a case where the distance measuring section obtains a calculation result such that the distance of the object is in the short distance, and sets the photographing mode to the normal night scene mode in a case where the distance measuring section obtains the calculation result such that the distance of the object is not in the short distance.

4. The camera according to claim 1, wherein the judging section judges that the scene to be photographed is the night scene in a case where the average luminance value of the whole photographing screen is lower than the predetermined value, a first area number in which pixels having a higher luminance than the predetermined value continue is larger than a predetermined number, and a second area number in which pixels having a lower luminance than the predetermined value continue is smaller than the predetermined number.

5. The camera according to claim 1, wherein the judging section judges the scene with respect to the number of pixels having a higher luminance than a predetermined value, and the number of pixels having a medium luminance, and the number of pixel having a lower luminance of the distance measurement area corresponding to the whole photographing screen.

6. The camera according to claim 5, wherein the judging section judges that the scene is the night scene in a case where, in the distance measurement area corresponding to the whole photographing screen, both of the number of pixels having the higher luminance than the predetermined value and the number of pixels having the lower luminance than the predetermined value are larger than the predetermined number, and the number of pixels having a medium luminance is smaller than the predetermined number.

7. The camera according to claim 6, further comprising:
a strobe light emitting portion which conducts a previous light emission in a case where the judging section judges that the scene to be photographed is the night scene;
a detection section which detects an area where the number of pixels having the medium luminance is counted and increased on the basis of data at a time of a previous light emission integration;
a distance measuring section which conducts a distance-measuring calculation with respect to an area where the pixel having the medium luminance detected with the detection section is increased.

8. The camera according to claim 7, wherein the setting section switches the photographing modes in accordance with a calculation result of the distance measuring obtained from the distance measuring section.

9. The camera according to claim 8, wherein the setting section conducts the strobe light emission so that the main object is subjected to an appropriate exposure, and sets the photographing mode to a night scene portrait mode for prolonging exposure time so that the background is also subjected to an appropriate exposure, in a case where the distance measuring section obtains a calculation result that the main objects is located in the short distance.

10. The camera according to claim 8, wherein the setting section does not conduct a strobe light emission, and sets the photographing mode to a normal night scene mode for prolonging the exposure time so that the background is subjected to an appropriate exposure, in a case where the distance measuring section obtains a calculation result that the main object is not located in the short distance.

11. A camera comprising:
a pickup element;
a judging section for judging whether or not a scene to be photographed is a night scene on the basis of an average luminance value and luminance distribution of a whole photographing screen obtained from an output of the pickup element, the judging section judging the scene not being the night scene in a case where the average luminance value of the whole photographing screen is higher than a predetermined value, or in a case where the high luminance area is not dotted in the photographing screen; and
a setting section for setting a photographing mode in accordance with a judging result of the judging section.

12. The camera according to claim 11, wherein the judging section judges that the scene to be photographed is not the night scene in a case where the average luminance value of the whole photographing screen is higher than the predetermined value, or a first area number in which pixels having a higher luminance than the predetermined value continue is smaller than a predetermined number, or a second area number in which pixels having a lower luminance than the predetermined value continue is larger than the predetermined number.

13. A distance measuring apparatus of a camera comprising:
a pickup element;
a luminance distribution calculation section which calculates a luminance distribution within a photographing screen on the basis of an output of the pickup element;
a continuous region detection section which detects a region where the luminance within a predetermined range continues on the basis of an output of the luminance distribution calculation section; and
a main object specifying section which specifies a main object on the basis of the configuration of the area where the luminance within the predetermined range continues.

14. A distance measuring apparatus of a camera comprising:
a strobe light emitting portion;
an area sensor to be used for an auto-focus which conducts an integration operation at a time of a previous light emission;
a first judging section for judging whether or not a scene to be photographed is a night scene on the basis of an output of the area sensor;
a second judging section which judges whether or not the scene to be photographed is a reverse light scene in a case where judgment is made that the scene to be photographed is not the night scene;
a main object specifying section which specifies the main object, wherein
the main object specifying section specifies the main object in a case where a differential data between a sensor data of the area sensor at a time of integration with the previous light emission and a sensor data at a time of integration without the previous light emission is not less than a predetermined value when the first judging section judges that the scene to be photographed is the night scene, and the main object specifying section specifies the main object in a case where differential data between the sensor data of the area sensor at the time of integration with the previous light emission and the sensor data at the time of integration without the previous light emission is not less than the predetermined value when the second judging section judges that the scene to be photographed is reverse light scene; and a distance measurement calculation section which calculates a distance measurement with respect to the main object which is specified with the main object specifying section.

15. The distance measuring apparatus according to claim 14, wherein the main object specifying section includes:

an average luminance value calculation section for calculating the average luminance value of the photographing screen on the basis of the output of the area sensor;

an area calculation section for extracting continuous luminance data within the predetermined range and calculating the square measurement of the extracted luminance data in the case where the average luminance value is higher than the predetermined value;

an area judging section for judging whether or not an area of the extracted area calculated with the area calculation section is larger than a predetermined value;

a configuration judging section for judging the configuration of the extracted area in the case where the area of the extracted area is not less than the predetermined value with the square measurement judging section; and an image width calculation section for calculating the image width in a vertical direction of the extracted area.

16. The distance measuring apparatus according to claim 15, wherein the configuration judging section judges whether or not the configuration of the extracted area is approximately circular.

17. The distance measuring apparatus according to claim 16, wherein the image width calculation section calculates the image width of the extracted area in the case where the configuration judging section judges that the configuration of the extracted area is approximately circular.

18. The distance measuring apparatus according to claim 17, wherein the main object specifying section specifies the presence of the main object in the extracted area in the case where the image width calculated with the image width calculation section is within the predetermined range.

19. The distance measuring apparatus according to claim 18, wherein the distance measuring section conducts distance measuring calculation with respect to the approximately circular area with which the main object specifying section specifies the presence of the main object.

20. The distance measuring apparatus according to claim 19, wherein the photographing screen is set to the reverse light scene after the distance measuring calculation by the distance measuring section.

21. The distance measuring apparatus according to claim 16, wherein the configuration judging section judges whether or not the configuration is approximately rectangular in the case where the configuration judging section judges that the configuration is not approximately circular.

22. The distance measuring apparatus according to claim 21, wherein the image width calculation section calculates the image width of the extracted area in the case where the configuration judging section judges that the configuration of the extracted area is approximately rectangular.

23. The distance measuring apparatus according to claim 22, wherein the main object specifying section specifies the presence of the main object in the extracted area in the case where the image width calculated with the image width calculation section is within the image width range.

24. The distance measuring apparatus according to claim 23, wherein the distance measuring section conducts the distance measuring calculation with respect to the approximately rectangular area with which the presence of the main object is specified with the main object specifying section.

* * * * *